US012348519B1

(12) United States Patent
Hassey et al.

(10) Patent No.: US 12,348,519 B1
(45) Date of Patent: Jul. 1, 2025

(54) EVALUATING SECURITY POLICIES IN AGGREGATE

(71) Applicant: strongDM, Inc., Palo Alto, CA (US)

(72) Inventors: Philip David Hassey, Rye, CO (US); Patrick Richard Jakubowski, Seattle, WA (US)

(73) Assignee: strongDM, Inc., Palo Alto, CA (US)

( * ) Notice: Subject to any disclaimer, the term of this patent is extended or adjusted under 35 U.S.C. 154(b) by 0 days.

(21) Appl. No.: 19/048,457

(22) Filed: Feb. 7, 2025

(51) Int. Cl.
H04L 29/06 (2006.01)
H04L 9/40 (2022.01)

(52) U.S. Cl.
CPC .................. H04L 63/10 (2013.01)

(58) Field of Classification Search
CPC ......... H04L 63/10; H04L 63/20; H04L 63/08; H04L 63/12; H04L 63/0263; H04L 63/108
See application file for complete search history.

(56) References Cited

U.S. PATENT DOCUMENTS

| 5,867,494 | A | 2/1999 | Krishnaswamy et al. |
| 5,867,495 | A | 2/1999 | Elliott et al. |
| 5,884,794 | A | 3/1999 | Calhoun et al. |
| 5,987,247 | A | 11/1999 | Lau |
| 6,335,927 | B1 | 1/2002 | Elliott et al. |
| 6,345,386 | B1 | 2/2002 | Delo et al. |
| 6,418,447 | B1 | 7/2002 | Frey et al. |
| 6,418,554 | B1 | 7/2002 | Delo et al. |
| 6,442,564 | B1 | 8/2002 | Frey et al. |
| 6,463,470 | B1 | 10/2002 | Mohaban et al. |
| 6,466,932 | B1 | 10/2002 | Dennis et al. |
| 6,502,103 | B1 | 12/2002 | Frey et al. |
| 6,505,210 | B1 | 1/2003 | Frey et al. |
| 6,523,166 | B1 | 2/2003 | Mishra et al. |
| 6,553,384 | B1 | 4/2003 | Frey et al. |

(Continued)

FOREIGN PATENT DOCUMENTS

| CA | 2847507 A1 | 11/2014 |
| EP | 3422236 B1 | 6/2022 |

OTHER PUBLICATIONS

Office Communication for U.S. Appl. No. 17/900,121 mailed Apr. 4, 2023, 13 Pages.

(Continued)

Primary Examiner — Longbit Chai
(74) Attorney, Agent, or Firm — John W. Branch; Branch Partners PLLC

(57) ABSTRACT

Embodiments evaluate security policies in aggregate. An aggregate authorization request may be generated based on a query from applications. Policies may be determined based on the aggregate authorization request such that each policy may include constraints or conditions associated with enabling or disabling activities. Variable fields may be iterated over to perform further actions, including: determining a variable field and a portion of the values that may be associated with the variable field based on the iteration; generating partial authorization requests based on the aggregate authorization request, the variable field, the portion of values; evaluating the policies based on each partial authorization request such that policies may be dismissed based on the evaluation. A response to the query that includes authorization answers may be generated based on each remaining policy.

28 Claims, 20 Drawing Sheets

(56) References Cited

U.S. PATENT DOCUMENTS

| | | |
|---|---|---|
| 6,560,609 B1 | 5/2003 | Frey et al. |
| 6,567,818 B1 | 5/2003 | Frey et al. |
| 6,594,671 B1 | 7/2003 | Aman et al. |
| 6,836,794 B1 | 12/2004 | Lucovsky et al. |
| 6,909,708 B1 | 6/2005 | Krishnaswamy et al. |
| 7,165,107 B2 | 1/2007 | Pouyoul et al. |
| 7,174,361 B1 | 2/2007 | Paas |
| 7,233,569 B1 | 6/2007 | Swallow |
| 7,752,466 B2 | 7/2010 | Ginter et al. |
| 7,752,487 B1 | 7/2010 | Feeser et al. |
| 7,788,399 B2 | 8/2010 | Brouk et al. |
| 7,797,406 B2 | 9/2010 | Patel et al. |
| 7,882,247 B2 | 2/2011 | Sturniolo et al. |
| 7,886,339 B2 | 2/2011 | Keohane et al. |
| 8,102,814 B2 | 1/2012 | Rahman et al. |
| 8,135,815 B2 | 3/2012 | Mayer |
| 8,165,905 B2 | 4/2012 | Yamamoto |
| 8,656,154 B1 | 2/2014 | Kailash et al. |
| 8,656,478 B1 | 2/2014 | Forristal |
| 8,806,593 B1 | 8/2014 | Raphel et al. |
| 8,817,668 B2 | 8/2014 | Sekaran et al. |
| 8,869,259 B1 | 10/2014 | Udupa et al. |
| 9,002,805 B1 | 4/2015 | Barber et al. |
| 9,052,942 B1 | 6/2015 | Barber et al. |
| 9,063,946 B1 | 6/2015 | Barber et al. |
| 9,082,402 B2 | 7/2015 | Yadgar et al. |
| 9,176,758 B2 | 11/2015 | Swaminathan |
| 9,178,793 B1 | 11/2015 | Marlow |
| 9,185,082 B2 | 11/2015 | Dashora et al. |
| 9,239,834 B2 | 1/2016 | Donabedian et al. |
| 9,300,635 B1 | 3/2016 | Gilde et al. |
| 9,355,060 B1 | 5/2016 | Barber et al. |
| 9,369,433 B1 | 6/2016 | Paul et al. |
| 9,380,456 B1 | 6/2016 | Lee et al. |
| 9,380,523 B1 | 6/2016 | Mijar et al. |
| 9,380,562 B1 | 6/2016 | Vetter et al. |
| 9,417,917 B1 | 8/2016 | Barber et al. |
| 9,471,775 B1 | 10/2016 | Wagner et al. |
| 9,521,115 B1 | 12/2016 | Woolward |
| 9,560,081 B1 | 1/2017 | Woolward |
| 9,584,523 B2 | 2/2017 | Santhiveeran et al. |
| 9,619,673 B1 | 4/2017 | Vetter et al. |
| 9,632,828 B1 | 4/2017 | Mehta et al. |
| 9,658,983 B1 | 5/2017 | Barber et al. |
| 9,667,703 B1 | 5/2017 | Vetter et al. |
| 9,697,629 B1 | 7/2017 | Vetter et al. |
| 9,727,522 B1 | 8/2017 | Barber et al. |
| 9,762,619 B1 | 9/2017 | Vaidya et al. |
| 9,787,639 B1 | 10/2017 | Sun et al. |
| 9,800,517 B1 | 10/2017 | Anderson |
| 9,819,593 B1 | 11/2017 | Vetter et al. |
| 9,825,911 B1 | 11/2017 | Brandwine |
| 9,882,767 B1 | 1/2018 | Foxhoven et al. |
| 9,948,644 B2 | 4/2018 | Brouk et al. |
| 10,033,766 B2 | 7/2018 | Gupta et al. |
| 10,063,595 B1 | 8/2018 | Qureshi et al. |
| 10,075,334 B1 | 9/2018 | Kozura et al. |
| 10,089,476 B1 | 10/2018 | Roth et al. |
| 10,104,185 B1 | 10/2018 | Sharifi et al. |
| 10,110,593 B2 | 10/2018 | Karroumi et al. |
| 10,117,098 B1 | 10/2018 | Naguthanawala et al. |
| 10,154,065 B1 | 12/2018 | Buchler et al. |
| 10,292,033 B2 | 5/2019 | Beyer et al. |
| 10,348,767 B1 | 7/2019 | Lee et al. |
| 10,360,010 B1 | 7/2019 | Maehler et al. |
| 10,361,859 B2 | 7/2019 | Clark et al. |
| 10,382,401 B1 | 8/2019 | Lee et al. |
| 10,395,042 B2 | 8/2019 | Agarwal et al. |
| 10,409,582 B1 | 9/2019 | Maehler et al. |
| 10,476,745 B1 | 11/2019 | McCormick et al. |
| 10,511,590 B1 | 12/2019 | Bosch et al. |
| 10,511,614 B1 | 12/2019 | Aziz |
| 10,516,667 B1 | 12/2019 | Roth et al. |
| 10,579,362 B1 | 3/2020 | Maehler et al. |
| 10,579,403 B2 | 3/2020 | Antony et al. |
| 10,587,621 B2 | 3/2020 | Ponnuswamy et al. |
| 10,587,644 B1 | 3/2020 | Stolte et al. |
| 10,609,041 B1 | 3/2020 | Wilczynski et al. |
| 10,645,562 B2 | 5/2020 | Beyer et al. |
| 10,659,533 B1 | 5/2020 | Zhao et al. |
| 10,728,117 B1 | 7/2020 | Sharma et al. |
| 10,735,263 B1 | 8/2020 | Mcalary et al. |
| 10,827,020 B1 | 11/2020 | Cao et al. |
| 10,917,438 B2 | 2/2021 | Gandham et al. |
| 10,944,691 B1 | 3/2021 | Raut et al. |
| 10,958,649 B2 | 3/2021 | Delcourt et al. |
| 10,999,326 B1 | 5/2021 | Pollitt et al. |
| 11,038,861 B2 | 6/2021 | Agarwal et al. |
| 11,075,747 B1 | 7/2021 | Holsman |
| 11,075,923 B1 | 7/2021 | Srinivasan et al. |
| 11,089,047 B1 | 8/2021 | Kaushal et al. |
| 11,102,076 B1 | 8/2021 | Pieczul et al. |
| 11,102,147 B2 | 8/2021 | Mehta et al. |
| 11,153,190 B1 | 10/2021 | Mahajan et al. |
| 11,163,614 B1 | 11/2021 | Francisco |
| 11,228,945 B2 | 1/2022 | Yang et al. |
| 11,249,809 B1 | 2/2022 | Tang et al. |
| 11,290,143 B1 | 3/2022 | Sternowski |
| 11,303,643 B1 | 4/2022 | Li et al. |
| 11,310,650 B2 | 4/2022 | Zhou |
| 11,316,822 B1 | 4/2022 | Gawade et al. |
| 11,323,919 B1 | 5/2022 | Parulkar et al. |
| 11,375,300 B2 | 6/2022 | Sagie et al. |
| 11,412,051 B1 | 8/2022 | Chiganmi et al. |
| 11,431,497 B1 | 8/2022 | Liguori et al. |
| 11,483,308 B2 * | 10/2022 | Kale ................ G06Q 20/3674 |
| 11,502,908 B1 | 11/2022 | Singh |
| 11,521,444 B1 | 12/2022 | Badik et al. |
| 11,528,147 B2 | 12/2022 | Madisetti et al. |
| 11,538,287 B2 | 12/2022 | Fang et al. |
| 11,546,323 B1 | 1/2023 | Jones et al. |
| 11,546,763 B1 | 1/2023 | Filho et al. |
| 11,599,714 B2 | 3/2023 | Munro et al. |
| 11,599,841 B2 | 3/2023 | Anisingaraju et al. |
| 11,620,103 B2 | 4/2023 | Graham et al. |
| 11,632,669 B2 | 4/2023 | Xu et al. |
| 11,657,145 B2 | 5/2023 | Cristina et al. |
| 11,729,620 B1 | 8/2023 | Filho et al. |
| 11,736,531 B1 | 8/2023 | Filho et al. |
| 11,765,159 B1 | 9/2023 | Crawford et al. |
| 11,765,207 B1 | 9/2023 | McCarthy |
| 11,784,999 B1 | 10/2023 | Jones et al. |
| 11,831,511 B1 | 11/2023 | Zhou et al. |
| 11,861,221 B1 | 1/2024 | Richardson et al. |
| 11,916,885 B1 | 2/2024 | Filho et al. |
| 11,916,968 B1 | 2/2024 | Filho et al. |
| 11,930,045 B1 | 3/2024 | Baker et al. |
| 11,954,219 B1 | 4/2024 | Makmal et al. |
| 11,973,752 B2 | 4/2024 | Crawford et al. |
| 12,028,321 B1 | 7/2024 | Filho et al. |
| 12,063,148 B2 | 8/2024 | Dabell et al. |
| 12,063,218 B2 | 8/2024 | Wilczynski et al. |
| 12,063,550 B2 | 8/2024 | Qiao et al. |
| 12,177,097 B2 | 12/2024 | Gupta et al. |
| 12,184,667 B2 | 12/2024 | Chacko |
| 12,184,700 B2 | 12/2024 | Raleigh |
| 2002/0099952 A1 | 7/2002 | Lambert et al. |
| 2002/0133534 A1 | 9/2002 | Forslow |
| 2002/0140738 A1 | 10/2002 | West et al. |
| 2002/0149623 A1 | 10/2002 | West et al. |
| 2003/0041141 A1 | 2/2003 | Abdelaziz et al. |
| 2003/0058286 A1 | 3/2003 | Dando |
| 2003/0093465 A1 | 5/2003 | Banerjee et al. |
| 2003/0145317 A1 | 7/2003 | Chamberlain |
| 2003/0177182 A1 | 9/2003 | Clark et al. |
| 2004/0019898 A1 | 1/2004 | Frey et al. |
| 2004/0064512 A1 | 4/2004 | Arora et al. |
| 2004/0064568 A1 | 4/2004 | Arora et al. |
| 2004/0064693 A1 | 4/2004 | Pabla et al. |
| 2004/0088348 A1 | 5/2004 | Yeager et al. |
| 2004/0133640 A1 | 7/2004 | Yeager et al. |
| 2004/0184070 A1 | 9/2004 | Kiraly et al. |
| 2005/0022185 A1 | 1/2005 | Romero |
| 2005/0132227 A1 | 6/2005 | Reasor et al. |

(56) References Cited

U.S. PATENT DOCUMENTS

| | | |
|---|---|---|
| 2005/0164650 A1 | 7/2005 | Johnson |
| 2005/0209876 A1 | 9/2005 | Kennis et al. |
| 2006/0074876 A1 | 4/2006 | Kakivaya et al. |
| 2006/0136928 A1 | 6/2006 | Crawford et al. |
| 2006/0177005 A1 | 8/2006 | Shaffer et al. |
| 2006/0177024 A1 | 8/2006 | Frifeldt et al. |
| 2006/0177025 A1 | 8/2006 | Frifeldt et al. |
| 2006/0190991 A1 | 8/2006 | Iyer |
| 2006/0200856 A1 | 9/2006 | Salowey et al. |
| 2006/0212487 A1 | 9/2006 | Kennis et al. |
| 2006/0233166 A1 | 10/2006 | Bou-Diab et al. |
| 2006/0233180 A1 | 10/2006 | Serghi et al. |
| 2006/0235973 A1 | 10/2006 | McBride et al. |
| 2006/0240824 A1 | 10/2006 | Henderson et al. |
| 2006/0265708 A1 | 11/2006 | Blanding et al. |
| 2006/0265758 A1 | 11/2006 | Khandelwal et al. |
| 2006/0288204 A1 | 12/2006 | Sood et al. |
| 2007/0009104 A1 | 1/2007 | Renkis |
| 2007/0014413 A1 | 1/2007 | Oliveira et al. |
| 2007/0033273 A1 | 2/2007 | White et al. |
| 2007/0124797 A1 | 5/2007 | Gupta et al. |
| 2007/0162359 A1 | 7/2007 | Gokhale et al. |
| 2007/0220009 A1 | 9/2007 | Morris et al. |
| 2007/0293210 A1 | 12/2007 | Strub et al. |
| 2007/0294209 A1 | 12/2007 | Strub et al. |
| 2007/0294253 A1 | 12/2007 | Strub et al. |
| 2008/0144502 A1 | 6/2008 | Jackowski et al. |
| 2008/0184336 A1 | 7/2008 | Sarukkai et al. |
| 2008/0201454 A1 | 8/2008 | Soffer |
| 2008/0229383 A1 | 9/2008 | Buss et al. |
| 2008/0256357 A1 | 10/2008 | Iyengar et al. |
| 2008/0313699 A1 | 12/2008 | Starostin et al. |
| 2009/0037607 A1 | 2/2009 | Farinacci et al. |
| 2009/0049509 A1 | 2/2009 | Chan et al. |
| 2009/0063381 A1 | 3/2009 | Chan et al. |
| 2009/0083336 A1 | 3/2009 | Srinivasan |
| 2009/0164663 A1 | 6/2009 | Ransom et al. |
| 2009/0216910 A1 | 8/2009 | Duchesneau |
| 2009/0222559 A1 | 9/2009 | Anipko et al. |
| 2010/0037311 A1 | 2/2010 | He et al. |
| 2010/0131650 A1 | 5/2010 | Pok et al. |
| 2010/0132013 A1 | 5/2010 | Van et al. |
| 2010/0154025 A1 | 6/2010 | Esteve et al. |
| 2010/0161632 A1 | 6/2010 | Rosen |
| 2010/0192212 A1 | 7/2010 | Raleigh |
| 2010/0217853 A1 | 8/2010 | Alexander et al. |
| 2010/0262717 A1 | 10/2010 | Critchley et al. |
| 2011/0002333 A1 | 1/2011 | Karuppiah et al. |
| 2011/0106757 A1 | 5/2011 | Pickney et al. |
| 2011/0106770 A1 | 5/2011 | McDonald et al. |
| 2011/0106771 A1 | 5/2011 | McDonald et al. |
| 2011/0106802 A1 | 5/2011 | Pinkney et al. |
| 2011/0167474 A1 | 7/2011 | Sinha et al. |
| 2011/0225311 A1 | 9/2011 | Liu et al. |
| 2012/0084438 A1 | 4/2012 | Raleigh et al. |
| 2012/0102050 A1 | 4/2012 | Button et al. |
| 2012/0185913 A1 | 7/2012 | Martinez et al. |
| 2012/0216240 A1 | 8/2012 | Gottumukkala et al. |
| 2012/0240183 A1 | 9/2012 | Sinha |
| 2012/0260307 A1 | 10/2012 | Sambamurthy et al. |
| 2012/0278293 A1 | 11/2012 | Bulkowski et al. |
| 2012/0304265 A1 | 11/2012 | Richter et al. |
| 2013/0031157 A1 | 1/2013 | Mckee et al. |
| 2013/0125112 A1 | 5/2013 | Mittal et al. |
| 2013/0173794 A1 | 7/2013 | Agerbak et al. |
| 2013/0198558 A1 | 8/2013 | Rao et al. |
| 2013/0227714 A1 | 8/2013 | Gula et al. |
| 2013/0239192 A1 | 9/2013 | Linga et al. |
| 2013/0268260 A1 | 10/2013 | Lundberg et al. |
| 2013/0268740 A1 | 10/2013 | Holt |
| 2013/0298183 A1 | 11/2013 | McGrath et al. |
| 2014/0044265 A1 | 2/2014 | Kocher et al. |
| 2014/0057676 A1 | 2/2014 | Lord et al. |
| 2014/0136970 A1 | 5/2014 | Xiao |
| 2014/0195818 A1 | 7/2014 | Neumann et al. |
| 2014/0248852 A1 | 9/2014 | Raleigh et al. |
| 2014/0282900 A1 | 9/2014 | Wang et al. |
| 2014/0289794 A1 | 9/2014 | Raleigh et al. |
| 2015/0082374 A1 | 3/2015 | Dobson et al. |
| 2015/0089566 A1 | 3/2015 | Chesla |
| 2015/0089575 A1 | 3/2015 | Vepa et al. |
| 2015/0127949 A1 | 5/2015 | Patil et al. |
| 2015/0128205 A1 | 5/2015 | Mahaffey et al. |
| 2015/0135277 A1 | 5/2015 | Vij et al. |
| 2015/0135300 A1 | 5/2015 | Ford |
| 2015/0143456 A1 | 5/2015 | Raleigh et al. |
| 2015/0143504 A1 | 5/2015 | Desai et al. |
| 2015/0169871 A1 | 6/2015 | Achutha et al. |
| 2015/0188949 A1 | 7/2015 | Mahaffey et al. |
| 2015/0208273 A1 | 7/2015 | Raleigh et al. |
| 2015/0281079 A1 | 10/2015 | Fan et al. |
| 2015/0281952 A1 | 10/2015 | Patil et al. |
| 2015/0282058 A1 | 10/2015 | Forssell |
| 2015/0301824 A1 | 10/2015 | Patton et al. |
| 2015/0309849 A1 | 10/2015 | Lau et al. |
| 2015/0310025 A1 | 10/2015 | Rathgeber et al. |
| 2015/0319182 A1 | 11/2015 | Natarajan et al. |
| 2015/0326613 A1 | 11/2015 | Devarajan et al. |
| 2015/0370793 A1 | 12/2015 | Chen et al. |
| 2015/0370846 A1 | 12/2015 | Zhou |
| 2015/0382198 A1 | 12/2015 | Kashef et al. |
| 2016/0014669 A1 | 1/2016 | Patil et al. |
| 2016/0014818 A1 | 1/2016 | Reitsma et al. |
| 2016/0036816 A1 | 2/2016 | Srinivasan |
| 2016/0036855 A1 | 2/2016 | Gangadharappa et al. |
| 2016/0036861 A1 | 2/2016 | Mattes et al. |
| 2016/0057166 A1 | 2/2016 | Chesla |
| 2016/0065618 A1 | 3/2016 | Banerjee |
| 2016/0078236 A1 | 3/2016 | Chesla |
| 2016/0080128 A1 | 3/2016 | Hebron et al. |
| 2016/0085841 A1 | 3/2016 | Dorfman et al. |
| 2016/0147529 A1 | 5/2016 | Coleman et al. |
| 2016/0173501 A1 | 6/2016 | Brown |
| 2016/0180102 A1 | 6/2016 | Kim et al. |
| 2016/0191545 A1 | 6/2016 | Nanda et al. |
| 2016/0212237 A1 | 7/2016 | Nishijima |
| 2016/0224360 A1 | 8/2016 | Wagner et al. |
| 2016/0224785 A1 | 8/2016 | Wagner et al. |
| 2016/0255051 A1 | 9/2016 | Williams et al. |
| 2016/0262021 A1 | 9/2016 | Lee et al. |
| 2016/0277447 A1 | 9/2016 | Pope et al. |
| 2016/0294826 A1 | 10/2016 | Han et al. |
| 2016/0314355 A1 | 10/2016 | Laska et al. |
| 2016/0337474 A1 | 11/2016 | Rao |
| 2016/0359872 A1 | 12/2016 | Yadav et al. |
| 2016/0359914 A1 | 12/2016 | Deen et al. |
| 2016/0378846 A1 | 12/2016 | Luse et al. |
| 2016/0380909 A1 | 12/2016 | Antony et al. |
| 2017/0005790 A1 | 1/2017 | Brockmann et al. |
| 2017/0010826 A1 | 1/2017 | Basham et al. |
| 2017/0011078 A1 | 1/2017 | Gerrard et al. |
| 2017/0061006 A1 | 3/2017 | Hildebrand et al. |
| 2017/0061956 A1 | 3/2017 | Sarikaya et al. |
| 2017/0078721 A1 | 3/2017 | Brockmann et al. |
| 2017/0093923 A1 | 3/2017 | Duan |
| 2017/0103440 A1 | 4/2017 | Xing et al. |
| 2017/0111368 A1 | 4/2017 | Hibbert et al. |
| 2017/0126734 A1 | 5/2017 | Harney |
| 2017/0134422 A1 | 5/2017 | Shieh et al. |
| 2017/0142096 A1 | 5/2017 | Reddy et al. |
| 2017/0142810 A1 | 5/2017 | Cho |
| 2017/0149843 A1 | 5/2017 | Amulothu et al. |
| 2017/0171245 A1 | 6/2017 | Lee et al. |
| 2017/0177222 A1 | 6/2017 | Singh et al. |
| 2017/0177892 A1 | 6/2017 | Tingstrom et al. |
| 2017/0206207 A1 | 7/2017 | Bondurant et al. |
| 2017/0212830 A1 | 7/2017 | Thomas et al. |
| 2017/0223024 A1 | 8/2017 | Desai et al. |
| 2017/0237747 A1 | 8/2017 | Quinn et al. |
| 2017/0244606 A1 | 8/2017 | Htay |
| 2017/0250953 A1 | 8/2017 | Jain et al. |
| 2017/0257357 A1 | 9/2017 | Wang et al. |
| 2017/0279803 A1 | 9/2017 | Desai et al. |
| 2017/0279971 A1 | 9/2017 | Raleigh et al. |

(56) References Cited

U.S. PATENT DOCUMENTS

| | | |
|---|---|---|
| 2017/0331859 A1 | 11/2017 | Bansal et al. |
| 2017/0332238 A1 | 11/2017 | Bansal et al. |
| 2017/0339561 A1 | 11/2017 | Wennemyr et al. |
| 2017/0353433 A1 | 12/2017 | Antony et al. |
| 2017/0353483 A1 | 12/2017 | Weith et al. |
| 2017/0353496 A1 | 12/2017 | Pai et al. |
| 2017/0359220 A1 | 12/2017 | Weith et al. |
| 2017/0364505 A1 | 12/2017 | Sarikaya et al. |
| 2017/0364748 A1 | 12/2017 | Maji et al. |
| 2017/0372087 A1 | 12/2017 | Lee |
| 2017/0374032 A1 | 12/2017 | Woolward et al. |
| 2017/0374101 A1 | 12/2017 | Woolward |
| 2018/0027009 A1 | 1/2018 | Santos et al. |
| 2018/0032258 A1 | 2/2018 | Edwards et al. |
| 2018/0035126 A1 | 2/2018 | Lee et al. |
| 2018/0041467 A1 | 2/2018 | Vats et al. |
| 2018/0041598 A1 | 2/2018 | Vats et al. |
| 2018/0061158 A1 | 3/2018 | Greene |
| 2018/0069702 A1 | 3/2018 | Ayyadevara et al. |
| 2018/0083915 A1 | 3/2018 | Medam et al. |
| 2018/0083944 A1 | 3/2018 | Vats et al. |
| 2018/0091583 A1 | 3/2018 | Collins et al. |
| 2018/0101422 A1 | 4/2018 | Flanigan et al. |
| 2018/0109498 A1 | 4/2018 | Singh |
| 2018/0115523 A1 | 4/2018 | Subbarayan et al. |
| 2018/0115585 A1 | 4/2018 | Rubakha |
| 2018/0121110 A1 | 5/2018 | Sawhney |
| 2018/0121129 A1 | 5/2018 | Sawhney et al. |
| 2018/0123957 A1 | 5/2018 | Chen et al. |
| 2018/0159701 A1 | 6/2018 | Krause et al. |
| 2018/0167373 A1 | 6/2018 | Anderson et al. |
| 2018/0167415 A1 | 6/2018 | Khan et al. |
| 2018/0176262 A1 | 6/2018 | Kavi |
| 2018/0196680 A1 | 7/2018 | Wang et al. |
| 2018/0210801 A1 | 7/2018 | Wu et al. |
| 2018/0218148 A1 | 8/2018 | D'errico et al. |
| 2018/0218149 A1 | 8/2018 | Jacobs et al. |
| 2018/0220472 A1 | 8/2018 | Schopp |
| 2018/0233141 A1 | 8/2018 | Solomon et al. |
| 2018/0255591 A1 | 9/2018 | Valicherla et al. |
| 2018/0270732 A1 | 9/2018 | Garcia et al. |
| 2018/0288026 A1 | 10/2018 | Callaghan |
| 2018/0293024 A1 | 10/2018 | Baptist et al. |
| 2018/0295036 A1 | 10/2018 | Krishnamurthy et al. |
| 2018/0309764 A1 | 10/2018 | Kras et al. |
| 2018/0314846 A1 | 11/2018 | Schultz et al. |
| 2018/0316725 A1 | 11/2018 | Mani et al. |
| 2018/0341519 A1 | 11/2018 | Vyas et al. |
| 2018/0343238 A1 | 11/2018 | Tola |
| 2018/0349629 A1 | 12/2018 | Chenchev et al. |
| 2018/0359369 A1 | 12/2018 | Golshenas et al. |
| 2018/0367308 A1 | 12/2018 | Kacin et al. |
| 2018/0367396 A1 | 12/2018 | Kompella et al. |
| 2019/0020665 A1 | 1/2019 | Surcouf et al. |
| 2019/0039569 A1 | 2/2019 | Reed et al. |
| 2019/0065278 A1 | 2/2019 | Jeuk et al. |
| 2019/0068449 A1 | 2/2019 | Sikand et al. |
| 2019/0073373 A1 | 3/2019 | Surale et al. |
| 2019/0075095 A1 | 3/2019 | Venable et al. |
| 2019/0081955 A1 | 3/2019 | Chugtu et al. |
| 2019/0104411 A1 | 4/2019 | Hotchkiss et al. |
| 2019/0116132 A1 | 4/2019 | Suzuki |
| 2019/0124507 A1 | 4/2019 | Dotchkoff et al. |
| 2019/0147154 A1 | 5/2019 | Das |
| 2019/0156023 A1 | 5/2019 | Gerebe et al. |
| 2019/0158503 A1 | 5/2019 | Bansal et al. |
| 2019/0163406 A1 | 5/2019 | Kazi et al. |
| 2019/0174449 A1 | 6/2019 | Shan et al. |
| 2019/0213319 A1 | 7/2019 | Gerebe et al. |
| 2019/0235605 A1 | 8/2019 | Chenchev et al. |
| 2019/0253274 A1 | 8/2019 | Van Dussen |
| 2019/0254094 A1 | 8/2019 | Babu et al. |
| 2019/0258813 A1 | 8/2019 | Lewis et al. |
| 2019/0260753 A1 | 8/2019 | Lewis et al. |
| 2019/0261203 A1 | 8/2019 | Raleigh |
| 2019/0268167 A1 | 8/2019 | White et al. |
| 2019/0281073 A1 | 9/2019 | Weith et al. |
| 2019/0281127 A1 | 9/2019 | Schmidt et al. |
| 2019/0289459 A1 | 9/2019 | Shan |
| 2019/0297161 A1 | 9/2019 | Ayyadevara et al. |
| 2019/0303345 A1 | 10/2019 | Zhu et al. |
| 2019/0306754 A1 | 10/2019 | Shan et al. |
| 2019/0313359 A1 | 10/2019 | Lee et al. |
| 2019/0317821 A1 | 10/2019 | O'neal et al. |
| 2019/0318240 A1 | 10/2019 | Kulkarni et al. |
| 2019/0319950 A1 | 10/2019 | Bowling |
| 2019/0327320 A1 | 10/2019 | Rubin et al. |
| 2019/0332777 A1 | 10/2019 | Edwards et al. |
| 2019/0340341 A1 | 11/2019 | Fleck et al. |
| 2019/0349742 A1 | 11/2019 | Kim et al. |
| 2019/0349758 A1 | 11/2019 | Zhu et al. |
| 2020/0004451 A1 | 1/2020 | Prohofsky |
| 2020/0007540 A1 | 1/2020 | Kawaguchi et al. |
| 2020/0021615 A1 | 1/2020 | Wainner et al. |
| 2020/0026850 A1 | 1/2020 | Levin et al. |
| 2020/0034248 A1 | 1/2020 | Nara et al. |
| 2020/0067801 A1 | 2/2020 | McCormick et al. |
| 2020/0077265 A1 | 3/2020 | Singh et al. |
| 2020/0089516 A1 | 3/2020 | Vijayvargiya et al. |
| 2020/0097195 A1 | 3/2020 | Fritz et al. |
| 2020/0112850 A1 | 4/2020 | Lee et al. |
| 2020/0153911 A1 | 5/2020 | Chauhan |
| 2020/0177333 A1 | 6/2020 | Liu |
| 2020/0193016 A1 | 6/2020 | Zeng et al. |
| 2020/0204551 A1 | 6/2020 | Singh et al. |
| 2020/0205209 A1 | 6/2020 | Pan et al. |
| 2020/0214054 A1 | 7/2020 | Qiao et al. |
| 2020/0218798 A1 | 7/2020 | Kosaka et al. |
| 2020/0219023 A1 | 7/2020 | Duchastel |
| 2020/0220848 A1 | 7/2020 | Patwardhan |
| 2020/0220875 A1 | 7/2020 | Harguindeguy et al. |
| 2020/0228936 A1 | 7/2020 | Talebi et al. |
| 2020/0229069 A1 | 7/2020 | Chun |
| 2020/0257179 A1 | 8/2020 | Barnum et al. |
| 2020/0257810 A1 | 8/2020 | Vrabec et al. |
| 2020/0259831 A1 | 8/2020 | Pampati et al. |
| 2020/0260401 A1 | 8/2020 | So |
| 2020/0267552 A1 | 8/2020 | Lee et al. |
| 2020/0267554 A1 | 8/2020 | Faccin et al. |
| 2020/0267785 A1 | 8/2020 | Talebi et al. |
| 2020/0272911 A1 | 8/2020 | Quiros Araya et al. |
| 2020/0280592 A1 | 9/2020 | Ithal et al. |
| 2020/0296619 A1 | 9/2020 | Pan et al. |
| 2020/0296779 A1 | 9/2020 | Moghe et al. |
| 2020/0304474 A1 | 9/2020 | Kisko |
| 2020/0314613 A1 | 10/2020 | Lee et al. |
| 2020/0314701 A1 | 10/2020 | Talebi et al. |
| 2020/0320189 A1 | 10/2020 | Zhang et al. |
| 2020/0322262 A1 | 10/2020 | Maino et al. |
| 2020/0322286 A1 | 10/2020 | Mehta et al. |
| 2020/0323030 A1 | 10/2020 | Mehta et al. |
| 2020/0334084 A1 | 10/2020 | Jacobson |
| 2020/0336484 A1 | 10/2020 | Mahajan et al. |
| 2020/0344637 A1 | 10/2020 | Kim et al. |
| 2020/0351699 A1 | 11/2020 | Pan et al. |
| 2020/0351980 A1 | 11/2020 | Talebi et al. |
| 2020/0351984 A1 | 11/2020 | Talebi et al. |
| 2020/0367141 A1 | 11/2020 | Cakulev et al. |
| 2020/0382488 A1 | 12/2020 | Liu et al. |
| 2020/0389426 A1 | 12/2020 | Enguehard et al. |
| 2020/0396678 A1 | 12/2020 | Lee et al. |
| 2020/0401452 A1 | 12/2020 | Piercey et al. |
| 2020/0404107 A1 | 12/2020 | Cheng et al. |
| 2021/0011984 A1 | 1/2021 | Renke et al. |
| 2021/0021431 A1 | 1/2021 | Guim Bernat et al. |
| 2021/0026819 A1 | 1/2021 | Beard et al. |
| 2021/0029029 A1 | 1/2021 | Mehmedagic et al. |
| 2021/0029119 A1 | 1/2021 | Raman et al. |
| 2021/0029132 A1 | 1/2021 | Wilczynski et al. |
| 2021/0029168 A1 | 1/2021 | Jeong |
| 2021/0037380 A1 | 2/2021 | Lee et al. |
| 2021/0056524 A1 | 2/2021 | Isgar |
| 2021/0056536 A1 | 2/2021 | Carter et al. |
| 2021/0075631 A1 | 3/2021 | Liao |

(56) References Cited

U.S. PATENT DOCUMENTS

| | | |
|---|---|---|
| 2021/0076444 A1 | 3/2021 | Shu et al. |
| 2021/0091941 A1 | 3/2021 | Pancras et al. |
| 2021/0099490 A1 | 4/2021 | Crabtree et al. |
| 2021/0105275 A1 | 4/2021 | Bansal et al. |
| 2021/0105596 A1 | 4/2021 | Prabhakar et al. |
| 2021/0109900 A1 | 4/2021 | Mcilroy et al. |
| 2021/0117241 A1 | 4/2021 | Xia |
| 2021/0120473 A1 | 4/2021 | Yao et al. |
| 2021/0120596 A1 | 4/2021 | Youn et al. |
| 2021/0122261 A1 | 4/2021 | Qiao et al. |
| 2021/0133313 A1 | 5/2021 | Sakib et al. |
| 2021/0136041 A1 | 5/2021 | Foxhoven et al. |
| 2021/0141655 A1 | 5/2021 | Gamage et al. |
| 2021/0157655 A1 | 5/2021 | Foreman |
| 2021/0168125 A1 | 6/2021 | Vemulpali |
| 2021/0168142 A1 | 6/2021 | Foxhoven et al. |
| 2021/0168613 A1 | 6/2021 | Suh et al. |
| 2021/0168661 A1 | 6/2021 | Wong et al. |
| 2021/0168751 A1 | 6/2021 | Stojanovski et al. |
| 2021/0194760 A1 | 6/2021 | Barton et al. |
| 2021/0211408 A1 | 7/2021 | Porras et al. |
| 2021/0211423 A1 | 7/2021 | Tan et al. |
| 2021/0211870 A1 | 7/2021 | Perras et al. |
| 2021/0218594 A1 | 7/2021 | Sundararajan et al. |
| 2021/0218652 A1 | 7/2021 | Raut et al. |
| 2021/0218801 A1 | 7/2021 | Zhang et al. |
| 2021/0223128 A1 | 7/2021 | Kirch |
| 2021/0224091 A1 | 7/2021 | Hayatnagarkar et al. |
| 2021/0226850 A1 | 7/2021 | Xu et al. |
| 2021/0226910 A1 | 7/2021 | Ranpise et al. |
| 2021/0226987 A1 | 7/2021 | Summers et al. |
| 2021/0227438 A1 | 7/2021 | Xu |
| 2021/0234860 A1 | 7/2021 | Bansal et al. |
| 2021/0234898 A1 | 7/2021 | Desai et al. |
| 2021/0243678 A1 | 8/2021 | Drevon et al. |
| 2021/0250333 A1 | 8/2021 | Negrea et al. |
| 2021/0250890 A1 | 8/2021 | Won |
| 2021/0258859 A1 | 8/2021 | Watfa |
| 2021/0274340 A1 | 9/2021 | Sun et al. |
| 2021/0281572 A1 | 9/2021 | Fernandez-spadaro et al. |
| 2021/0294970 A1 | 9/2021 | Bender et al. |
| 2021/0306310 A1 | 9/2021 | Tan |
| 2021/0307101 A1 | 9/2021 | Kim et al. |
| 2021/0312400 A1 | 10/2021 | Irimie et al. |
| 2021/0314301 A1 | 10/2021 | Chanak et al. |
| 2021/0314338 A1 | 10/2021 | Howe |
| 2021/0314399 A1 | 10/2021 | Hyun et al. |
| 2021/0320897 A1 | 10/2021 | Stojanovski et al. |
| 2021/0336932 A1 | 10/2021 | Chanak et al. |
| 2021/0336933 A1 | 10/2021 | Shah et al. |
| 2021/0336934 A1 | 10/2021 | Deshmukh et al. |
| 2021/0336959 A1 | 10/2021 | Shah et al. |
| 2021/0344492 A1 | 11/2021 | Goodsitt et al. |
| 2021/0344722 A1 | 11/2021 | Goyal et al. |
| 2021/0360294 A1 | 11/2021 | Liao et al. |
| 2021/0360371 A1 | 11/2021 | Qiao et al. |
| 2021/0367920 A1 | 11/2021 | Devarajan et al. |
| 2021/0367944 A1 | 11/2021 | Gupta et al. |
| 2021/0368339 A1 | 11/2021 | Watfa et al. |
| 2021/0368581 A1 | 11/2021 | Shan |
| 2021/0377210 A1 | 12/2021 | Singh et al. |
| 2021/0377222 A1 | 12/2021 | Sharma et al. |
| 2021/0377223 A1 | 12/2021 | Chanak et al. |
| 2021/0377303 A1 | 12/2021 | Bui et al. |
| 2021/0382739 A1 | 12/2021 | Guo et al. |
| 2021/0385642 A1 | 12/2021 | Di et al. |
| 2021/0385742 A1 | 12/2021 | Liao |
| 2021/0397313 A1 | 12/2021 | Desai et al. |
| 2021/0397463 A1 | 12/2021 | Schimon et al. |
| 2021/0399954 A1 | 12/2021 | Dabell et al. |
| 2021/0400060 A1 | 12/2021 | Chacko |
| 2021/0406127 A1 | 12/2021 | Knierim et al. |
| 2021/0406902 A1 | 12/2021 | Bernert et al. |
| 2021/0409441 A1 | 12/2021 | Singh et al. |
| 2021/0409449 A1 | 12/2021 | Crabtree et al. |
| 2021/0410059 A1 | 12/2021 | Talebi et al. |
| 2022/0007161 A1 | 1/2022 | Shan |
| 2022/0007180 A1 | 1/2022 | Liao et al. |
| 2022/0007437 A1 | 1/2022 | Goenka et al. |
| 2022/0014466 A1 | 1/2022 | Doshi et al. |
| 2022/0014512 A1 | 1/2022 | Raleigh et al. |
| 2022/0029965 A1 | 1/2022 | Chanak et al. |
| 2022/0030495 A1 | 1/2022 | Qiao et al. |
| 2022/0038544 A1 | 2/2022 | Grinstein et al. |
| 2022/0038986 A1 | 2/2022 | Soliman et al. |
| 2022/0039004 A1 | 2/2022 | Soliman et al. |
| 2022/0043665 A1 | 2/2022 | Vidyadhara et al. |
| 2022/0046059 A1 | 2/2022 | Pandurangi et al. |
| 2022/0052850 A1 | 2/2022 | Fagan et al. |
| 2022/0052961 A1 | 2/2022 | Chauhan et al. |
| 2022/0053449 A1 | 2/2022 | Shan |
| 2022/0060398 A1 | 2/2022 | Shishir et al. |
| 2022/0060507 A1 | 2/2022 | Crabtree et al. |
| 2022/0060509 A1 | 2/2022 | Crabtree et al. |
| 2022/0060557 A1 | 2/2022 | Bathla et al. |
| 2022/0070183 A1 | 3/2022 | Goyal |
| 2022/0070967 A1 | 3/2022 | Li et al. |
| 2022/0086639 A1 | 3/2022 | Lu et al. |
| 2022/0092024 A1 | 3/2022 | Kavaipatti et al. |
| 2022/0095260 A1 | 3/2022 | Shan |
| 2022/0103525 A1 | 3/2022 | Shribman et al. |
| 2022/0103987 A1 | 3/2022 | Shan |
| 2022/0104164 A1 | 3/2022 | Kedalagudde et al. |
| 2022/0104296 A1 | 3/2022 | Mary et al. |
| 2022/0109696 A1 | 4/2022 | Deshmukh et al. |
| 2022/0110023 A1 | 4/2022 | Wu et al. |
| 2022/0116397 A1 | 4/2022 | Deshmukh et al. |
| 2022/0116814 A1 | 4/2022 | Di et al. |
| 2022/0124521 A1 | 4/2022 | Xu et al. |
| 2022/0124595 A1 | 4/2022 | Xu et al. |
| 2022/0129583 A1 | 4/2022 | Balasubramanian et al. |
| 2022/0141662 A1 | 5/2022 | Liao |
| 2022/0150312 A1 | 5/2022 | Ranpise et al. |
| 2022/0159029 A1 | 5/2022 | Bendersky et al. |
| 2022/0159527 A1 | 5/2022 | Lee et al. |
| 2022/0159605 A1 | 5/2022 | Li et al. |
| 2022/0164186 A1 | 5/2022 | Pamidala et al. |
| 2022/0167299 A1 | 5/2022 | Xu et al. |
| 2022/0174580 A1 | 6/2022 | You et al. |
| 2022/0182412 A1 | 6/2022 | Borak |
| 2022/0191052 A1 | 6/2022 | Garcia et al. |
| 2022/0191100 A1 | 6/2022 | Kim et al. |
| 2022/0191736 A1 | 6/2022 | Barton et al. |
| 2022/0191765 A1 | 6/2022 | Ding |
| 2022/0200924 A1 | 6/2022 | Lu et al. |
| 2022/0200972 A1 | 6/2022 | Potlapally et al. |
| 2022/0200993 A1 | 6/2022 | Smith |
| 2022/0201041 A1 | 6/2022 | Keiser et al. |
| 2022/0201638 A1 | 6/2022 | Arrobo et al. |
| 2022/0210698 A1 | 6/2022 | Ly et al. |
| 2022/0217084 A1 | 7/2022 | Arora et al. |
| 2022/0224703 A1 | 7/2022 | Devarajan |
| 2022/0225448 A1 | 7/2022 | Li et al. |
| 2022/0232020 A1 | 7/2022 | Kandachar Sridhara Rao et al. |
| 2022/0232363 A1 | 7/2022 | Watfa et al. |
| 2022/0239698 A1 | 7/2022 | Anantharaju |
| 2022/0255966 A1 | 8/2022 | Sienicki et al. |
| 2022/0263835 A1 | 8/2022 | Pieczul et al. |
| 2022/0263913 A1 | 8/2022 | Zhang et al. |
| 2022/0264370 A1 | 8/2022 | Qiao et al. |
| 2022/0264403 A1 | 8/2022 | Watfa et al. |
| 2022/0264444 A1 | 8/2022 | Ryu et al. |
| 2022/0264503 A1 | 8/2022 | Starsinic et al. |
| 2022/0272614 A1 | 8/2022 | Lu et al. |
| 2022/0272620 A1 | 8/2022 | Ninglekhu et al. |
| 2022/0278900 A1 | 9/2022 | Pieczul et al. |
| 2022/0279075 A1 | 9/2022 | Fan et al. |
| 2022/0286428 A1 | 9/2022 | Howe et al. |
| 2022/0286429 A1 | 9/2022 | Howe et al. |
| 2022/0286480 A1 | 9/2022 | Jadhav et al. |
| 2022/0286911 A1 | 9/2022 | Howe et al. |
| 2022/0294540 A1 | 9/2022 | Black et al. |
| 2022/0295440 A1 | 9/2022 | Kumar et al. |
| 2022/0309152 A1 | 9/2022 | Araujo et al. |

(56) References Cited

U.S. PATENT DOCUMENTS

| | | |
|---|---|---|
| 2022/0311767 A1 | 9/2022 | Ouellet |
| 2022/0312176 A1 | 9/2022 | Matolia et al. |
| 2022/0312299 A1 | 9/2022 | Mochizuki et al. |
| 2022/0312517 A1 | 9/2022 | Xu et al. |
| 2022/0329442 A1 | 10/2022 | Bulusu et al. |
| 2022/0329477 A1 | 10/2022 | Chiganmi et al. |
| 2022/0329495 A1 | 10/2022 | Xie et al. |
| 2022/0329585 A1 | 10/2022 | Chhabra et al. |
| 2022/0330138 A1 | 10/2022 | Shan |
| 2022/0330193 A1 | 10/2022 | Shan |
| 2022/0334864 A1 | 10/2022 | KN et al. |
| 2022/0338000 A1 | 10/2022 | Lee et al. |
| 2022/0345875 A1 | 10/2022 | Kumar |
| 2022/0353244 A1 | 11/2022 | Kahn et al. |
| 2022/0353799 A1 | 11/2022 | Talebi et al. |
| 2022/0360670 A1 | 11/2022 | Singh et al. |
| 2022/0361136 A1 | 11/2022 | Watfa et al. |
| 2022/0368726 A1 | 11/2022 | Balasubramaniam et al. |
| 2022/0369408 A1 | 11/2022 | Shariat et al. |
| 2022/0377529 A1 | 11/2022 | Kim et al. |
| 2022/0377617 A1 | 11/2022 | Deng et al. |
| 2022/0377654 A1 | 11/2022 | Soliman et al. |
| 2022/0386100 A1 | 12/2022 | Lee et al. |
| 2022/0393943 A1 | 12/2022 | Pangeni et al. |
| 2022/0394566 A1 | 12/2022 | Liu et al. |
| 2022/0400378 A1 | 12/2022 | Wang et al. |
| 2022/0408396 A1 | 12/2022 | Youn et al. |
| 2022/0413883 A1 | 12/2022 | Clebsch et al. |
| 2022/0417252 A1 | 12/2022 | Moon et al. |
| 2022/0417264 A1 | 12/2022 | Moon |
| 2022/0417286 A1 | 12/2022 | Moon |
| 2023/0007439 A1 | 1/2023 | Williams et al. |
| 2023/0007464 A1 | 1/2023 | Lee et al. |
| 2023/0007611 A1 | 1/2023 | Karampatsis et al. |
| 2023/0011468 A1 | 1/2023 | Giri et al. |
| 2023/0015603 A1 | 1/2023 | Smith |
| 2023/0018809 A1 | 1/2023 | Deshmukh |
| 2023/0019448 A1 | 1/2023 | Deshmukh et al. |
| 2023/0022134 A1 | 1/2023 | Talwar et al. |
| 2023/0023571 A1 | 1/2023 | Xing et al. |
| 2023/0024999 A1 | 1/2023 | Wu et al. |
| 2023/0027290 A1 | 1/2023 | Chen |
| 2023/0027507 A1 | 1/2023 | He et al. |
| 2023/0029714 A1 | 2/2023 | Xu et al. |
| 2023/0032790 A1 | 2/2023 | Mahajan et al. |
| 2023/0040365 A1 | 2/2023 | Raleigh |
| 2023/0040747 A1 | 2/2023 | Watfa et al. |
| 2023/0042646 A1 | 2/2023 | Mahadevan et al. |
| 2023/0044346 A1 | 2/2023 | Nuggehalli et al. |
| 2023/0052699 A1 | 2/2023 | Ninglekhu et al. |
| 2023/0052827 A1 | 2/2023 | Araujo et al. |
| 2023/0056442 A1 | 2/2023 | Ly et al. |
| 2023/0058336 A1 | 2/2023 | Kim et al. |
| 2023/0059173 A1 | 2/2023 | Moon |
| 2023/0059726 A1 | 2/2023 | Osipov et al. |
| 2023/0067223 A1 | 3/2023 | Freed et al. |
| 2023/0073757 A1 | 3/2023 | Chandramouli et al. |
| 2023/0078317 A1 | 3/2023 | Xing et al. |
| 2023/0083175 A1 | 3/2023 | Xiong |
| 2023/0094062 A1 | 3/2023 | Kim et al. |
| 2023/0098558 A1 | 3/2023 | Savir et al. |
| 2023/0109272 A1 | 4/2023 | Ryu et al. |
| 2023/0113180 A1 | 4/2023 | Srinivasan et al. |
| 2023/0113519 A1 | 4/2023 | Fernandez et al. |
| 2023/0115982 A1 | 4/2023 | Lin et al. |
| 2023/0116463 A1 | 4/2023 | Rath et al. |
| 2023/0118271 A1 | 4/2023 | Punathil |
| 2023/0129117 A1 | 4/2023 | Ding et al. |
| 2023/0130746 A1 | 4/2023 | Binder et al. |
| 2023/0133444 A1 | 5/2023 | Dimitrovski et al. |
| 2023/0135699 A1 | 5/2023 | Liao et al. |
| 2023/0136984 A1 | 5/2023 | Lee et al. |
| 2023/0138033 A1 | 5/2023 | Rajadurai et al. |
| 2023/0147538 A1 | 5/2023 | Lee et al. |
| 2023/0153447 A1 | 5/2023 | Kapadia |
| 2023/0156513 A1 | 5/2023 | Xing et al. |
| 2023/0156514 A1 | 5/2023 | Eriksson et al. |
| 2023/0163984 A1 | 5/2023 | Shan |
| 2023/0164523 A1 | 5/2023 | Wu et al. |
| 2023/0171280 A1 | 6/2023 | Bansal |
| 2023/0171824 A1 | 6/2023 | Purkayastha et al. |
| 2023/0179632 A1 | 6/2023 | Duraisamy et al. |
| 2023/0188525 A1 | 6/2023 | Singh et al. |
| 2023/0189192 A1 | 6/2023 | Talebi et al. |
| 2023/0195884 A1 | 6/2023 | Belair et al. |
| 2023/0198946 A1 | 6/2023 | Zacks et al. |
| 2023/0199017 A1 | 6/2023 | Chacko |
| 2023/0199632 A1 | 6/2023 | Talebi et al. |
| 2023/0205505 A1 | 6/2023 | Chen et al. |
| 2023/0208810 A1 | 6/2023 | Dhanasekar et al. |
| 2023/0209329 A1 | 6/2023 | Guo et al. |
| 2023/0224304 A1 | 7/2023 | Lukanov et al. |
| 2023/0231884 A1 | 7/2023 | Deshmukh et al. |
| 2023/0239270 A1 | 7/2023 | Nahas et al. |
| 2023/0239325 A1 | 7/2023 | Keiser, Jr. |
| 2023/0247003 A1 | 8/2023 | Chanak et al. |
| 2023/0247027 A1 | 8/2023 | Brar et al. |
| 2023/0247087 A1 | 8/2023 | Nagaraja et al. |
| 2023/0254318 A1 | 8/2023 | Hu et al. |
| 2023/0262030 A1 | 8/2023 | Bansal et al. |
| 2023/0262818 A1 | 8/2023 | Kim et al. |
| 2023/0269137 A1 | 8/2023 | Fehring et al. |
| 2023/0283639 A1 | 9/2023 | Melson et al. |
| 2023/0284077 A1 | 9/2023 | Pateromichelakis |
| 2023/0291735 A1 | 9/2023 | Cheethirala et al. |
| 2023/0300651 A1 | 9/2023 | Kim et al. |
| 2023/0300702 A1 | 9/2023 | You et al. |
| 2023/0309158 A1 | 9/2023 | Qiao et al. |
| 2023/0319112 A1 | 10/2023 | Kaimal et al. |
| 2023/0319679 A1 | 10/2023 | Sung et al. |
| 2023/0319685 A1 | 10/2023 | Talebi et al. |
| 2023/0319915 A1 | 10/2023 | Paladugu et al. |
| 2023/0328821 A1 | 10/2023 | Talebi et al. |
| 2023/0336471 A1 | 10/2023 | Dhody |
| 2023/0336977 A1 | 10/2023 | Henry et al. |
| 2023/0344917 A1 | 10/2023 | Chanak et al. |
| 2023/0362198 A1 | 11/2023 | Jung et al. |
| 2023/0362623 A1 | 11/2023 | Lee et al. |
| 2023/0362632 A1 | 11/2023 | Hu et al. |
| 2023/0362640 A1 | 11/2023 | Edge |
| 2023/0362704 A1 | 11/2023 | Edge et al. |
| 2023/0367833 A1 | 11/2023 | Kol et al. |
| 2023/0368193 A1 | 11/2023 | Russinovich et al. |
| 2023/0370992 A1 | 11/2023 | You et al. |
| 2023/0371111 A1 | 11/2023 | Xu et al. |
| 2023/0388785 A1 | 11/2023 | Ferdi et al. |
| 2023/0397086 A1 | 12/2023 | Kim et al. |
| 2023/0412638 A1 | 12/2023 | Dogaru et al. |
| 2023/0421478 A1 | 12/2023 | Chhabra Pankaj |
| 2023/0422149 A1 | 12/2023 | Kim et al. |
| 2024/0007983 A1 | 1/2024 | Liu et al. |
| 2024/0008130 A1 | 1/2024 | Kim et al. |
| 2024/0012674 A1 | 1/2024 | Xie et al. |
| 2024/0015567 A1 | 1/2024 | Mladin et al. |
| 2024/0022469 A1 | 1/2024 | Hu et al. |
| 2024/0022593 A1 | 1/2024 | Costa et al. |
| 2024/0048229 A1 | 2/2024 | Kumar et al. |
| 2024/0048966 A1 | 2/2024 | Suh |
| 2024/0049171 A1 | 2/2024 | Khirallah et al. |
| 2024/0056904 A1 | 2/2024 | Watfa et al. |
| 2024/0056947 A1 | 2/2024 | Watfa et al. |
| 2024/0056957 A1 | 2/2024 | Wang |
| 2024/0073249 A1 | 2/2024 | Cirello Filho et al. |
| 2024/0073252 A1 | 2/2024 | Kathpal et al. |
| 2024/0073772 A1 | 2/2024 | Gupta et al. |
| 2024/0080340 A1 | 3/2024 | Ben et al. |
| 2024/0080342 A1 | 3/2024 | Mishra et al. |
| 2024/0080730 A1 | 3/2024 | Zhang et al. |
| 2024/0080791 A1 | 3/2024 | Aghili et al. |
| 2024/0086558 A1 | 3/2024 | Jadhav et al. |
| 2024/0089291 A1 | 3/2024 | Shpilyuck et al. |
| 2024/0098089 A1 | 3/2024 | Adogla et al. |
| 2024/0104553 A1 | 3/2024 | Thorpe |
| 2024/0106821 A1 | 3/2024 | Crawford et al. |

(56) References Cited

U.S. PATENT DOCUMENTS

| | | | |
|---|---|---|---|
| 2024/0106833 A1* | 3/2024 | Ravichandran | ....... H04L 9/0894 |
| 2024/0106855 A1 | 3/2024 | Sundararajan et al. | |
| 2024/0107481 A1 | 3/2024 | Tiwari et al. | |
| 2024/0111821 A1 | 4/2024 | Dogaru et al. | |
| 2024/0114057 A1 | 4/2024 | Bjerrum et al. | |
| 2024/0129321 A1 | 4/2024 | Howe et al. | |
| 2024/0129338 A1 | 4/2024 | Azad et al. | |
| 2024/0146689 A1 | 5/2024 | Bansal et al. | |
| 2024/0147207 A1 | 5/2024 | Watfa et al. | |
| 2024/0152602 A1 | 5/2024 | Belair et al. | |
| 2024/0154970 A1 | 5/2024 | Cheethirala et al. | |
| 2024/0163308 A1 | 5/2024 | Kahn et al. | |
| 2024/0163312 A1 | 5/2024 | Azad et al. | |
| 2024/0168793 A1 | 5/2024 | Pyka et al. | |
| 2024/0169062 A1 | 5/2024 | Lee et al. | |
| 2024/0171969 A1 | 5/2024 | Kumar et al. | |
| 2024/0179066 A1 | 5/2024 | Shen et al. | |
| 2024/0179070 A1 | 5/2024 | Zhou et al. | |
| 2024/0179071 A1 | 5/2024 | Zhou et al. | |
| 2024/0179509 A1 | 5/2024 | Fu et al. | |
| 2024/0187968 A1 | 6/2024 | Tiwari et al. | |
| 2024/0187990 A1 | 6/2024 | Chen et al. | |
| 2024/0205191 A1 | 6/2024 | Vijayvargiya et al. | |
| 2024/0205863 A1 | 6/2024 | Nassar et al. | |
| 2024/0236047 A1 | 7/2024 | Filho et al. | |
| 2024/0241978 A1 | 7/2024 | Chopra et al. | |
| 2024/0244014 A1 | 7/2024 | De et al. | |
| 2024/0273211 A1 | 8/2024 | Singh | |
| 2024/0275680 A1 | 8/2024 | Palnati et al. | |
| 2024/0275803 A1 | 8/2024 | Varanasi et al. | |
| 2024/0283826 A1 | 8/2024 | Ganguli et al. | |
| 2024/0291846 A1 | 8/2024 | Saraf et al. | |
| 2024/0297881 A1 | 9/2024 | Bansal | |
| 2024/0303336 A1 | 9/2024 | Tammireddy et al. | |
| 2024/0314140 A1 | 9/2024 | Beevor | |
| 2024/0314176 A1 | 9/2024 | Varanasi et al. | |
| 2024/0323189 A1 | 9/2024 | Mihajlovic et al. | |
| 2024/0356918 A1 | 10/2024 | Darbarwar et al. | |
| 2024/0364704 A1 | 10/2024 | Darbarwar et al. | |
| 2024/0388606 A1 | 11/2024 | Mihajlovic et al. | |
| 2024/0422198 A1 | 12/2024 | Pampati et al. | |

OTHER PUBLICATIONS

Office Communication for U.S. Appl. No. 18/091,006 mailed Apr. 19, 2023, 9 Pages.
Office Communication for U.S. Appl. No. 17/954,697 mailed May 12, 2023, 5 Pages.
Office Communication for U.S. Appl. No. 18/131,151 mailed Jun. 8, 2023, 9 Pages.
Office Communication for U.S. Appl. No. 17/954,697 mailed Jan. 20, 2023, 13 Pages.
Office Communication for U.S. Appl. No. 18/094,858 mailed Mar. 16, 2023, 10 Pages.
Office Communication for U.S. Appl. No. 18/091,006 mailed Mar. 31, 2023, 12 Pages.
Office Communication for U.S. Appl. No. 17/733,735 mailed Jul. 12, 2022, 38 Pages.
Office Communication for U.S. Appl. No. 17/733,735 mailed Nov. 1, 2022, 7 Pages.
Office Communication for U.S. Appl. No. 17/889,788 mailed Nov. 7, 2022, 12 Pages.
Office Communication for U.S. Appl. No. 18/091,895 mailed Apr. 5, 2023, 12 Pages.
Office Communication for U.S. Appl. No. 18/094,858 mailed Jul. 7, 2023, 12 Pages.
Office Communication for U.S. Appl. No. 18/131,151 mailed Jul. 10, 2023, 7 Pages.
Office Communication for U.S. Appl. No. 18/094,858 mailed Sep. 19, 2023, 4 Pages.
Office Communication for U.S. Appl. No. 18/091,895 mailed Jul. 11, 2023, 9 pages.
Office Communication for U.S. Appl. No. 18/236,360 mailed Oct. 25, 2023, 12 pages.
Office Communication for U.S. Appl. No. 18/236,360 mailed Nov. 13, 2023, 2 pages.
Office Communication for U.S. Appl. No. 18/238,649 mailed Nov. 1, 2023, 13 pages.
Office Communication for U.S. Appl. No. 18/094,858 mailed Oct. 25, 2023, 7 pages.
Office Communication for U.S. Appl. No. 18/238,649 mailed Jan. 26, 2024, 11 pages.
Office Communication for U.S. Appl. No. 18/238,649 mailed Feb. 26, 2024, 4 pages.
Office Communication for U.S. Appl. No. 18/238,649 mailed Mar. 14, 2024, 5 pages.
Office Communication for U.S. Appl. No. 18/587,821 mailed May 3, 2024, 12 pages.
Office Communication for U.S. Appl. No. 18/740,622 mailed Sep. 5, 2024, 54 pages.
Jennings et al REsource Location and Discoveryu (Reload) Base Protocol, Internet Engineering Task Force (IETF), Request for Comments: RFC 6940, pp. 1-176 (Year: 2014).
Uriarte et al "Expressive Policy-Based Access Control for Resource-Constrained Devices," Special Section on Security and Privacy in Applications and Services for Future Internet of Things, IEEE Access, pp. 15-46 (Year: 2017).
Office Communication for U.S. Appl. No. 18/740,667 mailed Sep. 19, 2024, 8 pages.
Office Communication for U.S. Appl. No. 18/740,622 mailed Jan. 10, 2025, 39 pages.
Soltani et al "A New Approach to Client Onboarding using Self-Soverign Identity and Distributed Ledger," IEEE, 2018, pp. 1129-1136.
Seleznyov et al "An Access Control Model Based on Distributed Knowledge Management," IEEE Computer Society, 2004, pp. 1-4.
Office Communication for U.S. Appl. No. 18/740,667 mailed Jan. 23, 2025, 11 pages.
Office Communication for U.S. Appl. No. 18/899,488 mailed Jan. 16, 2025, 9 pages.

* cited by examiner

EVALUATING SECURITY POLICIES IN AGGREGATE

TECHNICAL FIELD

The present invention relates generally to network security, and more particularly, but not exclusively, to evaluating security policies in aggregate.

BACKGROUND

As organizations become increasingly dependent on networked environments, remote services, distributed services, or the like, managing and monitoring infrastructure access in networked environments can become both critically important and more difficult. Difficulties in managing network environments may not be new, however, interconnections among remote offices, data centers, remote employees, remote customers, and so on, have resulted in organizations relying more broadly on heterogeneous distributed networked services, or the like. Also, in some cases, the regulatory environment has been adapting to the increase in computer-based services. Accordingly, organizations may be required to comply with regulatory regimes from multiple jurisdictions related to various critical subjects, such as finance, privacy, employee rights, cross-jurisdiction taxation, and so on. The combination of the increase in reliance on distributed and networked services and ongoing changes in regulatory environments has tended to elevate the importance of managing and monitoring infrastructure access in networked environments both for operations as well as compliance with various regulatory regimes. Organizations have adapted to these requirements or conventions by deploy policy management tools that enable detailed or explicit security policies to be expressed or enforced using various policy description languages. However, some networking environments may employ many policies that may be difficult or challenging to manage. Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein.

DETAILED DESCRIPTION OF VARIOUS EMBODIMENTS

Figure 1:
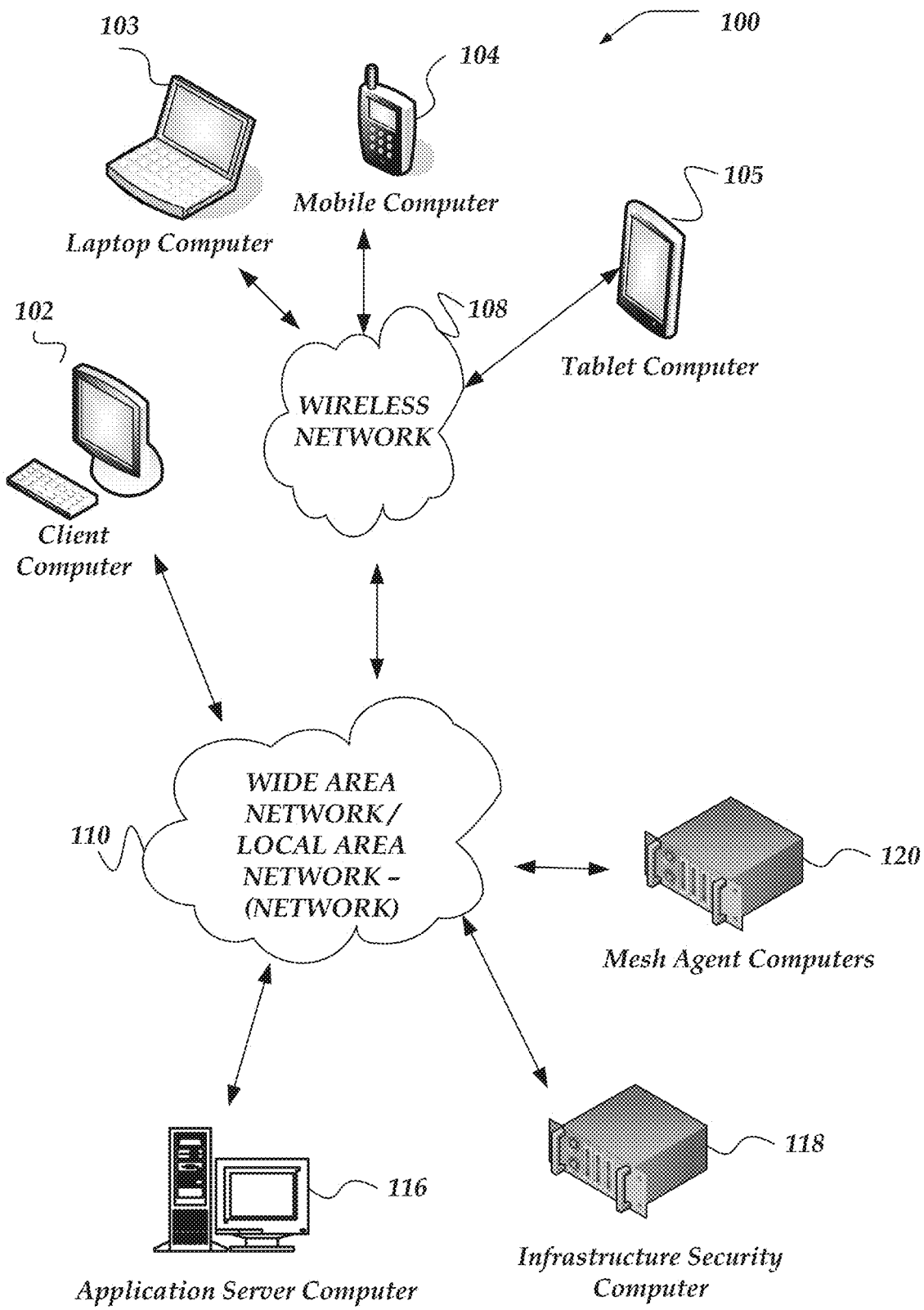
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example, embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, PHP, Perl, Python, R, Julia, JavaScript, Ruby, VBScript, Microsoft .NET™ languages such as C#, or the like. An engine may be compiled into executable programs or written in interpreted programming languages. Software engines may be callable from other engines or from themselves. Engines described herein refer to one or more logical modules that can be merged with other engines or applications or can be divided into sub-engines. The engines can be stored in non-transitory computer-readable medium or computer storage devices and be stored on and executed by one or more general purpose computers, thus creating a special purpose computer configured to provide the engine.

As used herein, the term "session" refers to a semi-permanent interactive packet interchange between two or more communicating endpoints in a networked environment. A session is set up or established at a certain point in time and torn down at a later point in time. An established communication session may involve more than one message in each direction. A session may have stateful communication where at least one of the communicating endpoints saves information about the session history to be able to communicate. A session may also provide stateless communication, where the communication consists of independent requests with responses between the endpoints. An established session is the basic requirement to perform a connection-oriented communication. A session also is the basic step to transmit in connectionless communication modes.

As used herein, the terms "network connection," and "connection" refer to an interactive packet interchange between two or more communicating endpoints, such as network devices. Connections may be established before application data is transferred, and where a stream of data is delivered in the same or different order than it was sent. The alternative to connection-oriented transmission is connectionless communication. For example, the datagram mode of communication used by the Internet Protocol (IP) and the Universal Datagram Protocol (UDP) may deliver packets out of order, since different packets may be routed independently and could be delivered over different paths. Packets associated with a TCP protocol connection may also be routed independently and could be delivered over different paths. However, for TCP connections the network communication system may provide the packets to application endpoints in the correct order.

As used herein, the term "tuple" refers to a set of values that identify a source and destination of a network communication or network traffic packet, which may, under some circumstances, be a part of a network connection. In one embodiment, a tuple may include a source Internet Protocol (IP) address, a destination IP address, a source port number, a destination port number, a virtual LAN segment identifier (VLAN ID), tunnel identifier, routing interface identifier, physical interface identifier, or a protocol identifier. Tuples may be used to identify network flows (e.g., connection flows).

As used herein, the term, "protocol" refers generally to network protocols that may be employed in a network, including data-link layer protocols, transport layer protocols, application layer protocols, or the like. Thus, unless otherwise indicated, innovations described as working with or being associated with a protocol may be applicable to protocols of various OSI layers, or the like, or combination thereof.

As used herein, the term "transport protocol" refers generally to communication protocols that may often or primarily used for carrying data for other protocols. Describing a protocol as a transport protocol may be relative to the one or more protocols that it may be carrying. For example, some conventional transport protocols such as Transmission Control Protocol (TCP) or User Datagram Protocol (UDP) may be themselves be carried in low level transport protocols, such as Internet Protocol (IP), or the like.

As used herein, the term, "application protocol" refers generally to communication protocols that may be employed in a network that enable one or more applications or services and their client applications to communicate in a networked environment. Application protocols may be considered distinct from transport protocols that may be used to ferry application protocol traffic in networks or among processes/services.

As used herein, the term "mesh agent" refers to programs, process, or services that provide a node, link, or hop in a software defined network. Multiple mesh agents may provide secure tunnels between each other to provide a secure overlay network that may be provided in a conventional underlay network. In some cases, one or more mesh agents may be hosted on network computers in a networked environment.

As used herein, the term "ingress agent" refers to a mesh agent that a client application or user gains access to an overlay network. Ingress agents may be considered mesh agents that are on a logical edge of an overlay network. For example, if a client application requires access to an overlay network to access a protected resource, the first mesh agent that the client application communicates to join or access the overlay network may be considered an ingress agent.

As used herein, the term "egress agent" refers to a mesh agent that may directly communicate with a protected resource. Egress agents may be considered mesh agents that are on a logical edge of an overlay network. For example, client requests provided by a client to an ingress agent may be forwarded through one or more mesh agents in an overlay network until they reach an egress agent associated with the target resource.

As used herein, the term "credential information" refers to data or data structures that include credential secrets that enable access to protected resource servers. For example, credential information may include usernames, passwords, pass-phrases, security certificates, or the like.

As used herein, the "activity" refers to one or more application protocols, applications, or the like. For brevity, policy containers may be described as being associated with activities. For example, a policy container may be associated with HTTP traffic while another policy container may be associated with a database application. Accordingly, in some embodiments, policies in a given policy container may be directed to enforcing policies on for a particular activity. Note, one of ordinary skill in the art will appreciate that the definition or declaration of an activity may vary depending on local requirements or local circumstances. Accordingly, in some embodiments, infrastructure security computers may provide user interfaces or configuration information that enable administrators of overlay networks to have broad authority to define or declare activities that may be relevant.

As used herein, the term "policy" refers to data or data structures that include particular instructions or declarations that may be evaluated to determine if a resource may be accessed by a client in an overlay network. Further, in some cases, policies may define one or more actions, conditions, constraints, or the like, that may be applied to interacting with resources in a network.

As used herein, the term "request" refers to data that may be directed from a client endpoint in an overlay network to a target resource in the overlay network. Requests may be considered to include data or messages that may initiate or establish transactions, sessions, actions, or the like, with target resources. In the course of a session, the different endpoints of a session may take on the role of clients or servers depending on the direction of communication or behavior of the application. Likewise, in some cases, requests may be considered part of streaming sessions and are not limited to being single requests that synchronously wait for a single response.

As used herein, the term "response" refers to data that may be directed from a target resource to a client endpoint in an overlay network. Responses may be considered to include data or messages that may initiate, establish, or complete transactions, sessions, actions, or the like, based on requests from clients. In the course of a session, the different endpoints of a session may take on the role of clients or servers depending on the direction of communication or behavior of the application. Likewise, in some cases, responses may be considered part of streaming sessions and are not limited to being single responses to a single response.

As used herein, the term "authorization request" refers to one or more data structures that encapsulate a system authorization query. Authorization requests include fields or values that conform to one or more security policy description languages or security policy declaration formats.

As used herein, the term "partial authorization request" refers to one or more data structures that encapsulate a partial authorization query. Partial authorization request may omit one or more field values such that policies may be partially evaluated in view of the field values that may be present in the partial authorization request.

As used herein, the term "authorization answer" refers to one or more data structures that represent one or more responses (e.g., answers) to authorization requests. Typically, an authorization answer may indicate if the action associated with the authorization request should be permitted or denied. The particular format of the authorization answer may depend on the particular policy enforcement protocol being employed.

As used herein, the term "aggregate authorization request" refers to one or more data structures that include one or more fields or fields for evaluating security policies in aggregate.

As used herein, the term, "configuration information" refers to information that may include rule based policies, pattern matching, scripts (e.g., computer readable instructions), or the like, that may be provided from various sources, including, configuration files, databases, user input, built-in defaults, or the like, or combination thereof. In some cases, configuration information may include or reference information stored in other systems or services, such as, configuration management databases, Lightweight Directory Access Protocol (LDAP) servers, name services, public key infrastructure services, or the like.

The following briefly describes embodiments of the invention to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to evaluating security policies in aggregate in a computing environment. In one or more of the various embodiments, an aggregate authorization request may be generated based on a query from one or more applications such that the aggregate authorization request may include one or more variable fields, a plurality of values, or the like.

In one or more of the various embodiments, a plurality policies may be determined based on the aggregate authorization request such that each policy may include one or more constraints or one or more conditions associated with enabling or disabling one or more activities in a computing environment.

In one or more of the various embodiments, the one or more variable fields may be iterated over to perform further actions, including: determining a variable field and a portion of the plurality of values that may be associated with the variable field based on the iteration; generating one or more partial authorization requests based on the aggregate authorization request, the variable field, the portion of values, or the like; evaluating the plurality of policies based on each partial authorization request such that one or more policies may be dismissed from the plurality of policies based on the evaluation and such that each dismissed policy may be determined to be unassociated with the one or more partial authorization requests; or the like.

In one or more of the various embodiments, a response to the query that includes one or more authorization answers may be generated based on each policy that remains in the plurality of policies to improve performance in generating one or more authorization answer that enables or disables the one or more activities in the computing environment.

In one or more of the various embodiments, a user interface that is dynamically arranged to display one or more resources that are accessible to a user that is declared in the query may be generated based on the response and the one or more authorization answers.

In one or more of the various embodiments, the evaluating of the plurality of policies may include: collecting one or more metrics associated with the one or more partial authorization requests based on the query from the one or more applications such that the one or more metrics include one or more of a resource count, a principal count, an action count, a user count, a count of resources associated with an enabling authorization answer, a count of users associated with an enabling answer, a count of users that are enabled to perform the one or more activities, or the like; generating a result set for the query based on the one or more metrics such that the result set may be included in the response to the query; or the like.

In one or more of the various embodiments, generating the one or more partial authorization requests may include: determining one or more the fields in the aggregated authorization request that may be associated with a concrete value; duplicating the one or more fields with each associated concrete value in the one or more partial authorization requests; generating another field in the one or more partial authorization requests that may correspond to the variable field; employing the portion of the plurality of values to iteratively associate a value from the portion of the plurality of values with the other field in the one or more partial authorization requests; or the like.

In one or more of the various embodiments, generating the aggregated authorization request may include: determining one or more fields that may be included in the aggregated authorization request based on the query and one or more field types such that the field type for each field and for each variable field is one of a principal, an action, a resource, or a context.

In one or more of the various embodiments, evaluating the plurality of policies may include: determining one or more the fields in the aggregated authorization request that may be ignorable; ignoring the one or more constraints or the one or more conditions included in each policy that may be associated with the one or more ignorable fields; or the like.

In one or more of the various embodiments, one or more portions of the plurality of values that may be associated with one of the one or more variable fields may be determined. In one or more of the various embodiments, the one or more variable fields may be sorted in an order based on a number of the one or more portions of values associated with each variable field.

Illustrated Operating Environment

FIG. 1 shows components of one embodiment of an environment in which embodiments of the innovations disclosed herein may be practiced. Not all of the components may be required to practice these innovations, and variations in the arrangement and type of the components may be made without departing from the spirit or scope of these innovations. As shown, system 100 of FIG. 1 includes local area networks (LANs)/wide area networks (WANs) —(network) 110, wireless network 108, client computers 102-105, application server computer 116, infrastructure security computer 118, one or more mesh agent computers 120, or the like.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), extensible Markup Language (XML), JavaScript Object Notation (JSON), Cascading Style Sheets (CSS), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive or send content between another computer. The client application may include a capability to send or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, application server computer 116, infrastructure security computer 118, mesh agent computers 120, or other computers.

Client computers 102-105 may further be configured to include a client application that enables an end-user to log into an end-user account that may be managed by another computer, such as application server computer 116, infrastructure security computer 118, mesh agent computers 120, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Further, client computers may be arranged to enable users to provide configuration information, policy information, or the like, to infrastructure security computer 118. Also, client computers may be arranged to enable users to display reports, interactive user-interfaces, results provided by infrastructure security computer 118, mesh agent computers 120, or the like. Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobile communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, application server computer 116, infrastructure security computer 118, mesh agent computers 120, client computers 102-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information using one or more network protocols, such Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

One embodiment of application server computer 116, infrastructure security computer 118, and mesh agent computers 120 are described in more detail below in conjunction with FIG. 3. Although FIG. 1 illustrates application server computer 116, infrastructure security computer 118, and mesh agent computers 120 each as a single computer, the innovations or embodiments are not so limited. For example, one or more functions of application server computer 116, infrastructure security computer 118, and mesh agent computers 120, or the like, may be distributed across one or more distinct network computers. Moreover, in one or more embodiments, infrastructure security computer 118 may be implemented using a plurality of network computers. Further, in one or more of the various embodiments, application server computer 116, infrastructure security computer 118, or mesh agents 120 may be implemented using one or more cloud instances in one or more cloud networks. Accordingly, these innovations and embodiments are not to be construed as being limited to a single environment, and other configurations, and other architectures are also envisaged.

Illustrative Client Computer

Figure 2:
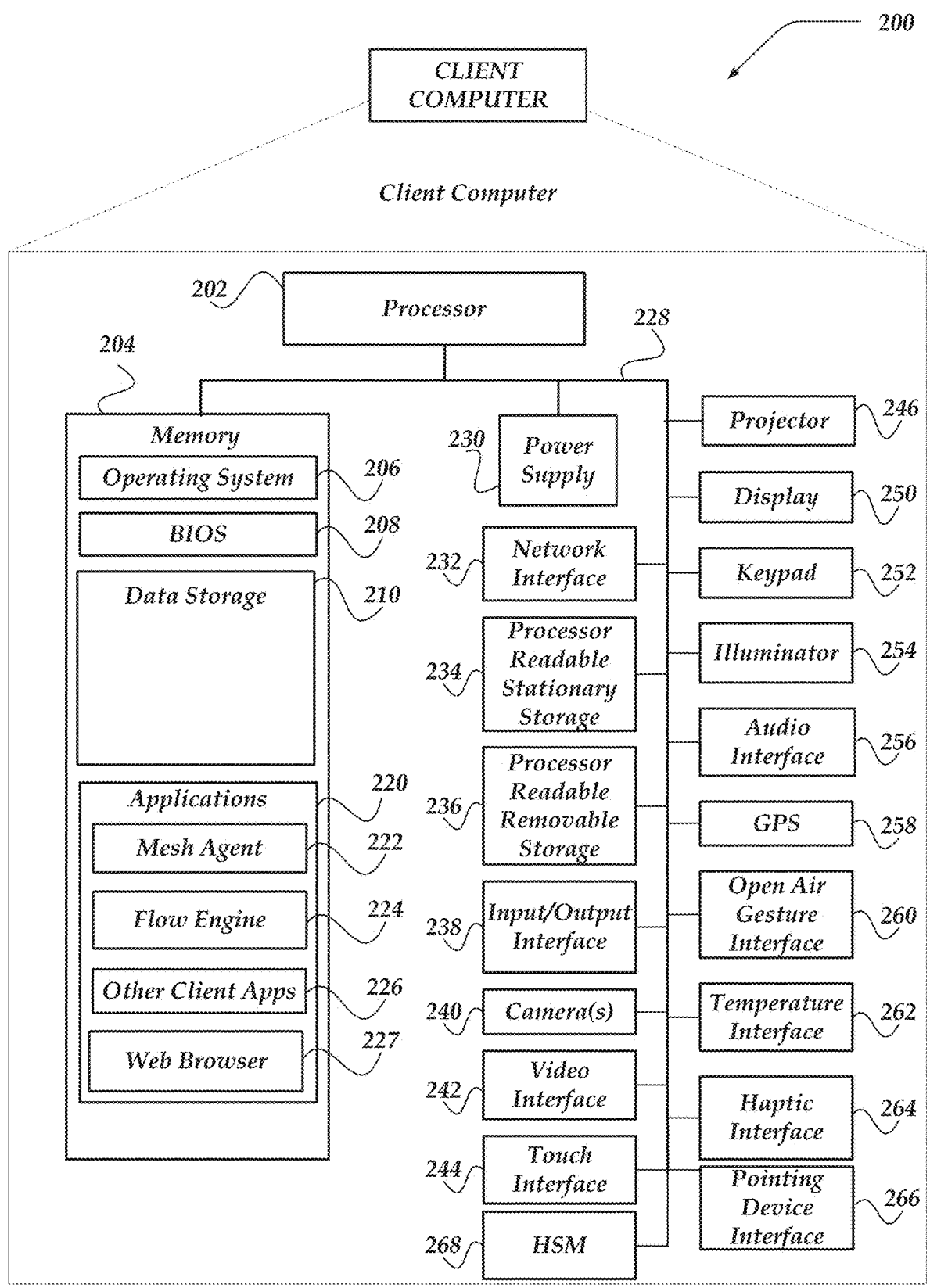
FIG. 2 illustrates a schematic embodiment of a client computer.

FIG. 2 shows one embodiment of client computer 200 that may include many more or less components than those shown. Client computer 200 may represent, for example, at least one embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 for measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (NIC).

Audio interface 256 may be arranged to produce and receive audio signals such as the sound of a human voice. For example, audio interface 256 may be coupled to a speaker and microphone (not shown) to enable telecommunication with others or generate an audio acknowledgement for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may backlight the buttons on keypad 252 and stay on while the client computer is powered. Also, illuminator 254 may backlight these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiments, however, client computer 200 may, through other components, provide other information that may be employed to determine a physical location of the client computer, including for example, a Media Access Control (MAC) address, IP address, and the like.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiment, the browser application is enabled to employ Handheld Device Markup Language (HDML), Wireless Markup Language (WML), WMLScript, JavaScript, Standard Generalized Markup Language (SGML), HyperText Markup Language (HTML), extensible Markup Language (XML), HTML5, and the like.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX®, or Linux®, or a specialized client computer communication operating system such as Windows Phone™, or the Symbian® operating system. The operating system may include, or interface with a Java virtual machine module that enables control of hardware components or operating system operations via Java application programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by processors, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include, for example, mesh agent 222, flow engine 224, other client applications 226, web browser 227, or the like. Client computers may be arranged to exchange communications, such as, queries, searches, messages, notification messages, event messages, alerts, log data, API calls, or the like, combination thereof, with application servers. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include one or more embedded logic hardware devices instead of CPUs, such as, an Application Specific Integrated Circuit (ASIC), Field Programmable Gate Array (FPGA), Programmable Array Logic (PAL), or the like, or combination thereof. The embedded logic hardware devices may directly execute embedded logic to perform actions. Also, in one or more embodiments (not shown in the figures), client computer 200 may include one or more hardware microcontrollers instead of CPUs. In one or more embodiments, the microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Network Computer

Figure 3:
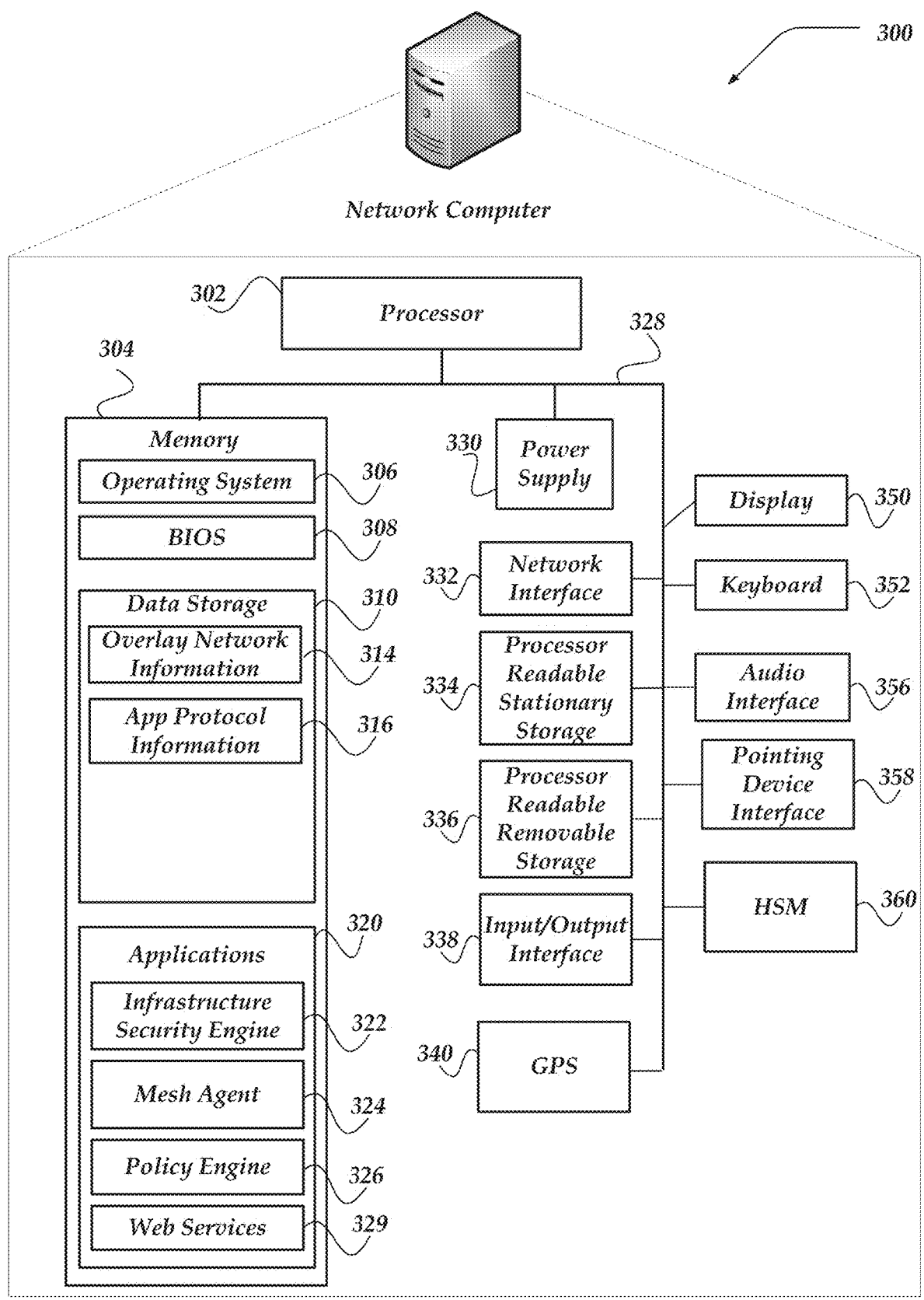
FIG. 3 illustrates a schematic embodiment of a network computer.

FIG. 3 shows one embodiment of network computer 300 that may be included in a system implementing at least one of the various embodiments. Network computer 300 may include many more or less components than those shown in FIG. 3. However, the components shown are sufficient to disclose an illustrative embodiment for practicing these innovations. Network computer 300 may represent, for example, one embodiment of at least one of application server computer 116, infrastructure security computer 118, or mesh agent computers 120 in FIG. 1.

As shown in the figure, network computer 300 includes a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgement for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geo-positioning mechanisms, including, but not limited to, tri-angulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiment, however, network computer 300 may, through other components, provide other information that may be employed to determine a physical location of the client computer, including for example, a Media Access Control (MAC) address, IP address, and the like.

In at least one of the various embodiments, applications, such as, operating system 306, infrastructure security engine 322, mesh agent 324, policy engine 326, web services 329, or the like, may be arranged to employ geo-location information to select one or more localization features, such as, time zones, languages, currencies, calendar formatting, or the like. Also, localization features may be used when interpreting network traffic, application protocols, modifying/localizing client requests, modifying/localizing server responses, user-interfaces, generating reports, monitoring infrastructure access in different regions, or the like. Localization may be employed by one or more internal processes or databases. In at least one of the various embodiments, geo-location information used for selecting localization information may be provided by GPS 340. Also, in some embodiments, geolocation information may include information provided using one or more geolocation protocols over the networks, such as, wireless network 108 or network 111.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX®, or Linux®, or a specialized operating system such as Microsoft Corporation's Windows® operating system, or the Apple Corporation's IOS operating system. Operating systems may include, or interface with a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, overlay network information 314, application protocol information 316, or the like.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include infrastructure security engine 322, mesh agent 324, policy engine 326, web services 329, or the like, that may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, infrastructure security engine 322, mesh agent 324, policy engine 326, web services 329, or the like, may be operative in a cloud-based computing environment. In one or more of the various embodiments, these applications, and others may be executing within virtual machines or virtual servers that may be managed in a cloud-based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to infrastructure security engine 322, mesh agent 324, policy engine 326, web services 329, or the like, may be provisioned and de-commissioned automatically.

Also, in one or more of the various embodiments, infrastructure security 322, mesh agent 324, policy engine 326, web services 329, or the like, may be located in virtual servers running in a cloud-based computing environment rather than being tied to one or more specific physical network computers. Likewise, in some embodiments, one or more of infrastructure security engine 322, mesh agent 324, policy engine 326, web services 329, or the like, may be configured to execute in a container-based environment.

Further, network computer 300 may also comprise hardware security module (HSM) 360 for providing additional tamper resistant safeguards for generating, storing or using security/cryptographic information such as, keys, digital certificates, passwords, passphrases, two-factor authentication information, or the like. In some embodiments, hardware security modules may be employed to support one or more standard public key infrastructures (PKI), and may be employed to generate, manage, or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include one or more embedded logic hardware devices instead of CPUs, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of CPUs. In one or more embodiments, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Logical System Architecture

Figure 4:
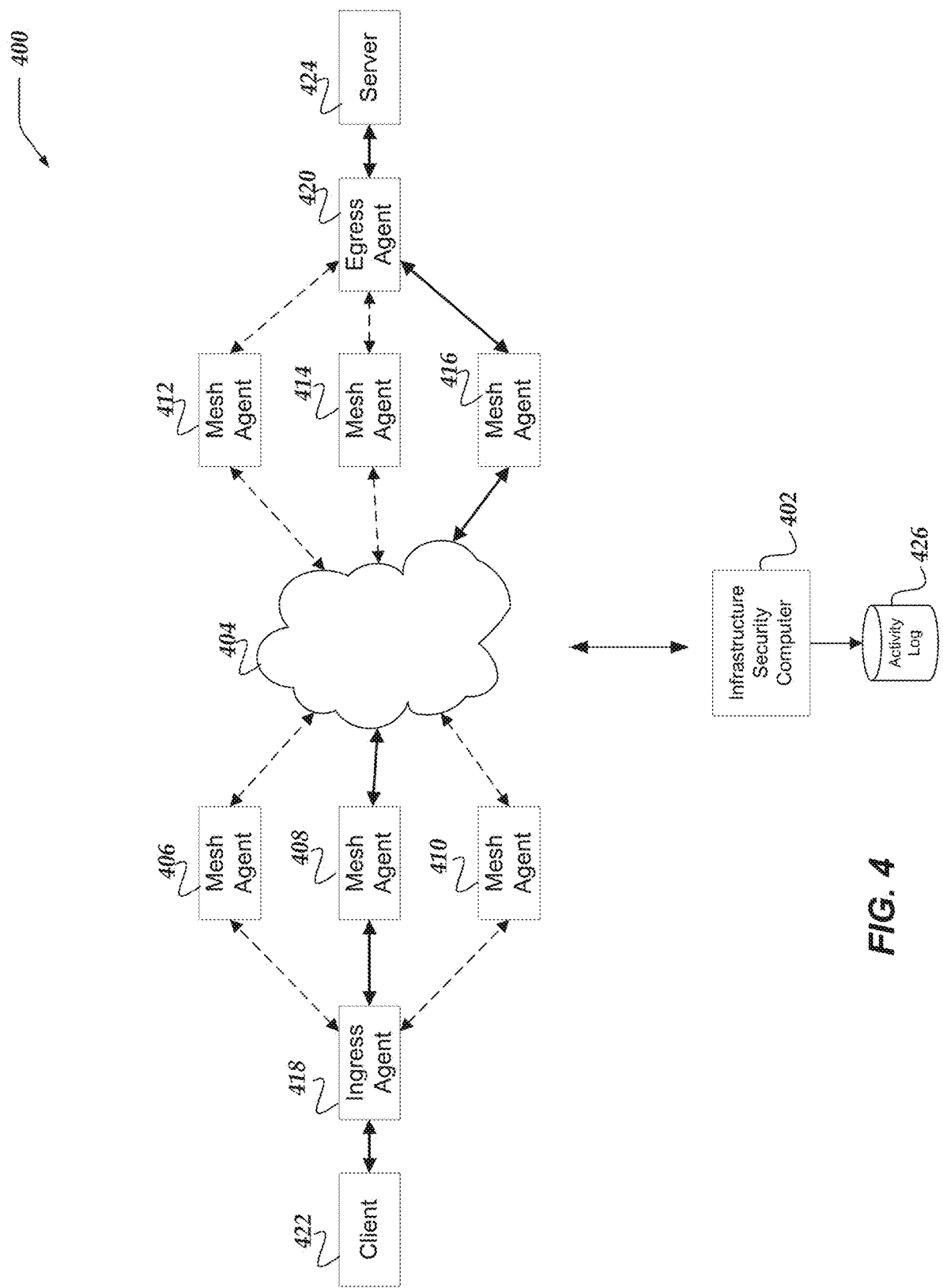
FIG. 4 illustrates a logical architecture of a system for evaluating security policies in aggregate in accordance with one or more of the various embodiments.

FIG. 4 illustrates a logical architecture of system 400 for evaluating security policies in aggregate in accordance with one or more of the various embodiments. In some embodiments, system 400 may comprise: one or more infrastructure security computers, such as, infrastructure security computer 402; one or more networks, such as, network 404; one or more mesh agents, such as, mesh agents 406-410 or mesh agents 412-416; one or more edge agents, such as, ingress agent 418 or egress agent 420; one or more clients, such as, client 422 or client 424; one or more activity log data stores, such as, activity log 426; or the like.

Note, one or more portions of system 400 illustrates a non-limiting example of a software defined network system or overlay network system. One of ordinary skill in the art will appreciate that other mesh network architectures or overlay network management schemes may be employed without departing from the scope of the innovations disclosed herein. However, the description of system 400 is sufficient for enabling one of ordinary skill in the art to understand the innovations disclosed herein.

In one or more of the various embodiments, mesh agents may be arranged to provide a software-defined overlay network that runs on one or more conventionally configured/provisioned physical (underlay) networks. In some embodiments, if a client application attempts to access resources managed by an infrastructure security service, the mesh agent used by clients to gain access to resources in a managed environment may be considered an ingress agent. Similarly, mesh agents that enable resource servers to respond to client request via the overlay network may be considered to be egress agents. Accordingly, in some cases mesh agents may be considered to be ingress agents in some contexts and they may be considered to be egress agents in other contexts. The different nomenclature is used herein as a convenience to describe features of embodiments in the different contexts.

In one or more of the various embodiments, infrastructure security computers, such as, infrastructure security computer 402, may host one or more infrastructure security engines that enforce policies for a secure overlay network that provides managed access to one or more resources (or endpoints) in a networked environment.

In one or more of the various embodiments, if a client employs a mesh agent, such as, ingress agent 418, the ingress agent may be arranged communicate with infrastructure security computer 402 to authenticate the client request and determine a network path from the client to the target resource server via the overlay network.

In some embodiments, infrastructure security computers may be arranged to authorize or enable requests based on one or more policies (e.g., security policies) that may be defined for various resources or activities in the managed network. Accordingly, in some embodiments, infrastructure security computers or other services may provide one or more tools or applications for defining or managing policies.

In one or more of the various embodiments, mesh agents may be arranged to determine a next 'hop' to a next mesh agent. Accordingly, the next mesh agent, as well as, other mesh agents, may determine the next hop to a next mesh agent. Eventually, in some embodiments, the communication or request may reach an egress agent for the target resource server. And, in some embodiments, if each intervening mesh agent validates or authenticates the client communication, the client communication may reach the intended target resource server.

In one or more of the various embodiments, if an ingress agent receives a client request, the ingress agent may send a communication to an infrastructure security computer, such as, infrastructure security computer 402 to determine one or more authorized routes through the overlay network to reach the target resource server. In some embodiments, routes through the overlay network may be considered to be overlay paths or secure tunnels that go from mesh agent-to-mesh agent until the target server may be reached.

In one or more of the various embodiments, mesh agents may establish a cryptographically secure virtual network tunnel between clients and servers such that the client/server traffic may be opaque to observers or other network devices that may be unaffiliated with the infrastructure security computer.

Note, one of ordinary skill in the art will appreciate that system 400 may comprise one or more network devices, network computers, routers, switches, or the like, that comprise the underlay network. For brevity and clarity, the underlay network components are omitted from FIG. 4.

In one or more of the various embodiments, mesh agents may be considered to be hosted on physical or virtual computers that have access to the underlay networks. Also, in some embodiments, the number of overlay network hops (between/via mesh agents) between endpoints may be different than the actual network hops required by the underlay network. For example, for some embodiments, system 400 shows one overlay hop to get from ingress agent 418 to mesh agent 408. However, in some cases, there may be multiple hops in the underlay network (not shown) to exchange network traffic between ingress agent 418 and mesh agent 408. For example, in some embodiments, one hop in the overlay network may traverse one or more sub-networks that may require multiple hops through multiple underlay network routers.

In one or more of the various embodiments, if a client provides a request to communicate with a managed endpoint (e.g., resource server 424), the corresponding ingress agent (e.g., ingress agent 418) forwards information about the request to an infrastructure security computer (e.g., infrastructure security computer 402). Accordingly, in some embodiments, an infrastructure security engine (hosted on the infrastructure security computer) may be arranged to determine if the client user has permission to communicate with the target endpoint. Also, in some embodiments, the infrastructure security engine may be arranged to determine one or more next mesh agents where the ingress agent may forward the client request. Accordingly, in some embodiments, infrastructure security engines may be arranged to generate an overlay route table that includes one or more available mesh agents that may be candidates that may be suitable and authorized for handling the communication.

In some embodiments, the communication may be forwarded to subsequent mesh agents, each intervening mesh agent may be arranged to validate and authenticate the client communication using the infrastructure security engine. In some embodiments, if the client communication may be authorized, the infrastructure security engine may provide an overlay route table that identifies one or more mesh agents for the next hop through the overlay network.

In this example, the overlay path determined for client 422 to communicate with server 424 is ingress client 418 to mesh agent 408 to mesh agent 416 to egress agent 420 and ultimately to server 424. At the final mesh agent (e.g., egress agent 420), the egress agent may determine/obtain the credentials that enable access to the server. In some embodiments, egress agents may be arranged to communicate with an infrastructure security computer to obtain credentials for a server. In this example, the connections (double-arrow lines) illustrated with solid lines represent the determined route through the overlay network. In contrast, the connections (double-arrow lines) illustrated using dashed lines represent mesh agents that may be part of the overlay network that were not selected for a particular communication between client 422 and server 424.

In one or more of the various embodiments, ingress agents, egress agents, or mesh agents may be configured to capture or record activity that may be associated with the communication through the secure tunnel. In this example, for some embodiments, activity log data store 426 represents a data store for storing logged or recorded activity for managed infrastructure. In some embodiments, infrastructure security engines may be arranged to enable different types of activity logging. In some embodiments, infrastructure security engines may be configured to record one or more of the user information associated with an action, occurrence of actions, the accompanying application payload (if any), response from servers, or the like. Further, in some embodiments, infrastructure security engines may enable log information to be forwarded to another data store for storage or archival.

In one or more of the various embodiments, infrastructure security engines may be arranged to generate authenticity tokens that may act as a fingerprint for activity that may occur during the secure tunnel session. In one or more of the various embodiments, authenticity tokens may be generated based on the payload content, user identities, client identities, or the like, that may be associated with an overlay session. For example, if the secure tunnel session includes a response to a query, the authenticity token may be generated based on a hash of the response to the query. Among other things, in some embodiments, authenticity tokens may be employed as part of a scheme to determine the authenticity activity log information that may be stored elsewhere.

Figure 5:
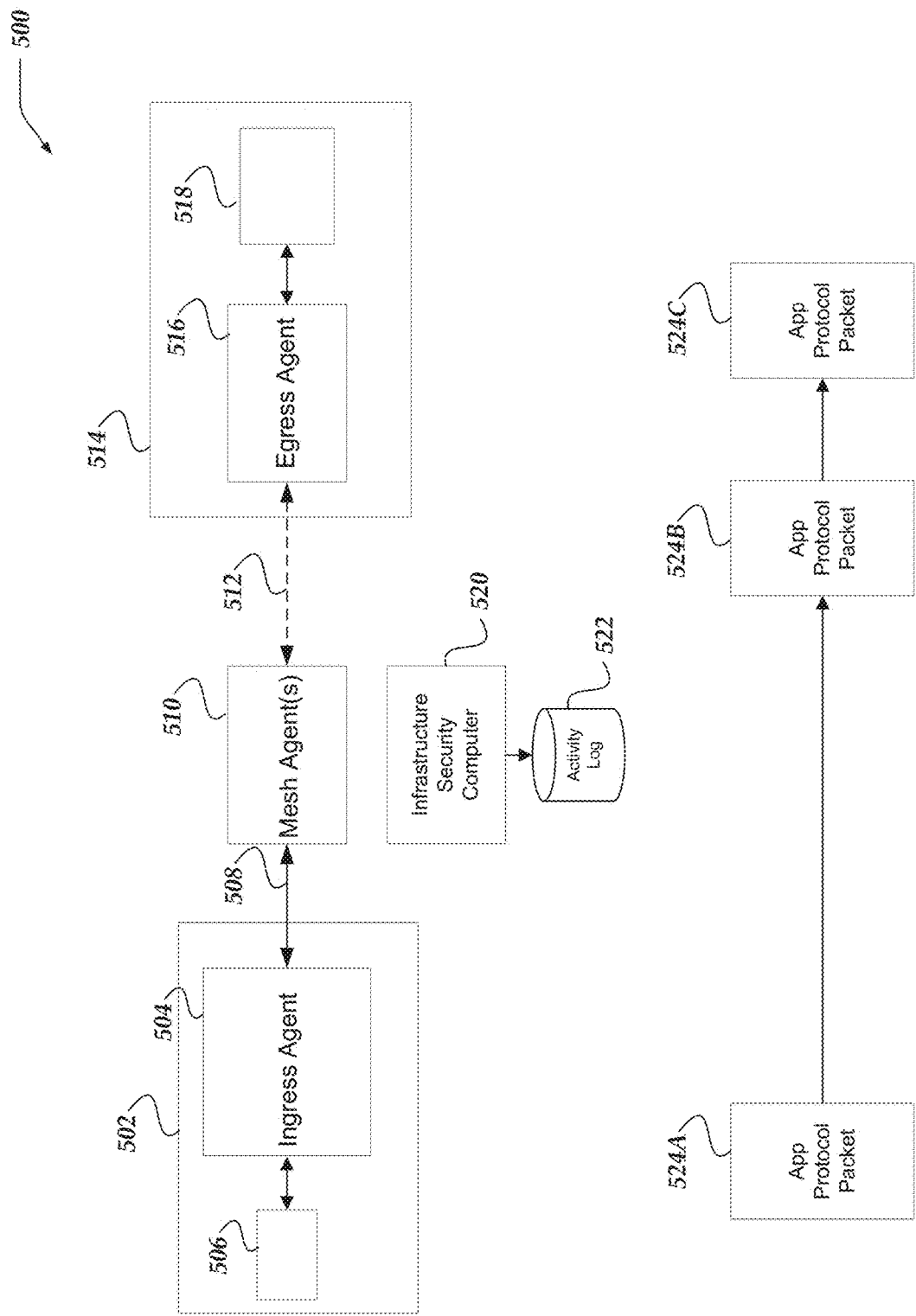
FIG. 5 illustrates a logical schematic of a system for evaluating security policies in secured networks in accordance with one or more of the various embodiments.

FIG. 5 illustrates a logical schematic of system 500 for evaluating security policies in aggregate in secured networks in accordance with one or more of the various embodiments. in this example, for some embodiments, system 500 includes client computer 502, ingress agent 504, client application 506, mesh agent(s) 510, target resource computer 514, egress agent 516, resource server 518, infrastructure security server 520, log data store 522. Note, in some embodiments, ingress agents may be considered mesh agents that a client application employs to communicate via an overlay network. Similarly, in some embodiments, egress agents may be considered mesh agents that communicate with server applications. Note, as mentioned above, ingress agents and egress agents may be considered mesh agents that provide ingress or egress of traffic in the overlay network. Thus, for brevity and clarity mesh agents may be referred to as ingress agents, egress agents, or mesh agents depending on their immediate role in an overlay communication session.

In this example, for some embodiments, network path 508 may represent communication over a single overlay network hop of a secure tunnel that may comprise one or more underlay network hops to reach the computer that is hosting mesh agent 510. Likewise, network path 512 may represent one or more overlay network hops (intervening mesh agents not shown) that reach target computer 514 and egress agent 516.

As described above, in some embodiments, mesh agents may be arranged to communicate with infrastructure security engines that may be hosted on infrastructure security computers, such as, infrastructure security computer 520. Also, in some embodiments, infrastructure security engines may be arranged to log overlay session activity into activity log data store 522.

In one or more of the various embodiments, client applications, such as client application 506 may employ one or more application protocols to communicate with resource servers, such as, resource server 518. In some embodiments, application protocols may define particular data in particular arrangements or sequences that enable client applications to communicate with associated/related server applications. In some embodiments, two or more applications or services may share the same application protocol. Also, in some embodiments, one or more applications may employ unique or custom protocols to enable communication between clients or servers. In some embodiments, servers may provide one or more APIs or interfaces that enable applications to access the servers rather than requiring dedicated/proprietary client applications. In such circumstances, a program or service configured to employ such APIs or interfaces may be considered a client application.

In some embodiments, application protocol packets originating from client applications may be provided to ingress agents and subsequently forwarded through the overlay network until they reach the egress agent. Accordingly, in some embodiments, egress agents may be arranged to function as an endpoint to the connection from the client application.

In this example, for some embodiments, application protocol packet 524A represents one or more packets of network traffic that may be sent from a client application, such as client application 506. Accordingly, the application protocol packet may be routed through the overlay network until it reaches its egress agent. In this example, application protocol packet 524B represents the application protocol packet at the egress agent for the client request. And, in this example, for some embodiments, application protocol packet 524(A, B, C) represents application protocol packets sent from an egress agent to the target resource server.

In one or more of the various embodiments, mesh agents including ingress agents or egress agents may be arranged to re-write application protocol packets to enforce one or more policies in the overlay network. For example, if an application protocol defines one or more fields for holding credential information, a policy may be provided such that egress agents may be arranged to insert the appropriate credential information into the application protocol packets before communicating them to the target resource server. Thus, in some embodiments, credential information provided by the client (if any) may be automatically replaced by other credential information determined by the egress agent as directed by its infrastructure security computer.

Accordingly, in some embodiments, egress agents may be arranged to communicate with infrastructure security computers to obtain credential instructions that declare one or more actions the egress agent may perform to obtain or activate credential information to access the target resource server. In some embodiments, egress agents may be arranged to replace the credential information included in application protocol packet 524B (if any) with credential information determined based on credential instructions provided by its associated infrastructure security computer. Further, in some embodiments, egress agents may be arranged to perform one or more 'fix-up' operations on application protocol packet 524B, such as, computing hash signatures based on packet content, adjusting packet size field values, adjusting sequence numbers, adjusting packet offset/pointer values (e.g., values that point to the location of particular values or sections in a given packet), or the like. Accordingly, in some embodiments, application protocol packet 524C represents a modified packet that includes credential information as well as other packet modifications that may be required for a particular application protocol or credential mechanism.

Figure 6:
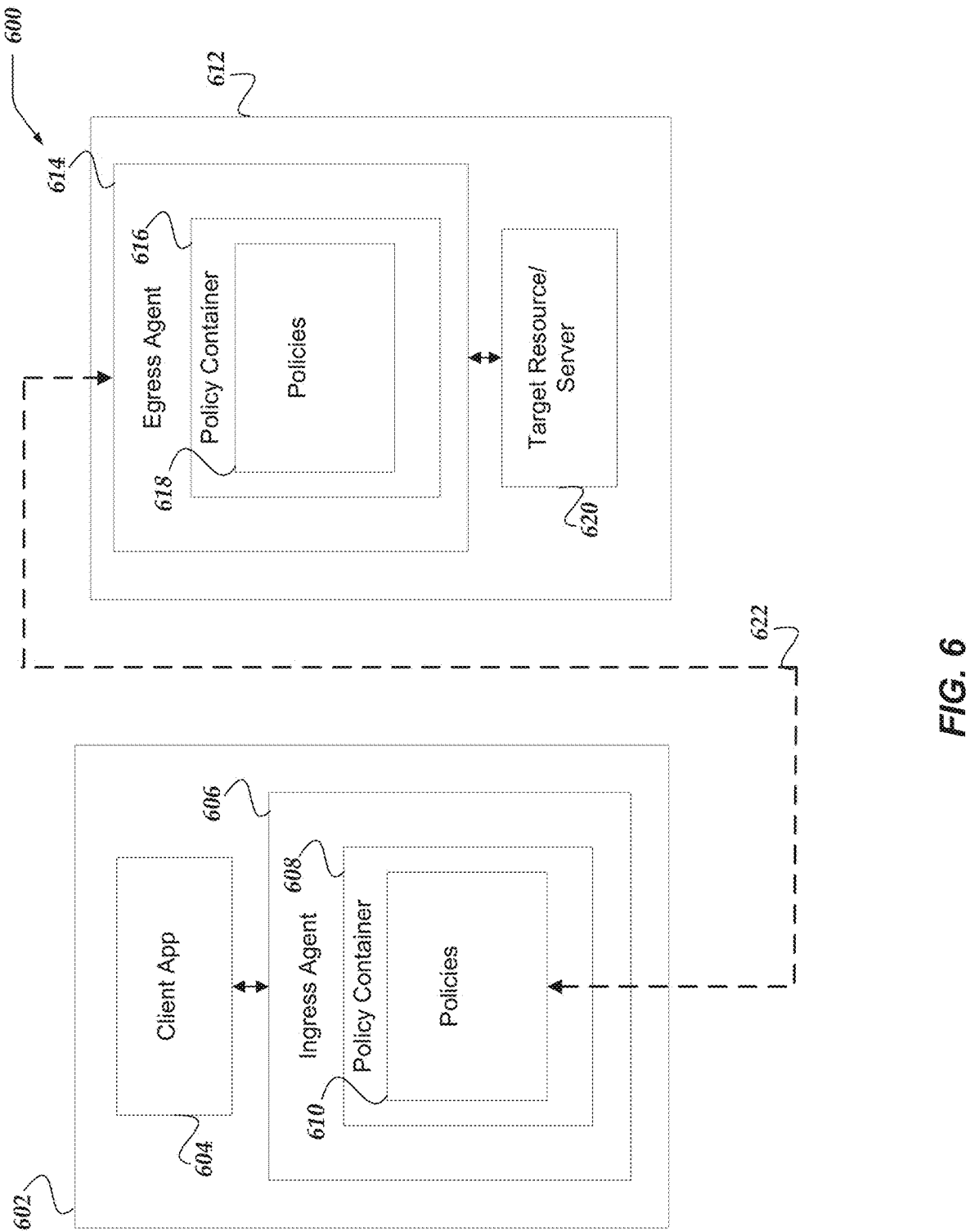
FIG. 6 illustrates a logical schematic of system for evaluating security policies in aggregate in accordance with one or more of the various embodiments.

FIG. 6 illustrates a logical schematic of system 600 for evaluating security policies in aggregate in accordance with one or more of the various embodiments. In some embodiments, systems, such as, system 600 may include client computer 602, client application 604, ingress agent 606, policy container 608, policies 610, network computer 612, egress agent 614, policy container 616, policies 618, target resource server 620, or the like. Further, in this example, path 622 represents a network connection between client computer 602 and network computer 612 as facilitated by ingress agent 606 and egress agent 614.

As described above, in one or more of the various embodiments, ingress agents and egress agents may be arranged to establish a secure network path between a client application, such as, client application 604 and target resources, such as, target resource 620.

As described above, mesh agents, including, ingress agents or egress agents may be enabled to inspect or modify network traffic exchanged between client applications and protected target resources. Accordingly, in some embodiments, mesh agents may be arranged to employ one or more policies included in policy containers that may include rules, instructions, parsers, grammars, or the like, directed to one or more application protocols that particular client applications and target resources may employ to communicate.

Herein, for brevity and clarity, network traffic, such as, traffic over connection 622 may be referred to as requests or responses such that clients may send/provide requests and target resources may send/provide responses. One of ordinary skill in the art will appreciate that the requests or responses may be part of ongoing/continuous sessions rather than being limited to strict one-for-one exchanges of requests and responses. For example, policies may be applied to data packets that comprise streaming video, streaming data, streaming audio, or the like.

In one or more of the various embodiments, particular policies for particular application protocols may be included in policy containers, such as, policy container 608 and policy container 616. In some embodiments, policy containers may be arranged to include one or more policies that declare access rules for one or more resources or network segments.

In some embodiments, policy containers may be associated with one or more application protocols, applications, or the like. For brevity, policy containers may be described as being associated with activities. For example, a policy container may be associated with HTTP traffic while another policy container may be associated with a database application. Accordingly, in some embodiments, policies in a given policy container may be directed to enforcing policies on for a particular activity. Note, one of ordinary skill in the art will appreciate that the definition or declaration of an activity may vary depending on local requirements or local circumstances. Accordingly, in some embodiments, infrastructure security computers may provide user interfaces or configuration information that enable administrators of overlay networks to have broad authority to define or declare activities that may be relevant.

Figure 7:
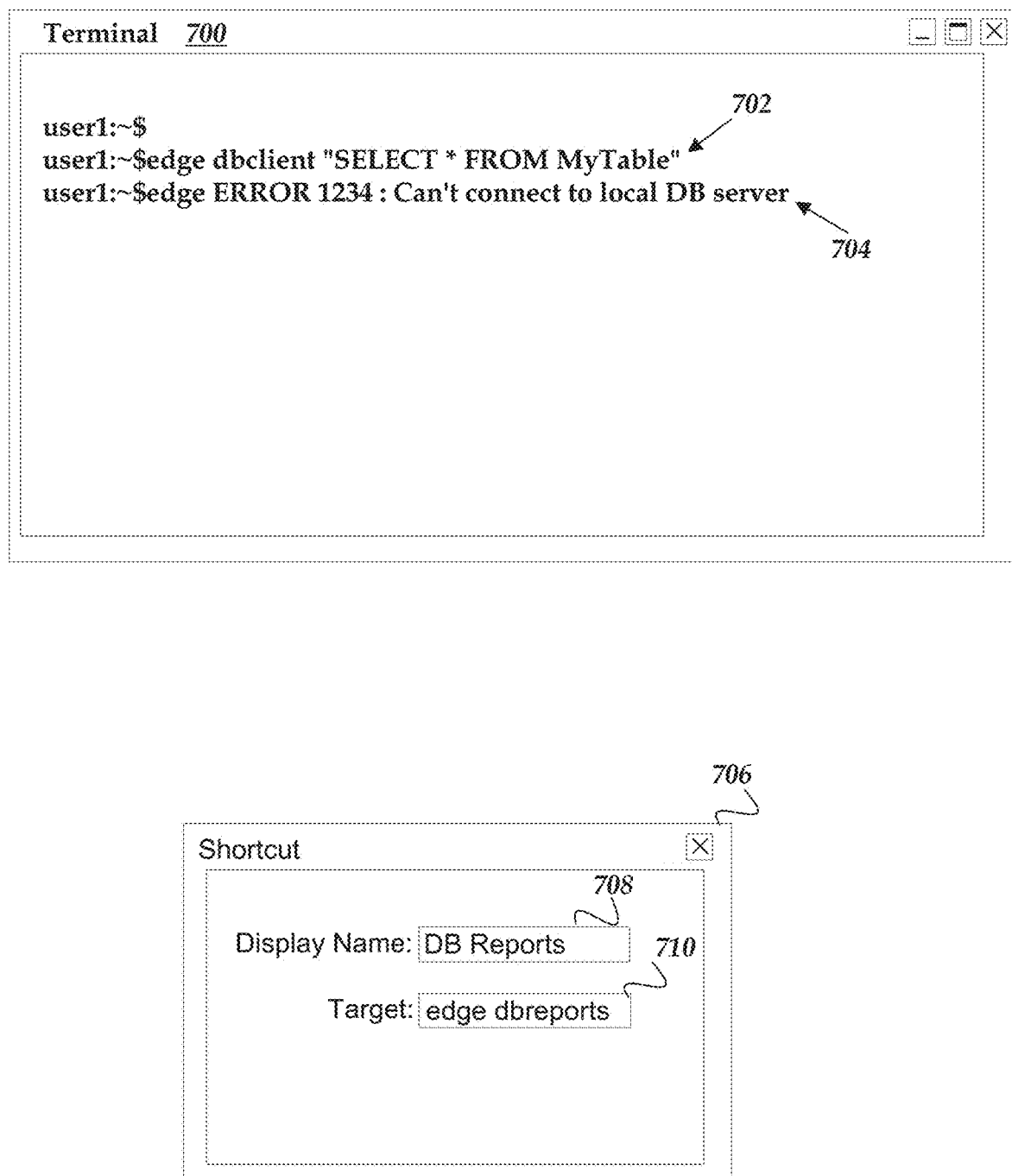
FIG. 7 illustrates a logical schematic of a terminal and shortcut 706 for evaluating security policies in aggregate in accordance with one or more of the various embodiments.

FIG. 7 illustrates a logical schematic of terminal 700 and shortcut 706 for evaluating security policies in aggregate in accordance with one or more of the various embodiments. In some embodiments, terminal 700 may represent a computer terminal application that enables users access to command-line interfaces for various applications. In this example, for some embodiments, command line 702 represents a command line that may be provided by a user. In this example, the user is attempting to retrieve data from a remote database using the program dbclient. In the example, the command 'dbclient' is shown as prefixed by the command 'edge'. Accordingly, in this example, the prefix represents a command to employ an ingress agent to execute the dbclient. Accordingly, in this example, rather than routing the dbclient command via the conventional underlay network, the ingress agent may capture the execution of dbclient and employ the overlay network to establish a secure tunnel for the requested operation.

Similarly, in some embodiments, shortcut 706 illustrates how a shortcut for a GUI based operating system or window manager may be configured to route commands initiated from a desktop (e.g., mouse-clicks) through secure tunnels in the overlay network. In this example, shortcut 706 includes an application display name, such as, display name 708 and a launch/execution command represented by target 710. Thus, in this example, shortcuts may be configured to enable launched applications to access the overlay network.

Note, often client applications may support users providing server identifiers (e.g., URIs, IP addresses, hostnames, or the like) that declare the server that for the client application. For example, a conventional command to launch a dbclient application may include the hostname where the database server of interest is located. However, for resources in the overlay network, the infrastructure security engines may determine the location of the server.

Figure 8:
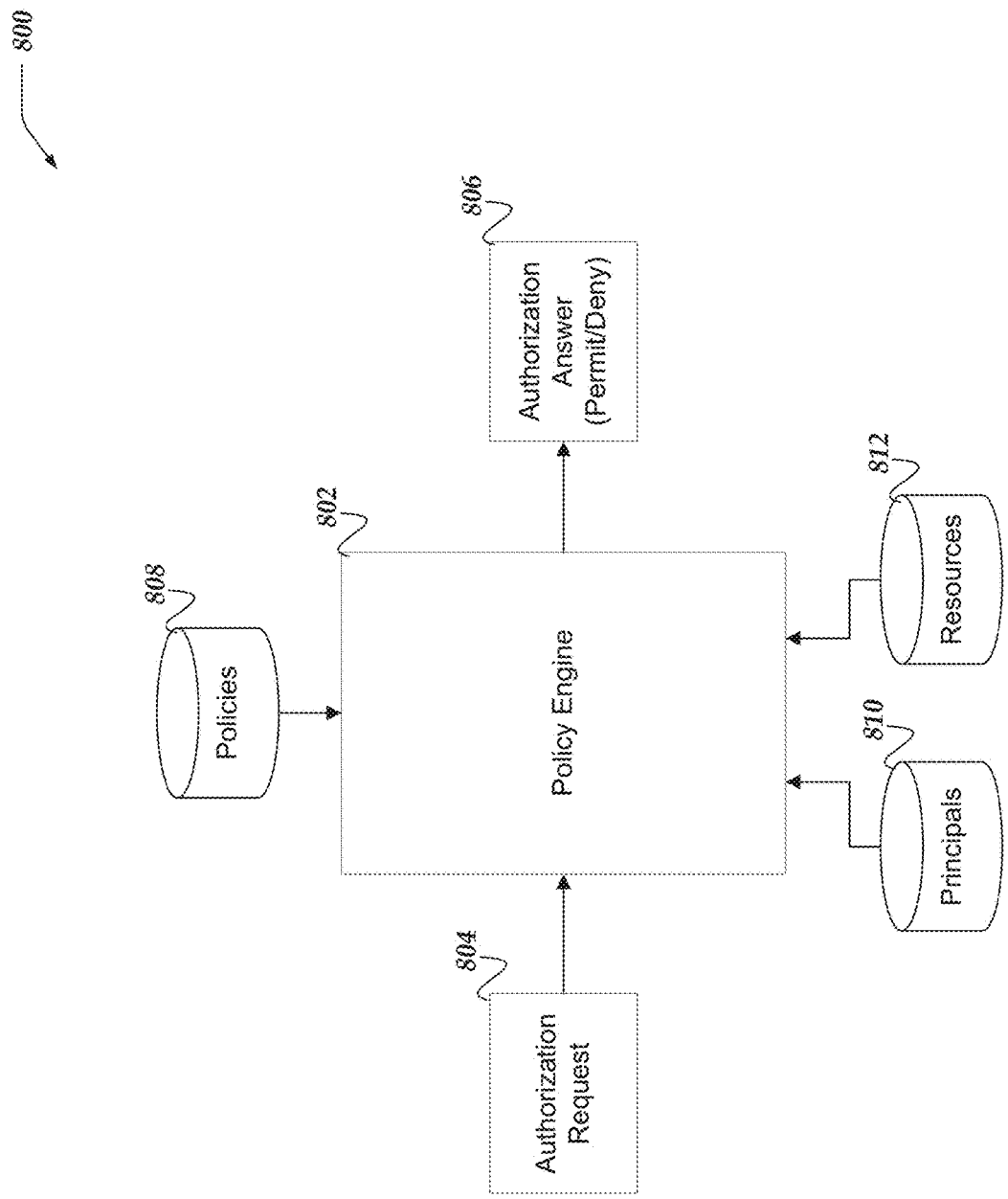
FIG. 8 illustrates a logical schematic of a system for evaluating security policies in aggregate in accordance with one or more of the various embodiments.

FIG. 8 illustrates a logical schematic of system 800 for evaluating security policies in aggregate in accordance with one or more of the various embodiments.

As described above, an important feature of infrastructure security is determining if actions may be authorized by a valid security policy. Accordingly, in some embodiments, mesh agents or other infrastructure security services may be configured to issue authorization requests to obtain or confirm authorization to enable the performance of various actions in a secured network environment. In general, for some embodiments, the particular actions or resources protected by authorization or security policies may be arbitrary depending on local requirements or local circumstances. Accordingly, in some embodiments, infrastructure security computers may employ policy engines, or the like, to enforce policies. In some cases, users or applications may submit authorization requests against many policies defined by organizations. For example, in some embodiments, infrastructure security computers or mesh agents may be arranged to submit authorization requests to policy engines to determine if users or services may access protected resources or perform protected actions.

Further, in some embodiments, policy engines may be arranged to provide one or more user interfaces that enable users (e.g., administrators) to investigate or manage the policies that may be or may not be active or associated with particular users, resources, activities, or the like. For example, such investigations may include generating interactive reports that show the which users have access to particular resources to perform particular actions.

In some embodiments, policy engines, such as policy engine 802 may be incorporated into infrastructure security computers, mesh agents, or other applications. In some embodiments, policy engines may be arranged to provide one or more interfaces or APIs that enable applications or services to independently submit authorization requests. Also, one of ordinary skill in the art will appreciate that policy engines as described herein are not limited to operating with infrastructure security computers or mesh agents. Accordingly, in some embodiments, other applications or services may be configured to access policy engines for administering, processing, evaluating authorization requests, or the like.

In some embodiments, policy engine clients (e.g., mesh agents, infrastructure security computers, policy management programs, or the like) may submit one or more authorization requests, such as authorization request 804 to policy engines, such as policy engine 802. Accordingly, in some embodiments, policy engines may be arranged to evaluate the authorization requests and provide authorization answers, such as authorization answer 806. Typically, in some embodiments, authorization answers may indicate if the actions associated with the authorization requests may be permitted or denied. In some cases, for some embodiments, authorization answers may include error reports related to the handling or processing of the authorization request. Also, in some embodiments, authorization answers may include requests for additional information. The particular format or contents of authorization answers may vary depending on the particular security policy protocol being used. In some embodiments, policy engines may be arranged to employ rules, parsers, libraries, or the like, for conforming requests or policy definitions to particular security policy protocols that may be provided from configuration information to account for local requirements or local circumstances.

In some embodiments, policy engines may be arranged to attempt to match authorization requests with one or more policies that may be associated with a protected environment. In this example, data store 808 represents a collection of security policies. Also, in some embodiments, for some security policy protocols authorization requests may be accompanied with a set of relevant policies. For example, an authorization request may be configured to include (or reference) one or more policies that may be relevant to the authorization request. Also, in some embodiments, policy engines may be configured to attempt to match authorization requests with security policies stored in data stores, such as data store 808.

Further, in some embodiments, policy engines may be arranged to employ other data stores that include information that may be useful or required for evaluating authorization requests. In this example, for some embodiments, policy engine 802 may be configured to employ data store 810 that defines principals that may be associated with policies where principals may represent the actors (e.g., users) associated with authorization requests. Similarly, in some embodiments, policy engines may be arranged to employ data stores, such as data store 812 for storing information about the resources that may be included in the protected environment.

Also, in some embodiments, principals or resources may be provided to policy engines with the authorization requests. Likewise, in some embodiments, authorization requests may include references to one or more data sources for obtaining information about principals or resources associated with authorization requests.

Figure 9:
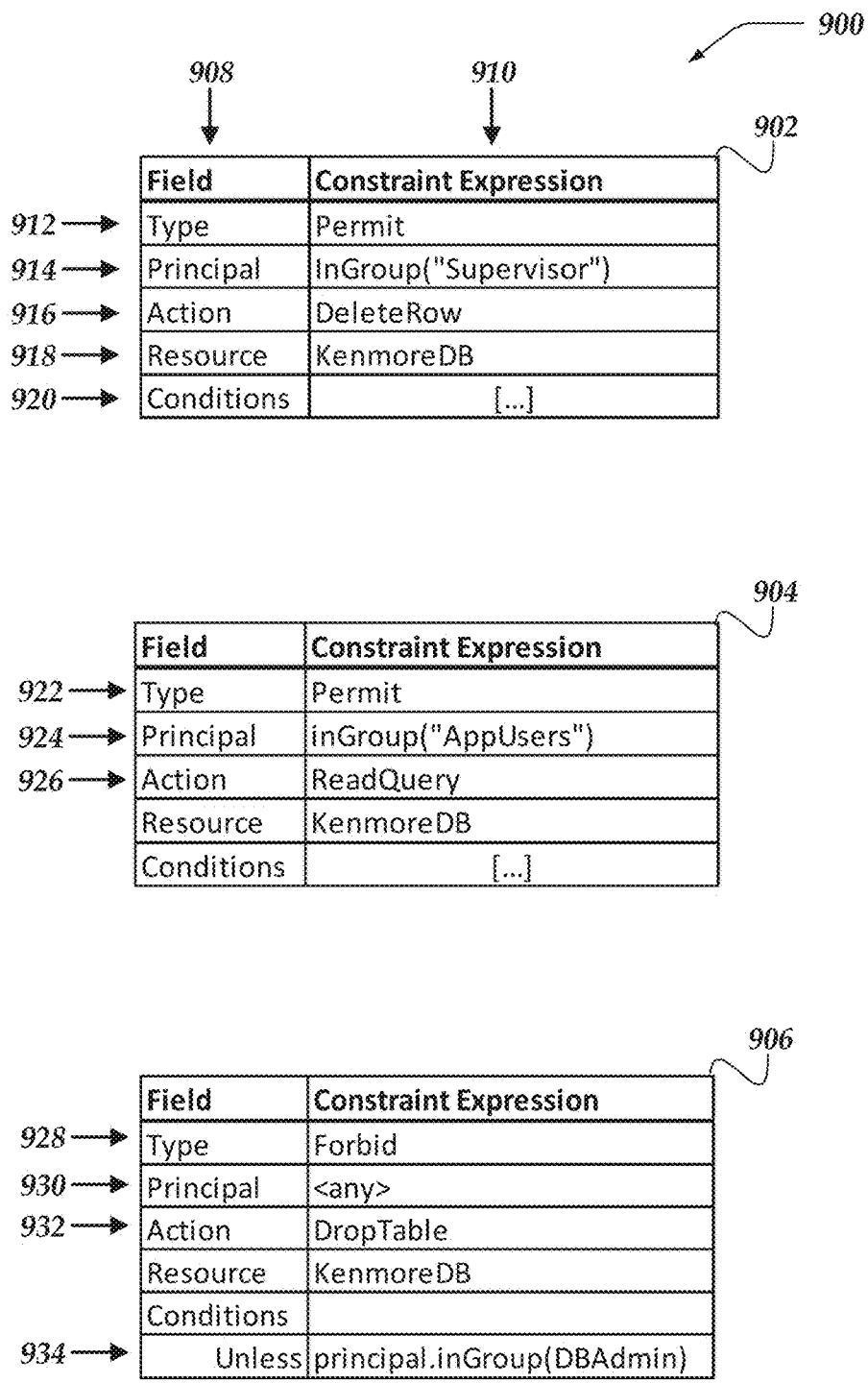
FIG. 9 illustrates logical schematic of policies for evaluating security policies in aggregate in accordance with one or more of the various embodiments.

FIG. 9 illustrates logical schematic of policies for evaluating security policies in aggregate in accordance with one or more of the various embodiments.

As mentioned above, infrastructure security computers, or the like, may be provided with one or more authorization policies (or security policies) that enable organizations to manage access to resources in a protected environment. Further, in some embodiments, authorization policies may be configured to manage particular actions or activities directed to particular resources. Also, in some embodiments, authorization policies may be arranged to declare one or more conditions, constraints, or the like, that may influence authorization determinations.

In this example, for some embodiments, three different authorization policies are represented as authorization policy 902, authorization policy 904, or authorization policy 906. Note, for brevity or clarity the authorization policies represented herein are declared using terms or formats that may appear similar to one or more conventional security policy languages (e.g., Cedar Policy Language). However, one of ordinary skill in the art will appreciate that the innovations disclosed herein anticipate that policy engines may support a variety of different policy description/enforcement languages. Accordingly, in some embodiments, policy engines may be arranged to employ one or more rules, instructions, parsers, libraries, or the like provided via configuration information to interpret various policy languages. Accordingly, in some embodiments, policy engines may be arranged to be adaptable to other conventional or custom policy description languages to account for local requirements, local circumstances, or technological advances/changes in the field without departing from the scope of the disclosed innovations.

In some embodiments, policy engines may be arranged to employ various data structures for representing authorization policies. Here, in this example for clarity or brevity, authorization policies may be represented using table-like structures. However, one of ordinary skill in the art will appreciate that other data structures may be used. Further, for brevity, the data structures that represent authorization policies may be referred to herein as authorization policies, security policies, or policies.

Accordingly, in this example, for some embodiments, authorization policies may include columns such as column 908 for representing the field labels included in authorization policies or column 910 for storing field values for the fields of authorization policies. Similarly, while not referenced here explicitly, it should be assumed that authorization policy 904 or authorization policy 906 include the same or similar columns as policy 902.

In some embodiments, authorization policies may include one or more rows for storing policy information. Accordingly, in this example, for some embodiments, rows may include: row 912 for declaring that a policy is a Permit policy or a Forbid policy; row 914 for declaring one or more Principals that a policy may be directed towards; row 916 for declaring one or more Actions that a policy may be directed towards; row 918 for declaring one or more Resources that a policy may be directed towards; row 920 for declaring one or more conditions that may be applicable to a policy; or the like.

In this example, for some embodiments, policy types as declared in row 912 may determine if a satisfying a policy permits an action or denies an action. In this example, the policy description language may be assumed to enable permit policies or forbid policies. However, one of ordinary skill in the art will appreciate that other policy description languages may enable other types or may label the available policy differently than other policy description languages.

In this example, for some embodiments, policy principals as represented here by row 914 represent the persons or services that the policy acts on. For example, for some embodiments, policy 902 may be considered to declare that it applies to users or services that are included in a group labeled Supervisor.

In this example, for some embodiments, policy actions as shown in row 916 represent one or more particular actions that may be applicable to the policy. For example, for some embodiments, policy 902 may be considered to apply to an action defined as DeleteRow. Note, in some embodiments, the particular action definitions may be considered arbitrary based on the applications, services, resources, or the like, that a policy may be designed for. For example, policies designed to protect databases may include actions associated with various database associated activities such as, deleting tables, creating tables, modifying the contents of tables, reading data from tables, or the like.

In this example, for some embodiments, policy conditions (e.g., row 920) may include one or more conditional expressions that may be evaluated to determine if a policy is relevant. For example, a first policy may be defined to operate during office hours while another may be defined to operate after normal business hours or weekends. Accordingly, in some embodiments, if the condition expressions evaluate to a true result, the associated policy may be considered applicable. In some embodiments, the particular conditions or constraints may be considered more or less arbitrary. For example, in some embodiments, conditions may include, source/target network address, time-of-day, geographic location, or the like. Generally, in some embodiments, policy engines may be arranged to support logical conditional expressions that include terms or values that may be relevant to the policy.

Also, in this example, for some embodiments, authorization policy 904 illustrates another policy. In this example, row 922 indicates that policy 904 is a permit policy, row 924 indicates that policy 904 is applicable to principals included a group labeled AppUsers, row 926 indicates that the actions associated with policy 904 is an action labeled ReadQuery.

Similarly, in this example, for some embodiments, authorization policy 906 illustrates another policy. In this example, row 928 indicates that policy 906 is a Forbid policy, row 930 indicates that policy 906 may be applicable to any principal (e.g., any user), row 932 indicates that policy 906 is applicable to actions labeled as DropTable, row 934 indicates that policy 906 include a condition that must be satisfied for policy 906 to be applicable. (Here row 934 indicates that policy 906 does not apply to principals (e.g., users or services) that may be included in a group labeled DBAdmin. Thus, in this example, policy 906 forbids (e.g., denies) all principals from performing actions labeled DropTable (e.g., dropping tables from a database) on a resource labeled KenmoreDB UNLESS the principal is included in the group labeled DBAdmin. Note, in this example, while policy 906 does not forbid principals in the DBAdmin from executing DropTable actions it may not expressly permit DropTable actions by DBAdmins depending on the policy description language or policy protocols that may be in force. For example, some security policy protocols may require one or more explicit permit policies to be satisfied to enable actions for protected resources. However, the behavior of different security policy protocols or policy description languages is beyond the scope of these innovations. Accordingly, one of ordinary skill in the art may appreciate that policy engines may be adaptable to different security policy protocol or policy description languages based on rules, libraries, instructions, or the like, provided via configuration information to account for local circumstances or local requirements.

Figure 10:
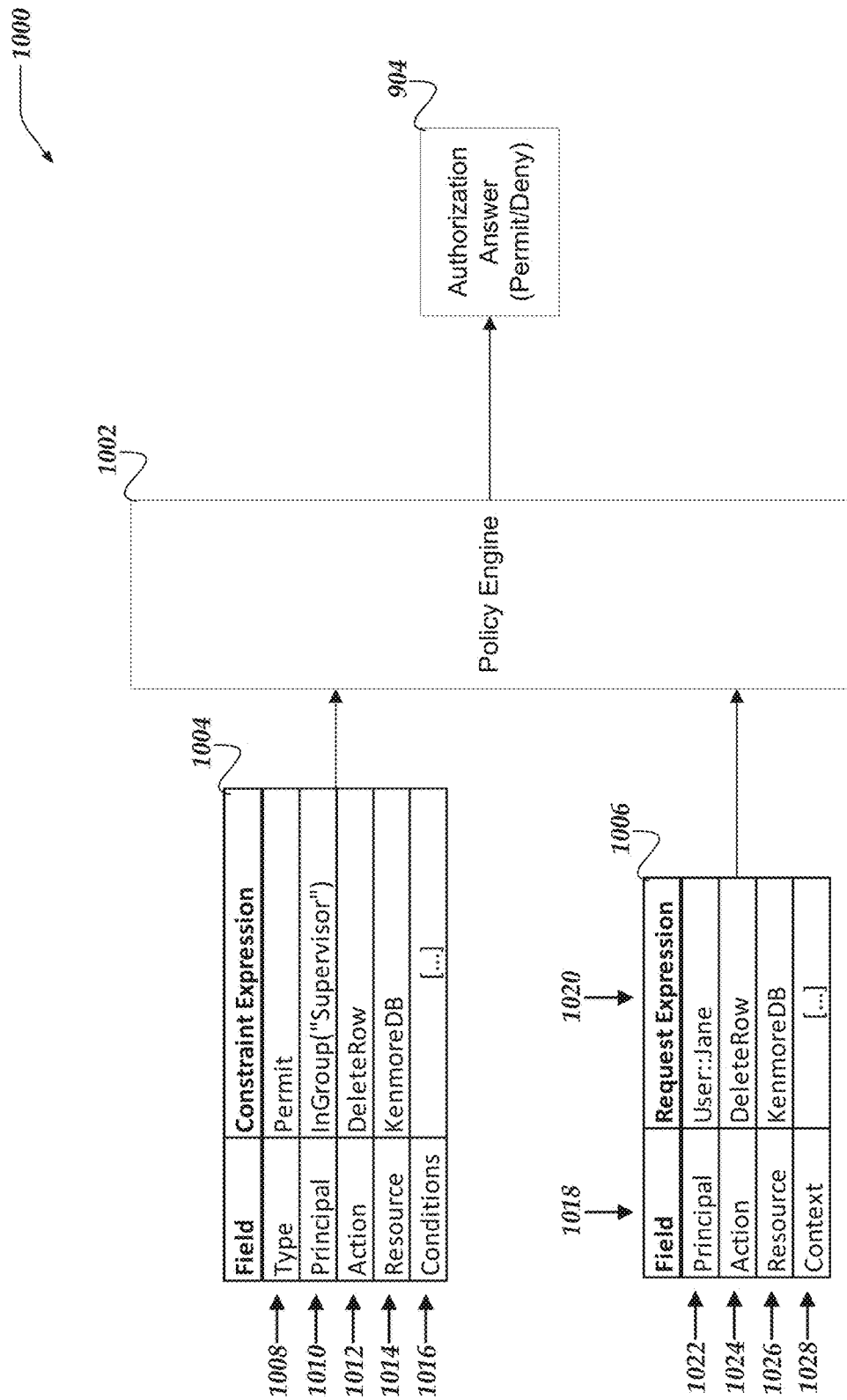
FIG. 10 illustrates a logical schematic of a system for evaluating security policies in aggregate in accordance with one or more of the various embodiments.

FIG. 10 illustrates a logical schematic of system 1000 for evaluating security policies in aggregate in accordance with one or more of the various embodiments. As described above, organizations may employ policy engines, or the like, to establish or enforce one or more authorization policies. Accordingly, in some embodiments, applications operating in a managed security environment may be enabled to submit authorization requests to policy engines. Note, such applications may include mesh agents that may submit authorization requests as a normal or regular part of managing activity in the managed network environment. Accordingly, in some embodiments, policy engines may be arranged to determine if one or more authorization policies may be applicable to authorization requests. In some embodiments, authorization requests may include or reference the particular authorization policy of interest. Further, in some embodiments, policy engines may be embedded or included in one or more mesh agents, including ingress agents or egress agents such that the mesh agents may employ policy engines to authorize activity in the managed network.

In some embodiments, applications (including mesh agents) may provide authorization requests to policy engines via one or more APIs or interfaces. Also, in some embodiments, infrastructure security computers or other security administration applications may provide one or more user interfaces that enable users to submit authorization requests to evaluate existing authorization policies. For example, in some embodiments, a security administrator may generate or submit an authorization request directly from a user interface. Accordingly, in this example, the administrator may observe if the authorization request may be denied or permitted given the existing authorization policies.

In this example, for some embodiments, policy engine 1002 may evaluate if authorization policy 1004 permits or denies authorization of authorization request 1006. In some embodiments, authorization policy 1004 may be considered similar to authorization policy 902 in FIG. 9 such that it may include rows such as: row 1008 for declaring that a policy is a Permit policy or a Forbid policy; row 1010 for declaring one or more principals that the policy may be directed towards; row 1012 for declaring one or more actions that the policy may be directed towards; row 1014 for declaring one or more resources that a policy may be directed towards; row 1016 for declaring one or more conditions that may be applicable to a policy; or the like.

Further, as mentioned above, policy engines may perform various actions to match authorization policies with authorization requests. In some cases, policy engines may be configured to maintain a database of active authorization policies that may be examined to determine if they may apply to particular authorization requests. For example, in some embodiments, authorization policies may be managed by infrastructure security computers, or the like, to establish a set of policies for managing network environments for organizations. In other cases, in some embodiments, applications making authorization requests may determine the one or more relevant authorization policies and include or reference them in the authorization requests.

In this example, for some embodiments, policy engine 1002 is being employed to evaluate authorization request 1006 against authorization policy 1004.

In this example, authorization request 1006 may be considered a data structure that includes information performing an authorization request that conforms to one or more policy description languages or security policy protocols. In this example, column 1018 represents the field labels of the various fields in the authorization request. Also, in some embodiments, column 1020 represents the request expressions for the different fields of the authorization request. Accordingly, in this example, row 1022 declares a principal (e.g., a user) that may be associated with request; row 1024 may declare an action/activity identifier associated with the authorization request; row 1026 may declare an identifier representing a resource associated with the authorization request; row 1028 may declare additional context information that may be supplied with the authorization request. Note, in this example, the identifiers for principals, actions, or resources may be considered to be simplified for brevity or clarity. In production environments, for some embodiments, identifiers for various constituents of authorization policies or authorization requests may be expressed using formats, styles, or values that conform to one or more policy description languages supported by the policy engine. Also, in some embodiments, context information, such as may be included in row 1028 may include one or more subfields that may be supplied by the process, application, or service that may initiate the authorization request. For example, in some embodiments, context information may include network addresses, geographic location information, user agent/client application information, or the like. Generally, the subfields included in a context field may be arbitrary depending on the purpose, source, or target of the authorization request.

In this example, in plain language, authorization request 1006 may be provided by an application that is requesting authorization for a user named Jane to delete one or more rows from a database named KenmoreDB. Further, in this example, for some embodiments, policy engine 1002 may be arranged to determine that authorization policy 1004 matches authorization request 1006. In some embodiments, authorization request may match an authorization policy if the principals, actions, resources, and conditions (if any) of the policy match with the principals, actions, resources, and context information included in the authorization request.

In this example, row 1022 declares that the principal associated with authorization request is a single user. However, just as principals in authorization policies may be defined to represent more than one user or entity, principals in authorization request may represent more than one user or more than class of users. For example, in some embodiments, principals in authorization policy or authorization requests may be declared to include any user, any user that is a member of particular group, or users that have particular attributes, depending on the capabilities of the underlying policy description language that is being used. Similarly, in some embodiments, multiple activities may be associated with the declared action. For example, action declarations in authorization policies or authorization requests may correspond to a class of activity rather than a single activity. Likewise, in some embodiments, resources may be defined to represent more than one resource. In some embodiments, the particular syntax or formatting may vary depending on the policy description language that may be supported.

Accordingly, in some embodiments, policy engines may be arranged to compare authorization requests with one or more matched authorization policies to evaluate if the action (s) identified in request may be performed on the identified resource(s) by the identified principal(s). In this example, if User:Jane is a member of the user group "Supervisors" (and assuming relevant conditions, if any, are met), policy engine 1002 may respond with an authorization answer, such as authorization answer 1030 that permits the action.

In some cases, for some embodiments, if an authorization request does not match with an authorization policy, policy engines may be configured to return neither permit nor deny. In accordance with some policy description languages or security protocols, at least one authorization policy should be evaluated to Permit to authorize a request. Likewise, a single authorization policy that resolves to Forbid may deny the authorization request even if one or more other authorization policies may allow the authorization request. One of ordinary skill in the art will appreciate that other policy description languages or security policy protocols may employ different authorization rules.

Figure 11:
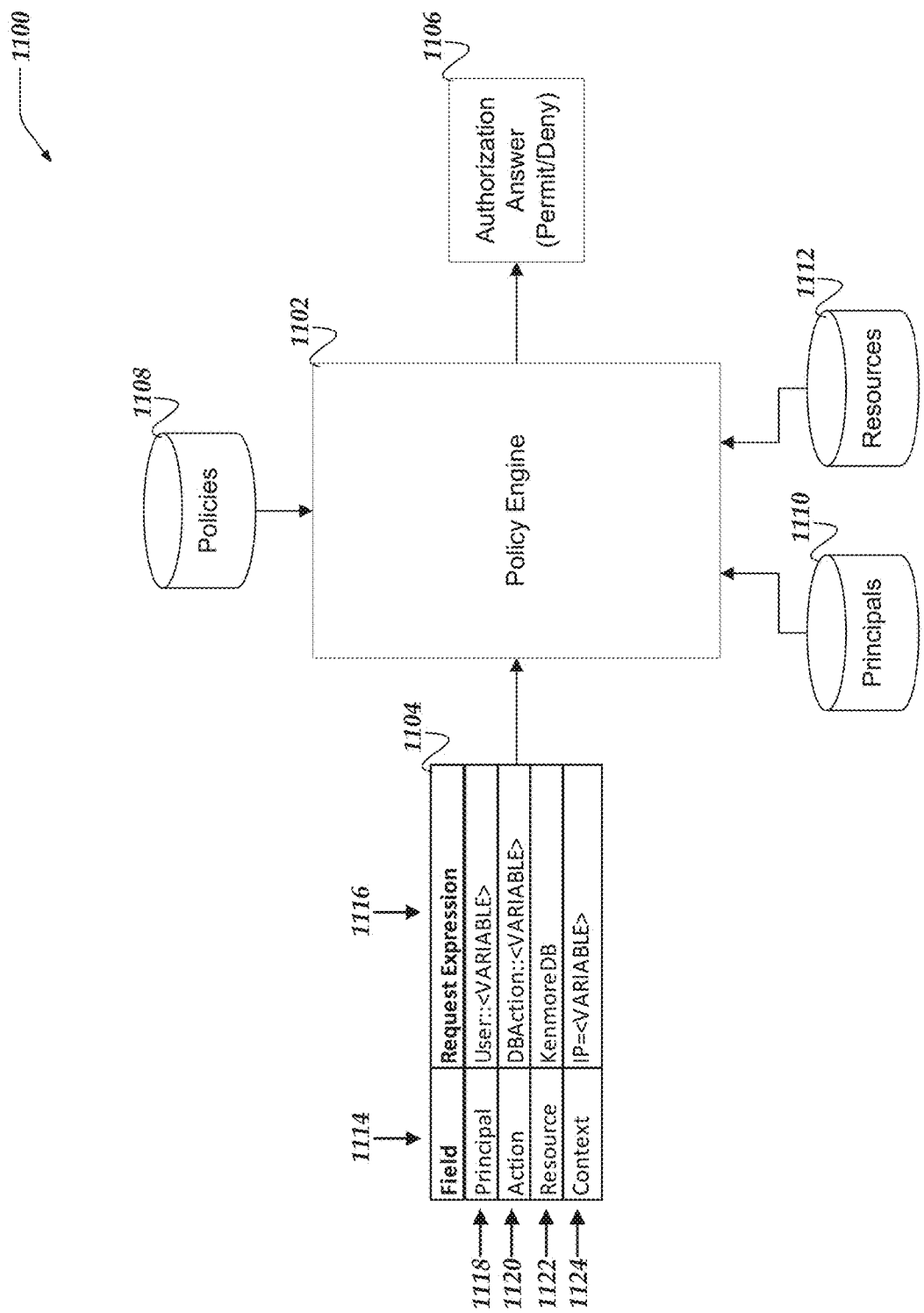
FIG. 11 illustrates a logical schematic of a system for evaluating security policies in aggregate in accordance with one or more of the various embodiments.

FIG. 11 illustrates a logical schematic of system 1100 for evaluating security policies in aggregate in accordance with one or more of the various embodiments. System 1100 may be considered similar to system 800 as described for FIG. 8. Accordingly, in some embodiments, system 1100 may include policy engine 1102, aggregate authorization request 1104, policies 1108, principals 1110, resources 1112, authorization answer 1114, or the like.

However, in some embodiments, policy engines may be arranged to evaluate authorization requests that include one or more variable entities, actions, resources, or context values. In some embodiments, these may be referred to as aggregate authorization requests.

Accordingly, in this example, aggregate authorization request 1104 may be considered a data structure that includes information performing an authorization request that includes one or more variables. In this example, column 1114 represents the field labels of the various fields in the authorization request. Also, in some embodiments, column 1116 represents the request expressions for the different fields of the authorization request. Accordingly, in this example, row 1118 declares a principal (e.g., a user) that may be associated with request; row 1120 may declare an action/activity identifier associated with the aggregate authorization request; row 1122 may declare an identifier representing a resource associated with the authorization request; row 1124 may declare additional context information that may be supplied with the aggregate authorization request, in this example, an IP address.

In some embodiments, policy engines may be arranged to enable aggregate authorization requests that include one or more variable field values. Accordingly, in some embodiments, policy engines may be arranged to be provided the values to fill in the variable fields. In some embodiments, a collection of variables for each variable field may be provided with the aggregate authorization request. Also, in some embodiments, policy engines may be arranged to pull the values for particular variable fields from data stores or databases that may include the field values of interest. Also, in some embodiments, policy engines may be provided a set of policies that may be evaluated against the aggregate authorization request. Also, in some embodiments, policy engines may be arranged to obtain the policies from a data store or database. For example, in some embodiments, policy engines may be arranged to obtain users/principals, action information, resource identifiers, context information, or the like, from infrastructure security computers, or the like, that may be configured for a particular organization.

Accordingly, in some embodiments, aggregate authorization requests may include markup that indicates that field may be a variable field such that its value should be filled from the relevant set of values. In this example, for some embodiments, column 1116 at row 1118 includes User: which may be interpreted to mean that the particular user for the Principal field may be substituted into the authorization requests derived from aggregate authorization request 1104. Likewise, in this example, for some embodiments: column 1116 at row 1120 may indicate that the Action field may be substituted into the authorization requests derived from aggregate authorization request 1104; column 1116 at row 1122 may indicate that the Resource field is fixed to KenmoreDB (a particular database service); column 1116 at row 1124 may indicate that IP addresses may be substituted into the authorization requests derived from aggregate authorization request 1104; or the like.

In some embodiments, variable fields may indicate that a set of associated values may be substituted in for evaluation of the authorization requests derived from aggregate authorization requests. Accordingly, in this example, for some embodiments, row 1118 column 1116 indicate that aggregate authorization request 1104 may be considered a batch authorization request that may be evaluated for one or more users. In some embodiments, the particular users may be provided or determined as part of the generating the aggregate authorization request. In some embodiments, authorization requests that include variable fields may be referred to as aggregate authorization requests or aggregate requests.

Similarly, in this example, row 1120 of aggregate authorization request 1104 indicates that the authorization request may be expanded to include database related actions. Thus, in some embodiments, policy engines may be arranged to generate or evaluate authorization requests for each database action.

Further, in this example, row 1124 of aggregate authorization request 1104 indicates that policy engine may generate separate authorization requests that include context information that includes different IP addresses.

Note, in this example, row 1122 of aggregate authorization request 1104 is shown as a concrete resource, a database identified as KenmoreDB. However, in some embodiments, resources may be variable fields as well.

In some embodiments, policy engines may be arranged to generate separate authorization requests derived from aggregate authorization requests by substituting variable fields with particular values that may be provided with the aggregate authorization request or pulled from other sources. Accordingly, in some embodiments, a naive or conventional implementation may generate separate authorization requests for each enumeration of field variables. For example, if there were 1090 users, a naive implementation may generate 1090 authorization requests—one for each separate user. Similarly, in some embodiments, other variable fields may be used to generate separate authorization requests. Accordingly, in some embodiments, in this example, if there are 1090 users, 10 database actions, and 100 relevant IP address, a naive implementation may generate 1090×10×100 (1,090,000) authorization requests in response to aggregate authorization request 1104. Further, if there may be 1000 policies to evaluate, over a billion evaluations may be caused by aggregate authorization request 1104. Clearly, this may result in disadvantageous consumption of computing resources, extreme processing times, or the like.

Accordingly, in one or more of the various embodiments, policy engines may be arranged to perform various actions to improve the performance of evaluating security policies in aggregate.

In some embodiments, policy engines may be arranged to simultaneously reduce the number of policies that may be evaluated by systematically excluding policies that may be irrelevant to concrete criteria in the aggregate authorization request. For example, row 1122 of aggregate authorization request 1104 includes a concrete value (a particular resource). Accordingly, for example, in some embodiments, as policies may be evaluated, policies that may be unrelated to the KenmoreDB resource may be excluded from further consideration. Also, in some embodiments, policy engines may be arranged to iterate across variable fields and partially evaluate aggregate authorization requests such that policies that may be excluded or resolved may be excluded from further processing with other variable fields.

Further, in some embodiments, policy engines may be arranged to arrange the values (e.g., principal values, action values, resource values, context values) for variable fields in ascending order starting with the variable field associated with the fewest items to the one with the most items. Accordingly, in some embodiments, policy engines may be arranged to maximize the number of policies that may be excluded or resolved with the fewest substitutions. For example, if there may be 1090 users, 10 actions, and 190 context values, policy engines may be arranged to evaluate the action values first, followed by the context values, then the users. Thus, in this example, ten partial evaluations executed for actions may exclude or resolve polices unrelated to the ten actions. For example, if there were 1000 policies but only 100 are related to DBActions, partial evaluations that evaluate the aggregate authorization request with the DBAction may exclude or resolve 900 policies leaving 100 policies to be partially evaluated using the remaining variable fields. Note, in some embodiments, context fields may include one or more subfields for different values. Accordingly, in some embodiments, each subfield may be eligible to include variable fields with associated values. Thus, in some cases, two or more variable fields may be declared in a context field each with their own set of values.

Figure 12:
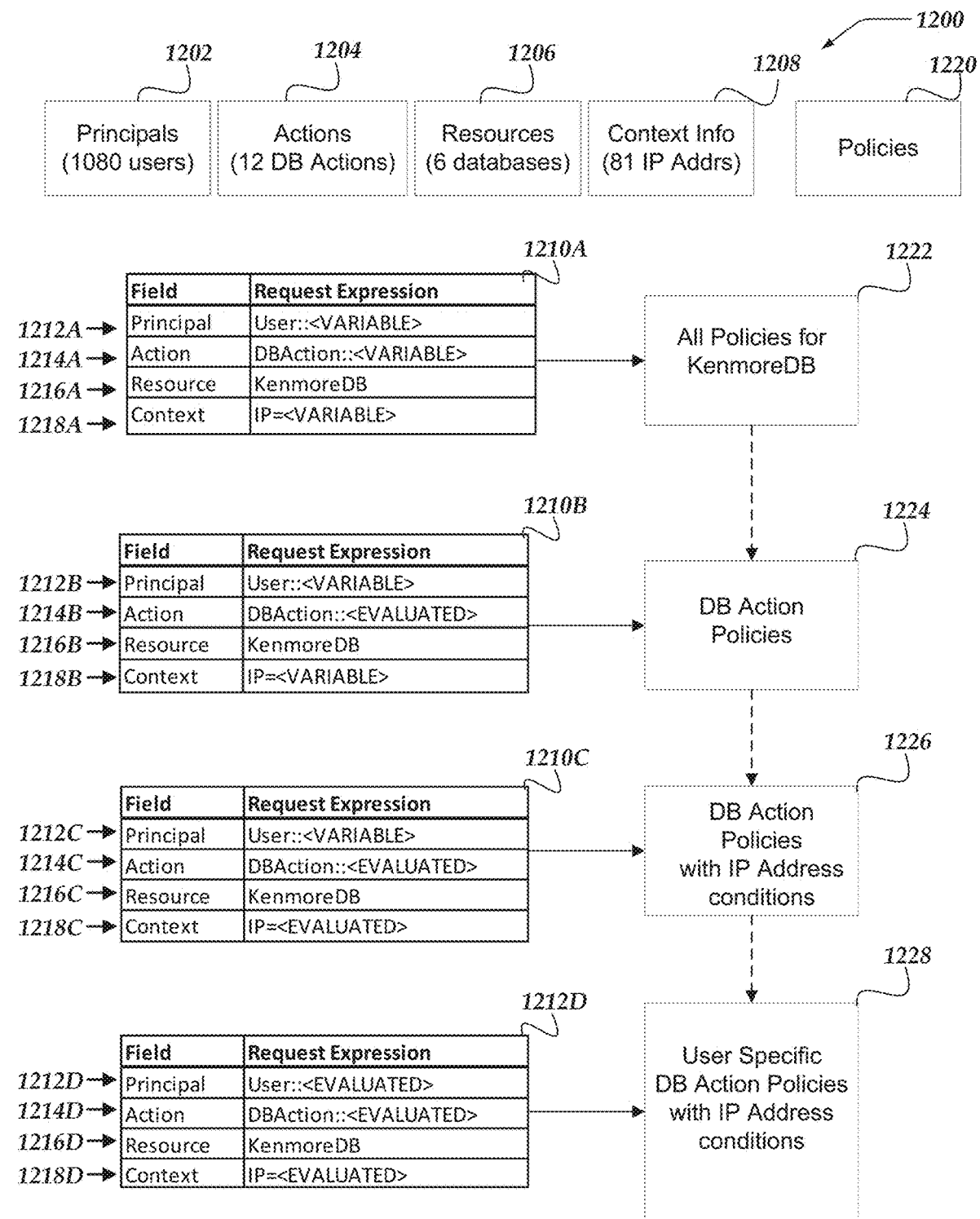
FIG. 12 illustrates a logical schematic of a system for evaluating security policies in aggregate in accordance with one or more of the various embodiments.

FIG. 12 illustrates a logical schematic of system 1200 for evaluating security policies in aggregate in accordance with one or more of the various embodiments.

As described above, aggregate authorization requests may be provided to policy engines. In some cases, aggregate authorization requests may include one or more variable fields. Also, in some embodiments, policy engines may be provided one or more values for substituting into variable fields that may be included in aggregate authorization requests. Also, in some embodiments, policy engines may be configured to interface with one or more data sources that may enable access to values that may be substituted into the variable fields. Accordingly, in this example, for some embodiments, the data sources may include: data source 1202 which may include information including user identifiers that may be associated with principals; data source 1204 which may include information including identifiers that may be associated with actions; data source 1206 which may include information including identifiers that may be associated with resources; data source 1208 which may include context information that may be associated with various authorization requests; or the like.

In this example, for some embodiments, row 1212A may represent a variable principal field for aggregate authorization request 1210A; row 1214A may represent a variable action field for aggregate authorization request 1210A; row 1216A may represent a concrete resource field for aggregate authorization request 1210A; row 1218A may represent a variable context field for aggregate authorization request 1210A.

Also, in this example, for some embodiments, row 1212B may represent a variable principal field for aggregate authorization request 1210B; row 1214B may represent an evaluated variable action field for aggregate authorization request 1210B; row 1216B may represent a concrete resource field for aggregate authorization request 1210B; row 1218B may represent a variable context field for aggregate authorization request 1210B.

Also, in this example, for some embodiments, row 1212C may represent a variable principal field for aggregate authorization request 1210C; row 1214C may represent an evaluated variable action field for aggregate authorization request 1210C; row 1216C may represent a concrete resource field for aggregate authorization request 1210C; row 1218C may represent an evaluated variable context field for aggregate authorization request 1210C.

And, in this example, for some embodiments, row 1212D may represent an evaluated variable principal field for aggregate authorization request 1210D; row 1214D may represent an evaluated variable action field for aggregate authorization request 1210D; row 1216D may represent a concrete resource field for aggregate authorization request 1210D; row 1218D may represent an evaluated variable context field for aggregate authorization request 1210D.

In some embodiments, values for variable fields may be pre-selected or filtered before providing them to policy engines. For example, in some embodiments, database queries may be employed to select value collections. In other cases, for some embodiments, policy engines may be arranged to integrate with data sources, such as LDAP servers, configuration databases, infrastructure security computers, or the like. Accordingly, in some embodiments, policy engines may be arranged to fetch values from one or more data sources via APIs or interfaces. Also, in some embodiments, policy engines may be arranged to provide APIs that enable client applications to provide one or more of aggregate authorization requests, variable field values, policies, or the like for aggregate evaluation.

Accordingly, in some embodiments, policy engines may be arranged to evaluate aggregate authorization request 1210A against the provided policies, represented by policy data source 1220.

In this example, at an initial stage of aggregate authorization, aggregate authorization request 1210A may include three variable fields that need to be evaluated.

In some embodiments, policy engines may be arranged to sort the value collections such that the variables may be used in order from fewest items to most items. Accordingly, in this example, for some embodiments, the value collection with the fewest items may be the resource items (e.g., six databases in the monitored environment). However, row 1216A indicates that the resource field is provided with a concrete value rather than a variable value. Accordingly, in this example, the first values collected to be substituted a partial authorization request for aggregate authorization request 1210A may be the action values from data source 1204.

Accordingly, in some embodiments, policy engines may be arranged to first partially evaluate the provided policies in view of the concrete values included in aggregate authorization request 1210A. Accordingly, in some embodiments, policy engines may be arranged to determine one or more policies from policy collection 1220 policies that may be related to the resource identified as KenmoreDB. In some embodiments, related policies may include policies that have resource fields that directly name KenmoreDB, those that may be directed to "all" databases, groups/categories of resources that may include KenmoreDB, or the like. Accordingly, in this example, if policies include expressions that match with the resource KenmoreDB, they may be retained as policy set 1222 for further partial evaluation.

In some embodiments, policy engines may be arranged to exclude one or more policies from further partial evaluation if they may be determined to be irrelevant to the concrete resources included in aggregate authorization requests.

Note, in this example, row 1216A indicates that KenmoreDB may be a concrete value. Thus, in this example, the first partial evaluation may determine policies that may be relevant to the KenmoreDB resource. In other cases, for some embodiments, one or more different fields may contain concrete values that may be partially evaluated before remaining variable fields may be evaluated depending on the particular aggregate authorization request that may be provided.

Continuing, with this example, policy engines may be arranged to iterate through the variable values having the fewest items and apply them to policy set 1222. In this example, for some embodiments, the variable fields with the fewest items may be the actions in data source 1204. Accordingly, in this example, policy engines may be arranged to iteratively generate partial authorization requests that include substituted actions from data source 1204. Accordingly, these partial authorization requests may be partially evaluated against the policies in policy set 1222. Thus, in this example, policy set 1224 may represent one or more policies determined to be relevant to aggregate authorization request 1210B. Also, for convenience of notation, row 1214B is marked as evaluated. As a result, the remaining policies may be limited to policies that may be related to database actions resulting in policy set 1224. Note, this may include policies that may be directed to all actions, categories of actions that include database actions, or the like.

Continuing, with this example, policy engines may be arranged to iterate through the next variable value collection that may have the next fewest items. In this example, this may be the context information IP addresses. In some embodiments, policy engines may substitute each IP address in data source 1208 into partial authorization requests that may be partially evaluated against policies in policy set 1224. Accordingly, similar to other partial evaluations with variable values, one or more policies may be excluded from further consideration based on the IP addresses resulting in policy set 1226.

Finally, in this example, policy engines may be arranged to iterate through the remaining variable value collection. In this example, the remaining variable collection may be users from data source 1202 because it has the most items. However, in this example, Principal (row 1212C) may be the last remaining variable field. Accordingly, in this example, for some embodiments, policy engines may be arranged to generate full authorization request by iteratively substituting the user values into them. Such requests may be considered full authorization requests or simply authorization requests) because each field contains concrete values. However, in some embodiments, after the partial evaluations of variable fields has been completed, the number of remaining policies in policy set 1228 may be significantly fewer than the number of policies in policy collection 1220. Thus, in some embodiments, the performance costs for policy engines to evaluate security policies in aggregate may be reduced.

Also, in some embodiments, policy engines may be arranged to perform additional optimizations, such as reducing policy complexity by combining or reducing one or more expressions that may be included in policies. For example, recall that policy languages may include logical expressions, arithmetic expressions, or the like. Accordingly, in some embodiments, policy engines may be arranged to recognize expressions that may be combined or reduced during partial evaluations. For example, the first time a policy may be partially evaluated, policy engines may be arranged to simplify or reduce one or more policies. Accordingly, in some embodiments, subsequent partial evaluations or full evaluations may be performed using the optimized versions of the policies.

Note, the particular type of optimizations or simplifications that may be available may depend on the policy description language that may used as well the particular policies. Accordingly, in some embodiments, policy engines may be arranged to employ rules, instructions, parsers, grammar, or the like provided via configuration information to enable policy engines to optimize policies. Accordingly, in some embodiments, policy engines may be arranged to be adaptable to additional or new optimizations that may be determined.

Figure 13:
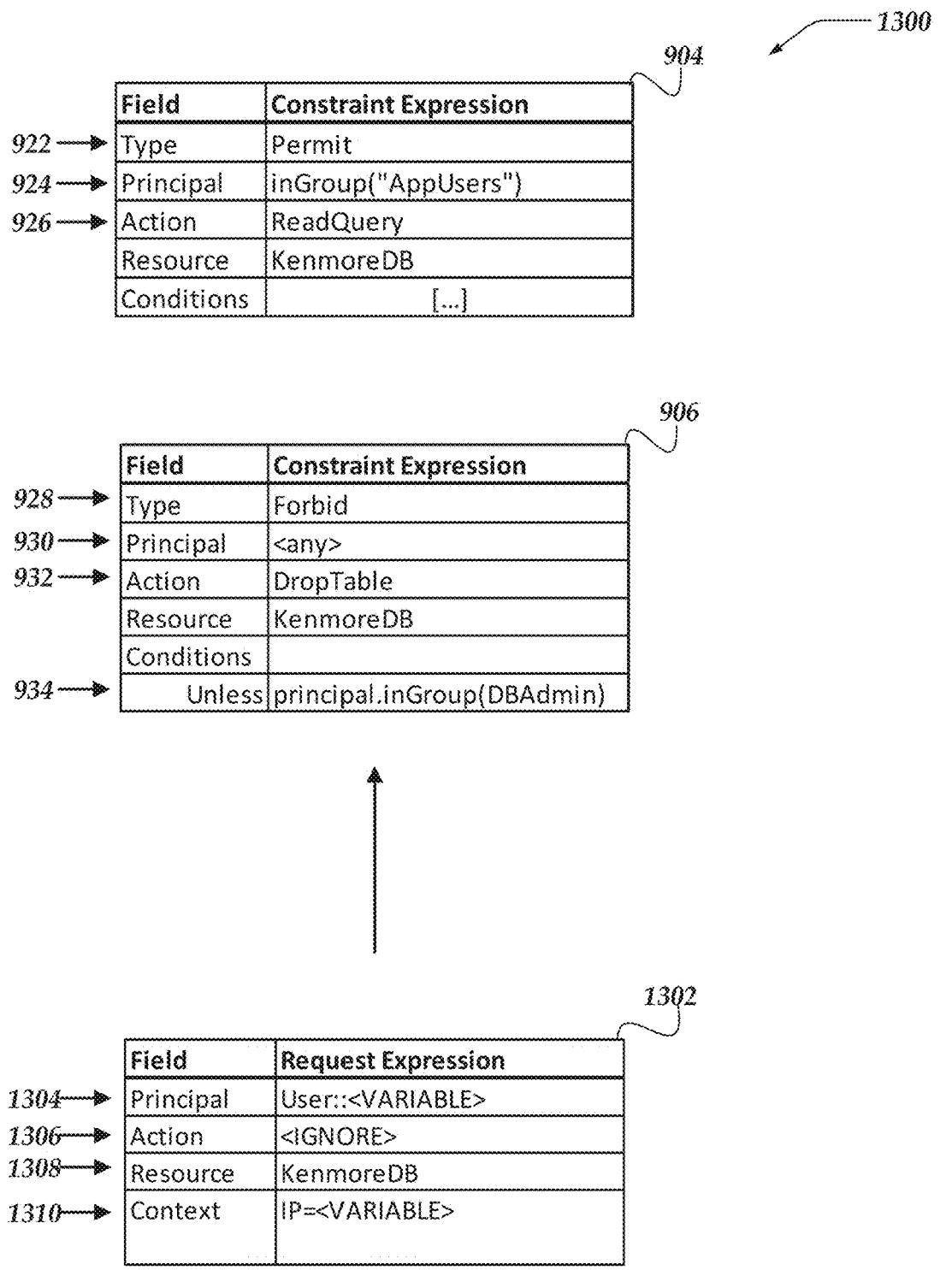
FIG. 13 illustrates a logical schematic of a system for evaluating security policies in aggregate in accordance with one or more of the various embodiments.

FIG. 13 illustrates a logical schematic of system 1300 for evaluating security policies in aggregate in accordance with one or more of the various embodiments. In some embodiments, policy engines may be arranged to enable aggregate authorization requests to indicate that one or more fields may be ignored during partial authorization or full authorization.

Accordingly, in some embodiments, aggregate authorization requests may include tags, markups, flags, or other indicators to designate one or more fields as being ignored. Accordingly, in some embodiments, policy engines may be arranged to ignore constraints or conditions associated with ignored fields.

In this example, for some embodiments, policy 904 and policy 906 may represent security policy declarations that may be defined for an organization. One of ordinary skill in the art will appreciate that in practice a managed network environment may include many policies (e.g., 100 or more).

Also, in this example, for some embodiments, aggregate authorization request 1302 represents an aggregate authorization request that includes at least one ignore field. Accordingly, in this example, for some embodiments, row 1304 indicates that the principal field for aggregate authorization request 1302 may be a variable field; row 1306 indicates that the action field for aggregate authorization request 1302 may be a variable field; row 1308 indicates that the resource field for aggregate authorization request 1302 may be a concrete field; row 1310 indicates that the context field for aggregate authorization request 1302 may include a variable field; or the like.

In some embodiments, if a policy engine may be provided an aggregate authorization request that includes an ignored field, the processes described herein for evaluating security policies in aggregate may be applied as disclosed with the modification that the conditions or constraints that include or depend on an ignored field may be ignored during partial authorization or full authorization.

Accordingly, in some embodiments, policy engines may be arranged to process reduce/filter policies using the partial authorization, starting with concrete fields, followed by variable fields using the corresponding values substituted into partial authorization requests. However, in this example, for some embodiments, because aggregate authorization request 1302 declares that the action field may be an ignore field, action fields in policies may be ignored for the purpose of the aggregate authorization request. Accordingly, in this example, for some embodiments, policy 904 and policy 906 both match aggregate authorization request 1302. Similarly, in some embodiments, if a policy includes conditional elements, such as "when action.type=X is TRUE," "unless action.type==Y," or the like, those conditionals may be removed from consideration if partial authorization or full authorization is being performed. Note, while this example illustrates that the action field (row 1306) is an ignorable field, any field in the aggregate authorization request may be indicated as ignorable. Likewise, if the context field includes subfields, some or all context subfields may be indicated as being ignorable without departing from the scope of these innovations.

Figure 14:
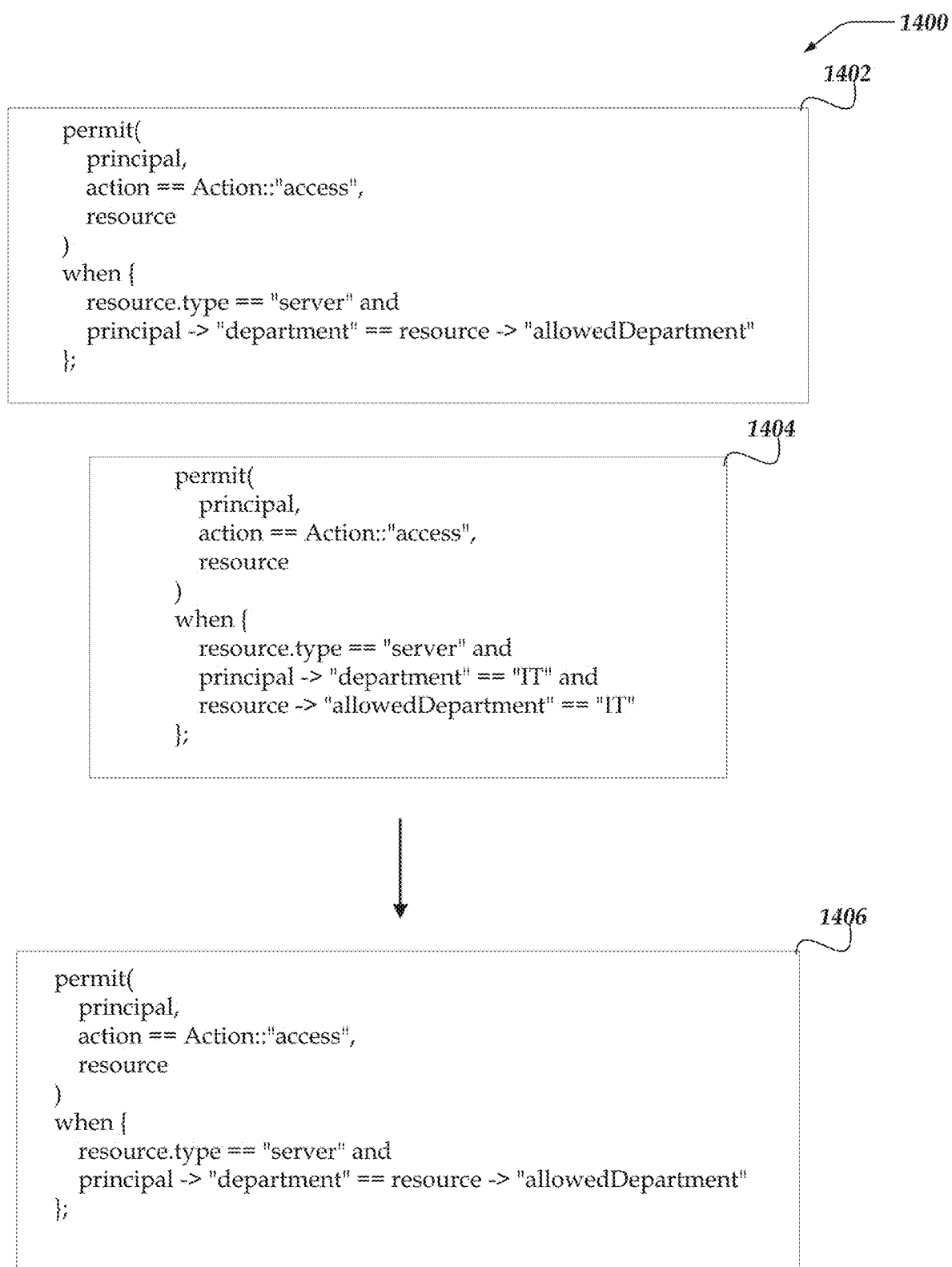
FIG. 14 illustrates a logical schematic of a system for evaluating security policies in aggregate in accordance with one or more of the various embodiments.

FIG. 14 illustrates a logical schematic of system 1400 for evaluating security policies in aggregate in accordance with one or more of the various embodiments. As described above, In some embodiments, policy engines may be arranged to reduce or simplify one or more policies during partial authorizations.

As described above, in some embodiments, policy engines may be arranged to evaluate aggregate authorization requests against one or more policies. In some embodiments, the relevant policies may be provided with aggregate authorization requests. Also, in some embodiments, policy engines may be arranged to automatically obtain or determine the one or more policies from infrastructure security computers or other services.

Accordingly, in some embodiments, during partial evaluations, policy engines may be arranged to determine one or more expressions in policies that may be reduced. Also, in some embodiments, policy engines may be arranged to determine one or more policies that may be combined into one policy. Thus, in some embodiments, policy engines may be arranged to reduce the number of policies that need to be processed during subsequent partial authorizations or full authorizations.

In this example, for some embodiments, policy 1402, policy 1404, and policy 1406 may represent security policy declarations. One of ordinary skill in the art will appreciate that the innovations disclosed herein anticipate the use of one or more conventional policy description languages or one or more custom policy description languages as well as the use of various formats for representing policies. However, for brevity or clarity policies are represented here using a format consistent with one or more conventional security policy description languages the one of ordinary skill in the art will be familiar with.

Accordingly, in some embodiments, policy engines may be arranged to reduce policy 1402 and policy 1404 into a single policy represented here by policy 1406. In this example, the reduction may be enabled by combining the conditional 'when' expressions of the two policies into one expression. In this example, the reduction may be enabled because the two conditionals may be logical expressions that may be reduced into one expression.

In some embodiments, policy engines may be arranged to reduce other types of expressions, including arithmetic expressions. For example, for some embodiments, if a policy includes an expression such as "resource.cost>(X+Y)" or the like, the first time such a policy may be encountered during partial authorization, policy engines may be arranged to perform reduce the expression to one or more of "TRUE", "resource.value>Z," or the like. For example, if the value of resource.cost and the value of X and Y are fixed, the expression may be reduced to TRUE. Likewise, for example, if the value of resource.cost may vary (e.g., if resource is a variable field in the aggregate authorization request), and X and Y are fixed values, the expression may be reduced to "resource.cost>Z."

Accordingly, in some embodiments, policy engines may be arranged to reduce the number of operations or computations required for partial authorizations or full authorizations. In some embodiments, policy engines may be arranged to attempt to reduce policy set or policy collections the first time a policy may be encountered for a given aggregate authorization request. Accordingly, in some embodiments, policy engines may be arranged to improve the performance of evaluating security policies in aggregate by reducing the number of policies that need to be evaluated to resolve aggregate authorization requests.

Figure 15:
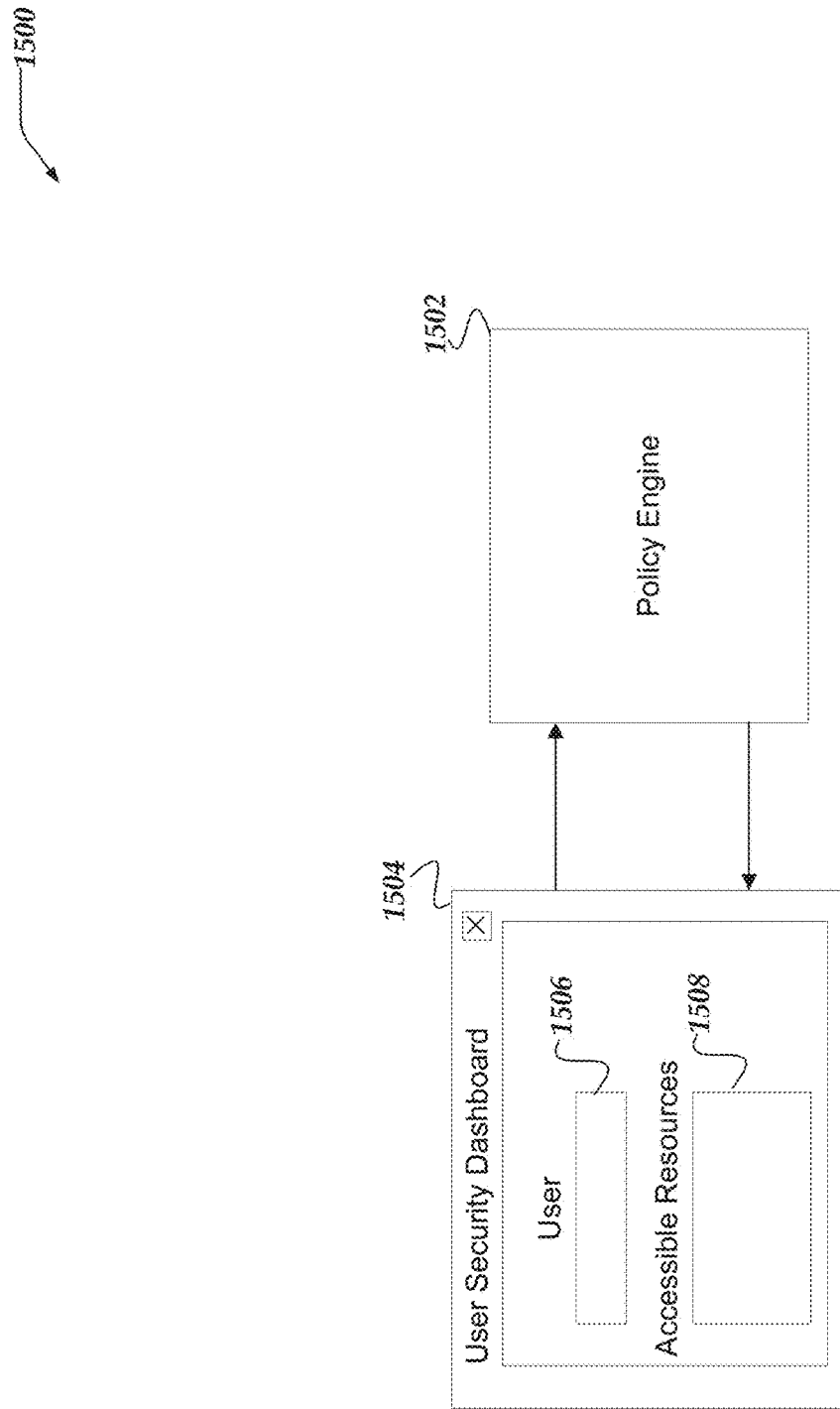
FIG. 15 illustrates a logical schematic of a system for evaluating security policies in aggregate in accordance with one or more of the various embodiments.

FIG. 15 illustrates a logical schematic of system 1500 for evaluating security policies in aggregate in accordance with one or more of the various embodiments. System 1500 may comprise various constituents, including: policy engine 1502; one or more client user interfaces, such as user interface 1504; or the like.

In some embodiments, policy engines may be arranged to provide one or more user interfaces such as user interface 1504. In some embodiments, user interfaces may include various windows, controls, or other user interface features. In some embodiments, user interfaces may include various user interface panels, such as panel 1506, panel 1508, or the like. For example, in some embodiments, panel 1506 may represent a user interface that enables network administrators to enter/select a user to review which resources the selected user may have access, or the like. Also, for example, panel 1508 may represent a user interface that displays the resources accessible to users selected in panel 1506 as determined based on one or more aggregate authorization requests.

In some embodiments, policy engine 1502 may be arranged to generate or display user interface 1504 to users using one or more of video interface 242, projector 246, display 250, or the like, of a client computer, such as client computer 200. Also, in some embodiments, policy engine 1502 may be arranged to generate or display user interface 1502 to users using a one or more of input/output interface 338, display 350, audio interface 356, or the like, of a network computer, such as network computer 300.

In some embodiments, panel 1506 may be arranged to display a rank ordered list of resources based on the various metrics, such as the number of times a user has accessed a particular resource in a given time window. Note, in some embodiments, one of ordinary skill in the art will appreciate that organizations may have significant control or influence over the particular ranking criteria. For example, in some cases, one or more resources may be considered more important than others. Accordingly, in some embodiments, some resources may be associated with different weights depending on the particular allowed actions, user type, resource type, or the like.

In some embodiments, for example, policy engines, infrastructure security computers, one or more client applications, or the like, may be arranged to generate one or more user interfaces that may dynamically be arranged to display one or more resources that are accessible to a user who may be declared in one or more queries communicated to a policy engine such that the listed resources may be determined based on a response to the query or one or more authorization answers.

Note, for brevity and clarity, this example describes an application that displays one or more resources accessible to a user. However, one of ordinary skill in the art will appreciate the other types of queries or requests may be employed. In some embodiments, policy engines may be enabled to provide results along any of the request dimensions (e.g., principal, action, resource, context, or the like). For example, in some embodiments, policy engines may enable aggregate authorization requests for determining the set of actions that a user may be allowed to make on a given resource or set of resources. Also, for example, policy engines may employ aggregate authorization requests to determine the set of users that may be allowed to perform a specific action on a particular resource. Thus, it should be clear that the innovations disclosed herein are not limited to displaying or determining the resources accessible to a user.

In some embodiments, policy engines may be arranged to collect various telemetry or other metrics associated with user interactions with user interfaces. In some embodiments, telemetry may include tracking if users may be in agreement with accessible resources, resource ranking, or the like. For example, if users commonly interact with resources ranked lower than others, it may indicate that the metrics employed for ordering resources in panel 1508 may be deficient.

In one or more of the various embodiments, policy engines may be arranged to monitor telemetry information associated with one or more users of user interface 1504.

Accordingly, in some embodiments, policy engines may be arranged to provide one or more facilities to collect direct feedback from one or more users that may interact with one or more resources displayed in panel 1508. For example, in some embodiments, user interfaces may include controls that enable authorized users to grade resource ordering or other display features. Likewise, in some embodiments, a user interface may be provided to grade the resource ranking.

In some embodiments, grades or scores may be binary (e.g., like/dislike), discrete (e.g., one-four stars, letter grades), continuous values, or the like.

Also, in one or more of the various embodiments, policy engines may be arranged to provide user interfaces that monitor how users employ resources, aggregate authorization requests, policies, or the like. In some embodiments, telemetry information employed to monitor user preferences may be based on monitoring user interactions as well as direct feedback. Accordingly, in some embodiments, policies, aggregate authorization requests, resources, users, actions, or the like, that may be present but are ignored or discarded by users may be inferred to be poorly received. For example, for some embodiments, if the top ranked resources provided in response to an aggregate authorization request, or the like, are ignored or lower ranked profiles are favored by users, it may be inferred that there may be a problem with the resource ordering for the current application.

Further, in some embodiments, policy engines may be arranged to receive telemetry information from other services or applications. Accordingly, in one or more of the various embodiments, policy engines are not required to directly monitor activity associated with the policies, resources, authorization request, aggregate authorization request, or the like. For example, for some embodiments, user interfaces may be displayed to users via desktop computer applications, mobile applications, web-based applications, or the like. In some embodiments, such applications may collect the telemetry information and provide some or all of it to policy engines rather than requiring the policy engines to include monitoring facilities on user-side application.

Accordingly, in some embodiments, policy engine 1502 may be arranged to collect metrics or telemetry associated with user interactions with user interface 1504 using a one or more of input/output interface 238, cameras 240, touch interface 244, keypad 252, audio interface 256, GPS, 258, open air gesture interface 260, haptic interface 264, pointing device interface 266, or the like, of a client computer, such as client computer 200. Also, in some embodiments, policy engine 1502 may be arranged to collect metrics or telemetry associated with user interactions with user interface 1504 using a one or more of input/output interface 338, GPS 340, keyboard 352, audio interface 356, pointing device interface 358, or the like, of a network computer, such as network computer 300.

In some embodiments, policy engines may be arranged to track mouse movement, eye movement, keystrokes, or the like, to determine how users may interact with information (e.g., resources, actions, policies, authorization request, aggregate authorization request, authorization answers, or the like) displayed in user interfaces. Accordingly, in some embodiments, policy engines may be arranged to evaluate at least the quality of various results, recommendations, or policy matches based on how users interface with them. For example, if users consistently select or otherwise favor resources or actions ranked lower than others, it may indicate that one or more processes performing the ranking or matching may be experiencing diminished or diminishing effectiveness.

In some embodiments, policy engines may be arranged to associate a performance score with various aggregate authorization requests or policies employed for evaluating security policies in aggregate based on the user interaction metrics or telemetry. Accordingly, in some embodiments, if the performance score associated with a policy or aggregate authorization request falls below a defined threshold value, policy engines may be arranged to suspend those particular aggregate authorization requests or policies from operation.

Also, in some embodiments, policy engines may be arranged to arrange, re-arrange or adapt user interfaces based on user telemetry or metrics associated with the one or more user interactions with the infrastructure security computer including content within the user interfaces. In some embodiments, user profiles may be configured to include user interface preferences based on collected metrics and user feedback. Accordingly, in some embodiments, policy engines may be arranged to select, position, size, highlight, or style one or more user interface components based on one or more of user interaction metrics and user feedback. For example, if users are tracked focusing on or navigating to particular user interface views, components, or user interface panels, policy engines may be arranged to highlight or size the preferred user interface elements or user interface panels. For example, if users are determined to rarely interact with a display panel such as display panel 1506, policy engines may be arranged to reduce the size and change the position of display panel 1506 by displaying a smaller sized version below display panel 1506 or increasing or decreasing the number of accessible resources shown in the panel.

Also, in some embodiments, policy engines may be arranged to adapt user interfaces based on the size/type of display, input methods, user status, or the like. For example, in some embodiments, if a user is determined to be operating using a mobile device, one or more user interface elements may be positioned differently. In some cases, for some embodiments, depending on the display type or display size, one or more user interface elements may be hidden from view.

Accordingly, in some embodiments, policy engines may be arranged to tangibly modify user interfaces, interactive reports, input collection, input selection, policy lists, resource lists, access reports, or the like, based on the efficient and effective performance of processes and/or activities associated with various types of policy evaluation.

Figure 16:
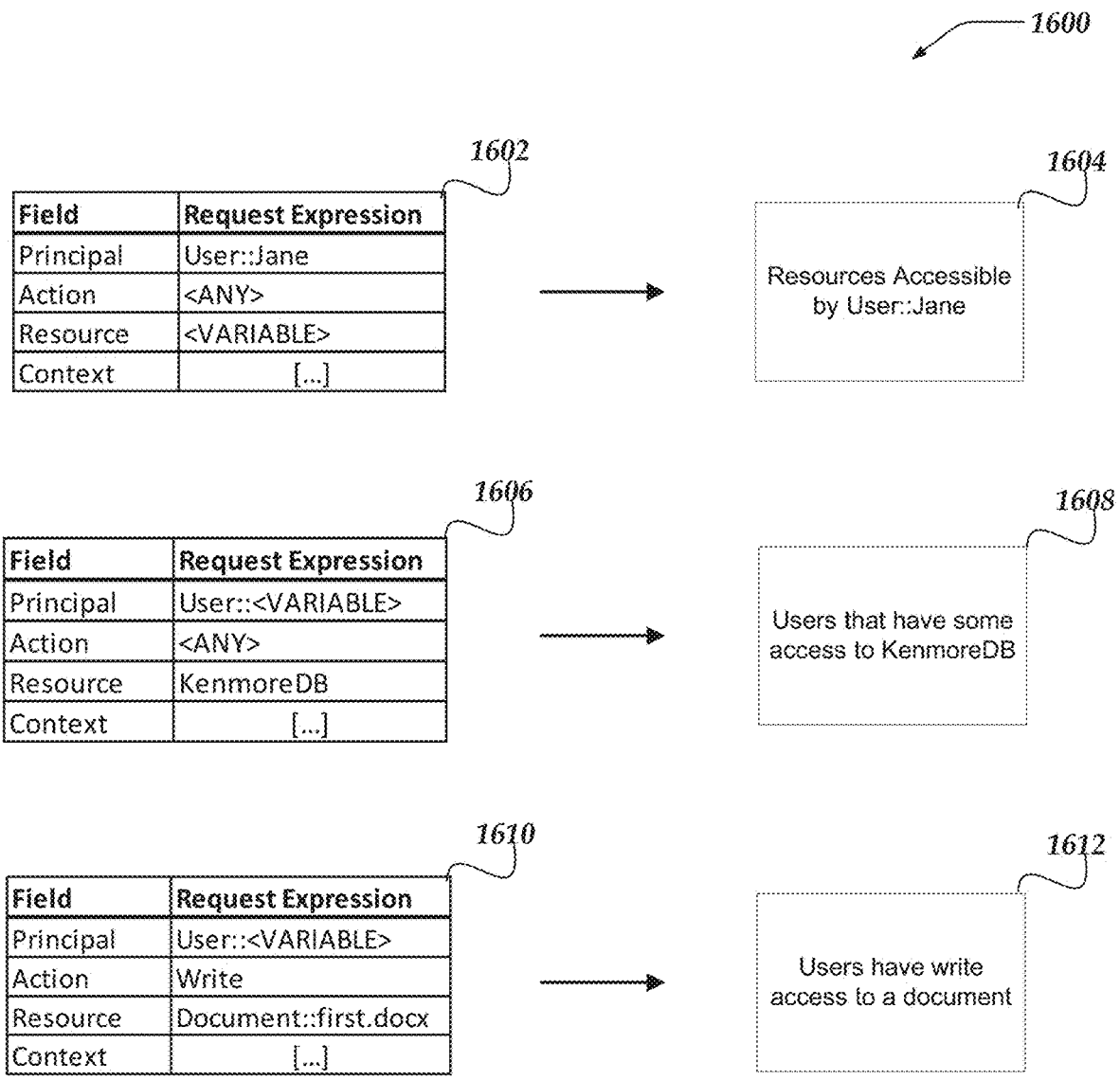
FIG. 16 illustrates of logical schematic for a system for evaluating security policies in aggregate in accordance with one or more of the various embodiments.

FIG. 16 illustrates of logical schematic for system 1600 for evaluating security policies in aggregate in accordance with one or more of the various embodiments. In some embodiments, policy engines may be arranged to employ the results of aggregate authorization requests to answer various user queries that may depend on one or more policies. In conventional circumstances, authorization requests may be submitted to policy engines for a particular user, resource, or actions. For example, an authorization request may be submitted to determine if a particular can perform a particular action on a particular resource. Accordingly, in this example, for some embodiments, if at least one policy permits the authorization request, the policy engine may issue a Permit authorization answer. Likewise, if at least one policy forbids the authorization request, policy engines may issue a forbid or deny answer. Other rules or conventions, such as deny/forbid answers superseding permit answers, how to handle non-answers (e.g., no relevant policy explicitly permits or forbids a request), requiring a permit answer to proceed, or the like, may be determined based on the rules or standards of the particular security policy description language being used. Also, in some embodiments, policy engines may be arranged to enable administrators to select how such cases may be handled. Generally, it may be common that explicit permit answers may be required and forbid answers supersede or override permit answers.

However, in some embodiments, evaluating security policies in aggregate may enable additional or different type of queries, such as: determining which resources a user may access, which users may access a particular resource, which documents users in particular user group may access, which users have write privileges to particular file system directories, or the like.

Accordingly, in some embodiments, policy engines may be arranged to evaluate security policies in aggregate to answer these types of queries. In some embodiments, policy engines may be arranged to accomplish this by using variable fields and variable field values and monitoring which values result in permit or forbid answers. For example, in some embodiments, if the query intends to identify each user (principal) has full access (action) a document (resource), policy engines may be arranged to generate an aggregate authorization request the has a variable field for the users (principal), a variable field for the action, and a concrete field for the document (resource). Thus, in this example, policy engines may be arranged to determine which users may access the document. One of ordinary skill in the art will appreciate that an arbitrary number of queries may be provided depending on the local requirements or local circumstances of organizations or network administrators. Accordingly, in some embodiments, policy engines may be arranged to provide one or more user interfaces that enable users to provide queries that may be resolved using aggregate authorization requests. For example, in some embodiments, users may be provided a user interface the automatically lists the resources of a particular type that users may access. Likewise, for example, policy engines may be arranged to provide user interfaces that enable administrators to list which users may access particular resources or perform particular actions. Accordingly, for brevity or clarity three examples are provided here. However, one of ordinary skill in the art will appreciate that these innovations anticipate additional queries that may be implemented using aggregate authorization requests to evaluate security policies in aggregate.

In this example, for some embodiments, aggregate authorization request 1602 represents an aggregate authorization request directed to determining all of the resources that may be accessible by the user Jane. Accordingly, in some embodiments, the resource field of the aggregate authorization request is designated as a variable field. Accordingly, in some embodiments, policy engines may be arranged to evaluate a collection of policies to identify which polices allow User:Jane to perform any action on particular resources. In this example, in some embodiments, aggregate authorization request 1602 may be submitted to a policy engine along with a collection of resources (or reference thereto). Accordingly, in some embodiments, the policy engine may generate a partial authorization request for each resource and determine if User:Jane receives a permit authorization answer. Thus, in some embodiments, each resource that Jane is enabled to access may be collected into a list and returned in result set 1604 to a client application that submitted the aggregate authorization request.

Also, for example, for some embodiments, aggregate authorization request 1606 represents an aggregate authorization request directed to determining all of the users that may have access (or the privilege to perform any action) on the resource KenmoreDB. In response to such a query, in some embodiments, policy engines may be arranged to generate an aggregate authorization request with the user field designated as a variable field and the resource field set to concrete value (e.g., KenmoreDB). Accordingly, in some embodiments, policy engines may be arranged determine which users may be enabled to access the resource and return them in result set 1608.

Likewise, for example, for some embodiments, aggregate authorization request 1610 may represent an aggregate authorization request for determining which users have Write privileges for a particular document resource (first-.docx). Accordingly, in some embodiments, aggregate authorization request 1610 designates its principal field as a variable field with the action field (Write) and resource field (Document:first.docx) as concrete fields. Accordingly, in some embodiments, policy engines may be arranged to employ an aggregate authorization request to determine which users may have write privileges for the resource based on which users are associated with policies that enable them to access the resources. Thus, in some embodiments, policy engines may be arranged to return those users to a client application in result set 1612.

Generalized Operations

FIGS. 17-20 represent generalized operations for evaluating security policies in aggregate in accordance with one or more of the various embodiments. In one or more of the various embodiments, processes 1700, 1800, 1900, and 2000 described in conjunction with FIGS. 17-20 may be implemented by or executed by one or more processors on a single network computer such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers, such as, those in a cloud-based or containerized environment. However, embodiments are not so limited and various combinations of network computers, client computers, or the like may be utilized. Further, in one or more of the various embodiments, the processes described in conjunction with FIGS. 17-20 may be used for evaluating security policies in aggregate in accordance with at least one of the various embodiments or architectures such as those described in conjunction with FIGS. 4-16 Further, in one or more of the various embodiments, some or all of the actions performed by processes 1700, 1800, 1900, and 2000 may be executed in part by infrastructure security engine 322, policy engine 326, one or more mesh agents, such as, mesh agent 324, or the like, running on one or more processors of one or more network computers.

Figure 17:
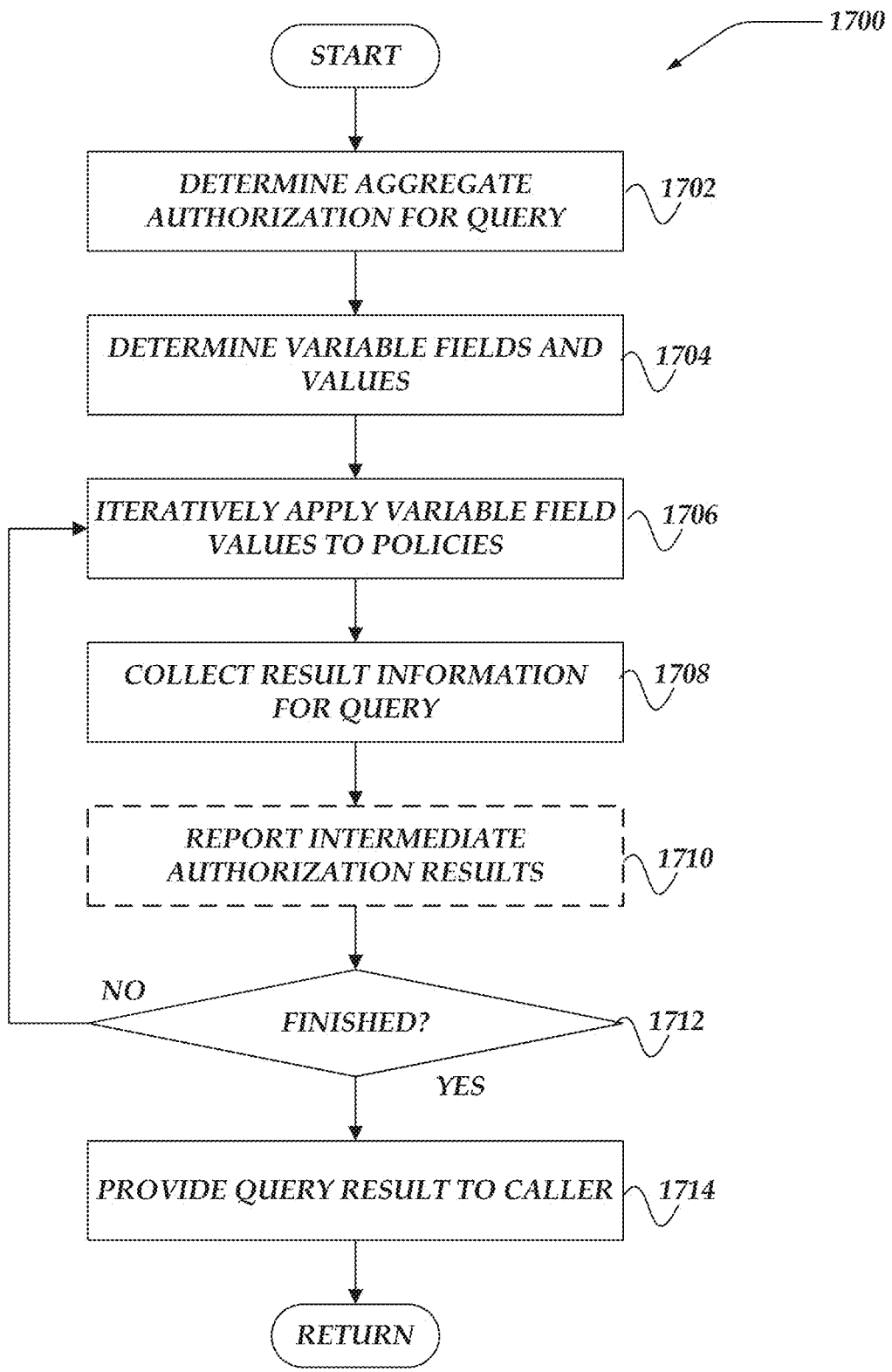
FIG. 17 illustrates an overview flowchart of a process for evaluating security policies in aggregate in accordance with one or more of the various embodiments.

FIG. 17 illustrates an overview flowchart of process 1700 for evaluating security policies in aggregate in accordance with one or more of the various embodiments. After a start block, at block 1702, in one or more of the various embodiments, policy engines may be arranged to determine an aggregate authorization request for a query.

As described above, in some embodiments, infrastructure security computers or policy engines may provide one or more user interfaces that enable users to generate queries or requests that may be associated with one or more aggregate authorization requests or aggregate authorization request templates. Accordingly, in some embodiments, upon selection or activation of various user interface controls, particular aggregate authorization requests may be generated or selected.

Also, in some embodiments, policy engines may be arranged to provide user interfaces that enable users to directly declare aggregate authorization requests by entering the field values or variable fields for an aggregate authorization request.

Also, in some embodiments, policy engines may be arranged to provide one or more interfaces or APIs that enable other applications to provide aggregate authorization requests.

At block 1704, in one or more of the various embodiments, policy engines may be arranged to determine one or more variable fields and accompanying values for the variable fields. As described above, in some embodiments, aggregate authorization requests may be declared as including one or more variable fields. Accordingly, in some embodiments, the aggregate authorization requests may include fields or values that indicate a field may be a variable field. Likewise, in some embodiments, policy engines may be arranged to enable users or services to indicate which fields in aggregate authorization requests may be variable fields via one or more interfaces or APIs.

At block 1706, in one or more of the various embodiments, policy engines may be arranged to iteratively apply the one or more variable field values to security policies. As described above, in some embodiments, policy engines may be arranged to iterate through one or more values associated with each variable field. In some embodiments, policy engines may be arranged to sort the variable fields in ascending order based on the number of values available for each variable field.

In some embodiments, policy engines may be arranged to generate partial authorization requests that include the variable field values such that the partial authorization requests may be partially authorized against the one or more policies. In some embodiments, partial authorization may result in a Allow, Deny, not enough information, or irrelevant policy. In some embodiments, irrelevant policies may include policies that do not apply to the field values in partial authorization requests.

Also, in some embodiments, policy engines may be arranged to parallelize the authorizations or partial authorizations rather than being restricted to serial processing. Here, for brevity and clarity serial processing is shown.

At block 1708, in one or more of the various embodiments, policy engines may be arranged to collect result information for the query. As described herein, in some embodiments, policy engines may be arranged to evaluate security policies in aggregate by testing more than one value for more than one variable field against one or more policies.

In some embodiments, policy engines may be arranged to collect additional metrics associated with results of authorizations in addition to Allow or Deny. For example, policy engines may be arranged to track users, actions, resources, or the like, associated with policies that result in allow or deny answers. For example, policy engines may be arranged to track which resources a user may access, which users may access a particular resource, how many resources enable or allow particular actions, or the like. In some embodiments, policy engines or infrastructure security computers may be arranged to be adaptable to various questions or queries that may benefit from evaluating security policies in aggregate. Accordingly, in some embodiments, policy engines may be arranged to provide callback APIs, or the like, that may enable client applications to dynamically monitor authorizations for tracking additional metrics or terminating aggregate authorization requests.

At block 1710, in one or more of the various embodiments, optionally, policy engines may be arranged to report one or more intermediate results to a calling process or other application. In some embodiments, intermediate results may include immediate results for one or more of each authorization request, raw authorization requests, raw authorization answers, status information, error results, timestamps, resource utilization information, or the like. In some embodiments, policy engines may be arranged to provide one or more interfaces or APIs that enable calling applications or services, including mesh agents or infrastructure security computers, to indicate the information or information detail that may be included in intermediate result reports. Likewise, in some embodiments, policy engines may provide interface or APIs that enable calling applications or services to terminate the processing of the aggregate authorization request based on intermediate result reports.

In some embodiments, policy engines may be arranged to return immediate authorization answers or partial authorization answers for each attempted partial authorization or full authorization. Accordingly, in some embodiments, the calling application or service may abort or terminate an authorization request as soon as one or more conditions or criteria have been met rather than being forced to wait until each value, variable field, or policy has been evaluated. Thus, in some embodiments, performance of policy engines for one or more queries or aggregate authorization requests may be improved by avoiding unnecessary partial authorizations or authorizations. For example, in some embodiments, an aggregate authorization request may be canceled as soon as one or more users are determined to be allowed to perform a particular action, rather than checking all the users for all the actions for all the policies.

Further, in some embodiments, policy engines may be arranged to generate log entries in a log file for some or all partial authorization requests or full authorization requests to record various details associated with each request or answer.

Note, this block is indicated as being optional because, in some cases, intermediate result reports may not be requested or required depending on local requirements or local circumstances.

At decision block 1712, in one or more of the various embodiments, if the aggregate authorization request has been fully processed, control may flow to block 1714; otherwise, control may loop back to block 1706. Also, in some embodiments, as described above, individual or partial authorization results may be reported to the application or service (including the policy engine) that initiated the aggregate authorization request as they are processed. Thus, in some cases, for some embodiments, the calling application or service may be enabled to terminate the aggregate authorization process before all of the policies or values may be considered.

At block 1714, in one or more of the various embodiments, policy engines may be arranged to provide the results associated with the query to a calling process, service, or application.

In some embodiments, the particular results may vary depending on the query contents or query type. In some cases, in some embodiments, raw results for each partial authorization request or for each full authorization request may be provided. Also, in other cases, for embodiments, results may be tailored to particular questions or clauses included in the query. For example, in some embodiments, such results may include a list of users that were allowed access to a resource, if any. Also, for example, for some embodiments, results may include a list or collection of results for each authorization request. Further, in some embodiments, results may include error reports, log entries, annotations, or the like, associated with partial or full authorization requests generated from aggregate authorization requests.

Also, in some embodiments, results may simply be an indication that the aggregate authorization request has been processed or completed. Also, as described above, in some embodiments, policy engines may be arranged to provide authorization answers to calling processes, applications, or services as they may be determined rather than waiting until all of the policies or variable fields have been processed.

Next, in one or more of the various embodiments, control may be returned to a calling process.

Figure 18:
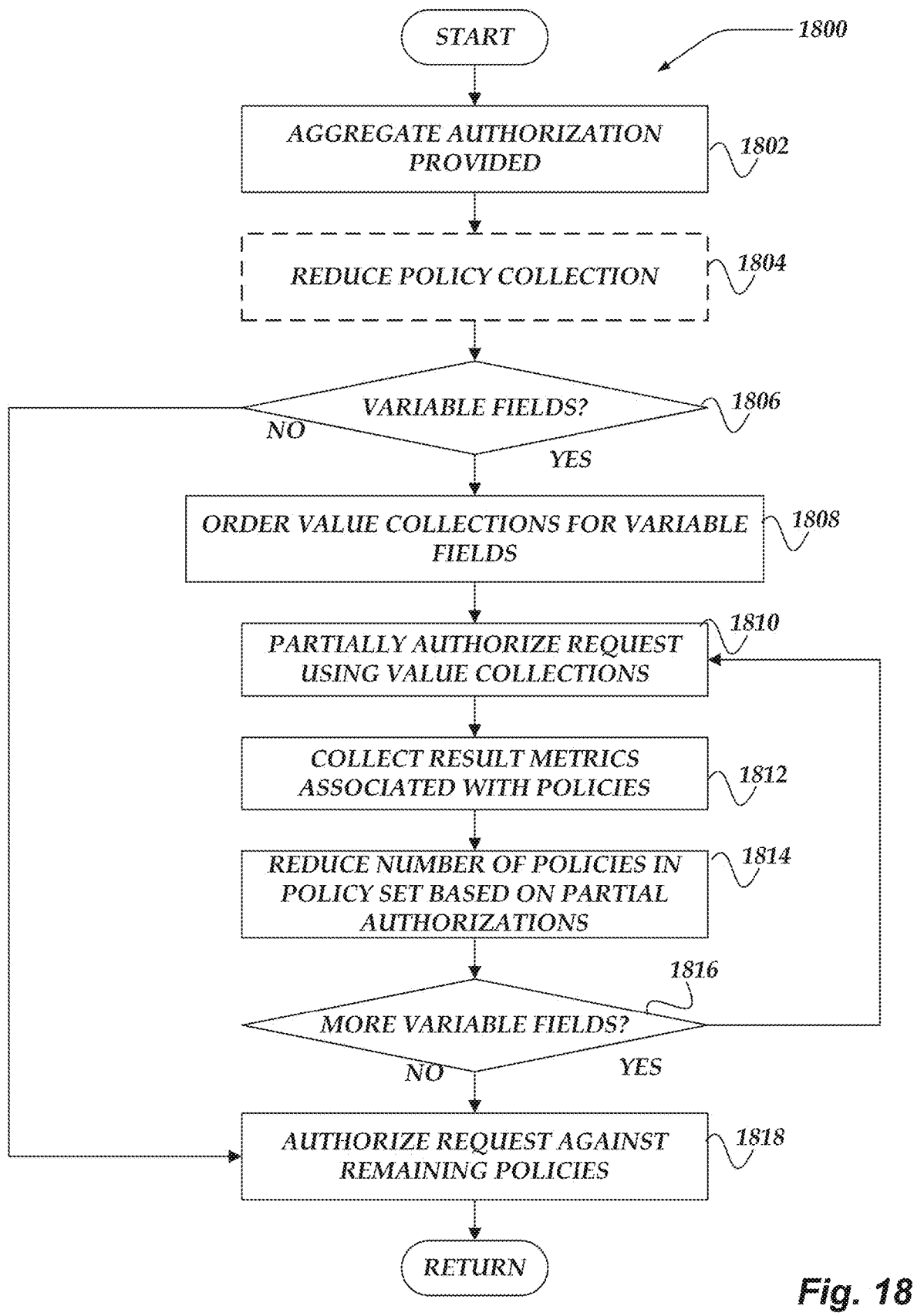
FIG. 18 illustrates a flowchart of a process for evaluating security policies in aggregate in accordance with one or more of the various embodiments.

FIG. 18 illustrates a flowchart of process 1800 for evaluating security policies in aggregate in accordance with one or more of the various embodiments. After a start block, at block 1802, in one or more of the various embodiments, policy engines may be provided an aggregate authorization request. As described above, in some embodiments, infrastructure security computers or policy engines may be arranged to provide one or more user interfaces for one or more applications that enable users to determine or select one or more aggregate authorization requests. For example, in some embodiments, one or more user interfaces may enable a user to view which resources may be accessible to them. Accordingly, in some embodiments, policy engines may be arranged to generate an aggregate authorization request that includes the user as a concrete value for principal field and the resource field as a variable field that may be replaced with resource identifiers. Accordingly, in some embodiments, the application may display a list of resources the user may be allowed to access based on evaluating security policies in aggregate.

Also, for example, in some embodiments, policy engines may be arranged to provide other user interfaces that enable knowledgeable users to draft aggregate authorization requests that may be submitted for evaluation. Also, in some embodiments, one or more user interface controls may be mapped to pre-configured aggregate authorization requests or aggregate authorization request templates such that selecting the user interfaces may cause a particular aggregate authorization request to be generated.

Further, in some embodiments, infrastructure security computers or policy engines may be configured employ one or more aggregate authorization requests to perform automated security analysis. For example, in some embodiments, infrastructure security computers may be configured evaluate existing security policies to keep a count of which resources may be accessible by which types of users (or particular users).

In some embodiments, policy engines may be arranged to provide one or more interfaces or APIs that enable applications or services to provide aggregate authorization requests, values for variable fields (or references thereto), or the like. Accordingly, one of ordinary skill in the art will appreciate that numerous or varied applications may be developed around evaluating security policies in aggregate.

As described above, aggregate authorization requests may be arranged to include one or more concrete fields, one or more variable fields, or one or more ignore fields. In some embodiments, the particular number of fields, field types, field labeling, or the like, may vary depending on the particular policy declaration language that may be used. Herein, for most example, for brevity or clarity Cedar or Cedar-like configuration language examples are used to disclose features of these innovations. However, one of ordinary skill will appreciate that other configuration languages, conventional or customized may be employed without departing from the scope of these innovations.

At block 1804, in one or more of the various embodiments, optionally, policy engines may be arranged to reduce one or more policy collections associated with aggregate authorization request. In some embodiments, two or more policies may be reduced to fewer policies by combining or removing redundant logical expressions that may be shared by more than one policy.

Further, in some embodiments, policies may be further reduced by computing one or more logical or arithmetic expressions such that the results of the computations may be determined once and then employed directly if those policies may be evaluated or assessed for the same aggregate authorization request. For example, for some embodiments, if a policy includes a condition or constraint that includes an expression, such as "y==d>15 minutes from NOW", a policy engine may be arranged to reduce such an expression to TRUE or FALSE based on the initial conditions for the authorization request. Accordingly, in some embodiments, subsequent authorization iterations may omit the computation by using the previously computed results.

In some embodiments, policy engines may be arranged to perform periodic, scheduled, or on-demand iterations through one or more policies to determine expressions that may be reduced or policies that may be reduced.

Note, this block is indicated as being optional, because in some cases, for some embodiments, policy engines may be configured to omit this step or perform it in all or in part prior to being provided an aggregate authorization request.

At decision block 1806, in one or more of the various embodiments, if the aggregate authorization request includes one or more variable fields, control may flow to block 1808; otherwise, control flow to block 1816.

As described above, in some embodiments, one or more fields in aggregate authorization requests may be indicated as being variable fields. In some embodiments, variable fields may be indicated in the aggregate authorization request data structure, via other parameters, or one or more inputs to policy engines. For example, for some embodiments, if a value for a field is VARIABLE, policy engines may be arranged to interpret the corresponding field as a variable field. Also, in some embodiments, policy engines may be arranged to validate that eligible values for each variable field may be provided. In some embodiments, the values may be provided expressly in a list or array. In other cases, for some embodiments, aggregate authorization requests may include references or links to one or more data source that may store the values of interest.

At block 1808, in one or more of the various embodiments, policy engines may be arranged to order the value collections for the variable fields based on one or more ordering schemes.

In some embodiments, policy engines may be arranged to determine an order of processing for the different variable fields. In some embodiments, policy engines may be arranged to select from one or more schemes for ordering variable field processing based on one or more factors, including, compute cost, memory usage, importance or priority of particular variable fields, or the like. For example, in some embodiments, policy engines may be arranged to order variable field processing based on the number of values associated with each variable field. However, policy engines may be arranged to determine the rules, instructions, sort order, cost functions, or the like, for determining processing order of variable fields based on configuration information to account local requirements or local circumstances.

In some embodiments, policy engines may be arranged to determine the number of variable fields included in an aggregate authorization request. Accordingly, in some embodiments, policy engines may be arranged to order the variable fields based on the number of values associated with each variable field.

Accordingly, in some embodiments, policy engines may be arranged to generate partial authorization requests based on determining values for the variable fields in ascending order based on value count. For example, if there may be two variable fields, the variable field associated with the fewest values may be evaluated (partially authorization) before the other variable field. In some cases, selecting variable fields with fewer values over variable fields with more values may reduce the set of eligible policies more efficiently than partially authorizing authorization requests using variable fields with more values. For example, a variable field with two values has the potential eliminate many policies from further consideration. Thus, for example, if a first variable field has two values, a second variable field has 100 values, and a third variable field has 1000 values, apply the values for the first variable field and then the second variable field may cause many or several policies to be removed from consideration. Thus, for some embodiments, if the third variable field (with 1000 values) may be evaluated, the number of eligible policies that remain to be considered may be maximally reduced before iterating over the 1000 values per each remaining policy because evaluating the values for previous variable fields may have determined from partial authorization that one or more policies may be ineligible before testing them against the third variable field (in this example).

At block 1810, in one or more of the various embodiments, policy engines may be arranged to partially authorize the aggregate authorizations using values from the value collections.

In some embodiments, policy engines may be arranged to generate one or more partial authorization requests based on aggregate authorization requests, variable fields, values for variable fields, or the like. In some embodiments, partial authorization requests may be authorization requests that include concrete values that are substituted in for variable fields.

In some embodiments, each variable field may be individually processed such that a authorization request may be generated for each value of each variable field. Accordingly, in some embodiments, policy engines may employ the partial authorization request to determine if a value for a variable field may result in a policy being determined to be ineligible, or irrelevant.

Also, in some embodiments, as described above, policy engines may be arranged to report each partial result to the calling process. Accordingly, in some embodiments, the calling process may be enabled to terminate the aggregate authorization request before it has completed. For example, if the calling process (e.g., applications, services, policy engines, mesh agents, infrastructure security computers, or the like) determines that one or more partial results may satisfy its query, the calling process may terminate the aggregate authorization request rather than waiting until all of the variable fields, values, or policies have been considered.

At block 1812, in one or more of the various embodiments, policy engines may be arranged to collect one or more metrics associated with results of the partial authorizations. For example, in some embodiments, policy engines may be arranged to observe which policies result in permit answers, deny/forbid answers, no answers, or the like. Likewise, in some embodiments, policy engines may be arranged to count which resources may be accessed, the types of available/allowable actions, which users (or a count thereof) may access a particular resource. Note, in some embodiments, these metrics may be considered to be in addition to determining if the authorization request or partial authorization request results in a permit or deny answer. For example, in some embodiments, aggregate authorization requests may be provided to policy engines to determine how many resources a particular user or user group may access. Accordingly, in some embodiments, a response to this type of request may be count of resources, list of resources, or the like, rather than a list of policies the produce permit or deny answers.

Accordingly, in some embodiments, policy engines may be arranged to provide one or more interfaces or APIs that enable callers to identify one or more additional metrics to collect. In some embodiments, policy engines may be arranged to enable callers to provide a callback functions or other configuration information that may be executed for each partial authorization request or authorization request compute or collect one or more of the additional metrics.

At block 1814, in one or more of the various embodiments, policy engines may be arranged to reduce the number of policies in the policy set based on the partial authorizations.

In some embodiments, during partial evaluation one or more policies may be resolved. For example, one or more policies may be resolved as Allow, Deny, ignore/irrelevant, or the like based on a given value for a variable field.

In some embodiments, policy engines may be arranged to enable callers to short circuit the processing of an aggregate authorization request. For example, if the caller is interested in determining if any value associated with a variable field for an aggregate authorization request results in a Deny answer, the processing of the aggregate authorization request may be terminated if a first Deny answer may be determined. Thus, for example, if the aggregate authorization request implicates several policies, an aggregate authorization request process may be terminated or considered resolved if a deny response for a partial authorization may be encountered rather than processing remaining values, remaining variable fields, remaining policies, or the like.

At decision block 1816, in one or more of the various embodiments, if there may be more variable fields, control loop back to block 1810; otherwise, control may flow to the block 1818.

As described above, in some embodiments, aggregate authorization request may designate more than one variable field. Accordingly, in some embodiments, policy engines may be arranged to iterate to a next variable field to evaluate its values.

At block 1818, in one or more of the various embodiments, policy engines may be arranged to authorize the aggregate authorization request against the remaining policies.

At this point, in some embodiments, the fields of a partial authorization requests may include concrete values rather than variable values. Accordingly, in some embodiments, policy engines may be arranged to evaluate the remaining policies if any.

Figure 19:
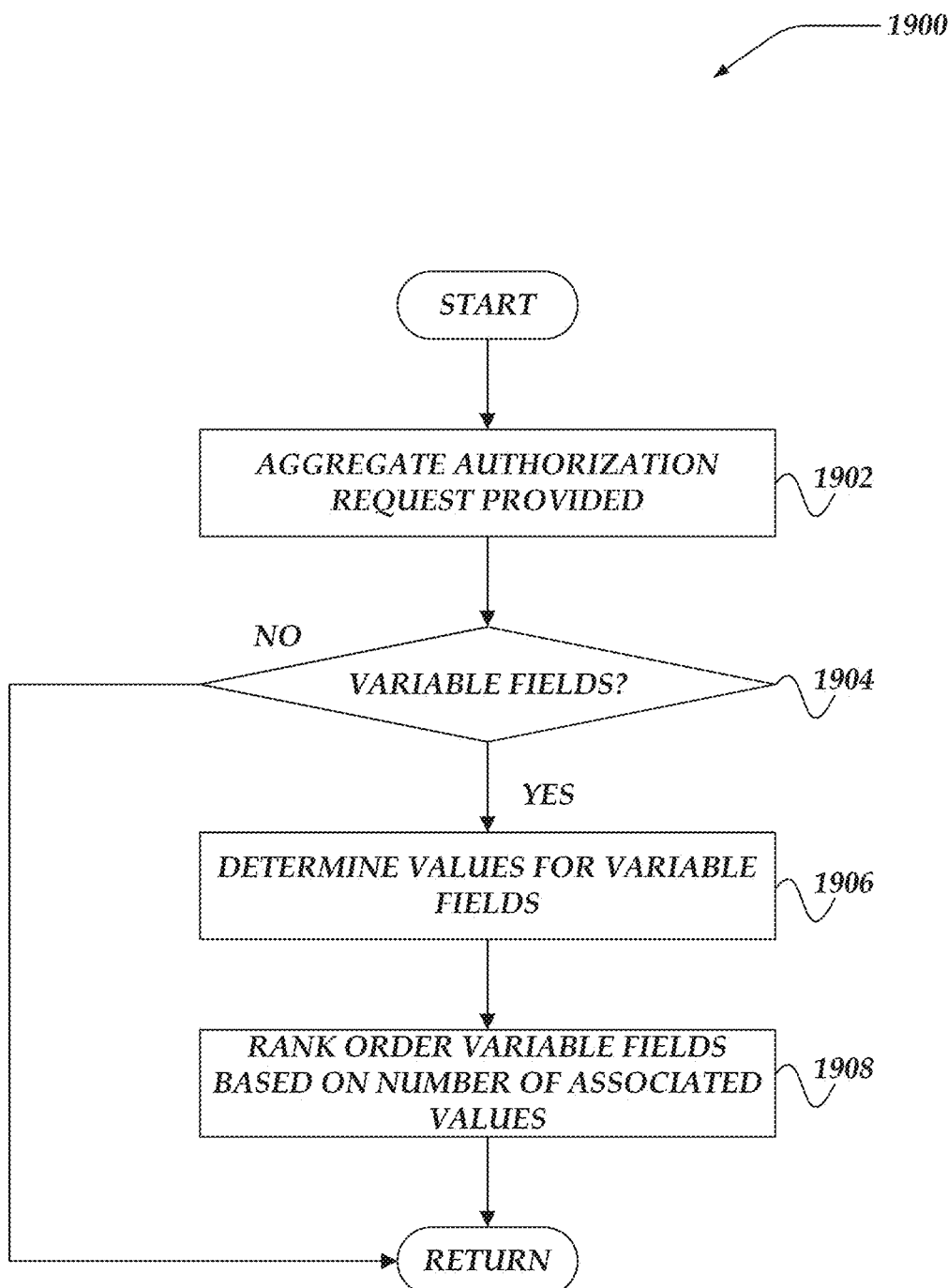
FIG. 19 illustrates a flowchart of a process for evaluating security policies in aggregate in accordance with one or more of the various embodiments.

FIG. 19 illustrates a flowchart of process 1900 for evaluating security policies in aggregate in accordance with one or more of the various embodiments. After a start block, at block 1902, in one or more of the various embodiments, policy engines may be provided an aggregate authorization request. In some embodiments, policy engines may be arranged to provided one or more aggregate authorization requests selected or determined from one or more user interfaces, or the like. Also, in some embodiments, policy engines may be arranged to provide user interfaces that map one or more user interface controls (e.g., buttons, links, or the like) to particular aggregate authorization requests. Likewise, in some embodiments, one or more user interface controls may be associated with one or more aggregate authorization request templates that may be filled in based on selection from the user interface. Also, in some embodiments, infrastructure security computer or policy engines may be configured to automatically provide one or more aggregate authorization requests to generate reports, dashboard displays, metrics, or the like.

At decision block 1904, in one or more of the various embodiments, if policy engines determine that one or more variable fields may be in the aggregate authorization request, control may flow to block 1906; otherwise, control may be returned to a calling process. In some embodiments, aggregate authorization requests may be data structures with one or more fields. Accordingly, in some embodiments, policy engines may be arranged to evaluate the field values to determine if particular fields may be designated as variable fields. In some embodiments, policy engines may be arranged to parse the fields of the aggregate authorization request to identify variable fields. In some cases, for example, variable fields may be indicated based on tags, labels, flags, markup, or the like, that policy engines may be configured to recognize.

At block 1906, in one or more of the various embodiments, policy engines may be arranged to determine one or more values for the variable fields. As described above, values for each variable field may be provided with the aggregate authorization request. However, in some embodiments, policy engines may be arranged to communicate with one or more data sources to determine the values for a variable field. For example, for some embodiments, if the resource field of an aggregate authorization request may be a variable field, policy engines may be arranged to download relevant resources from an infrastructure security computer or a configuration database for the managed network environment.

At block 1908, in one or more of the various embodiments, policy engines may be arranged to order the variable fields based on the number of values associated with each variable field.

In some embodiments, policy engine may be arranged to sort the variable fields such that the variable field with the fewest values may be partially authorized first. In some embodiments, this sort order may be advantageous because it has the highest probability to reduce the number of policies by the greatest amount.

Note, as described above, in some embodiments, policy engines may be arranged to be adaptable to other methods for selecting the order that variable fields or values may be processed. Accordingly, in some embodiments, policy engines may be arranged to employ instructions, rules, conditions, or the like for ordering variable fields that may be provided via configuration information to account for local circumstances or local requirements.

Next, in one or more of the various embodiments, control may be returned to a calling process.

Figure 20:
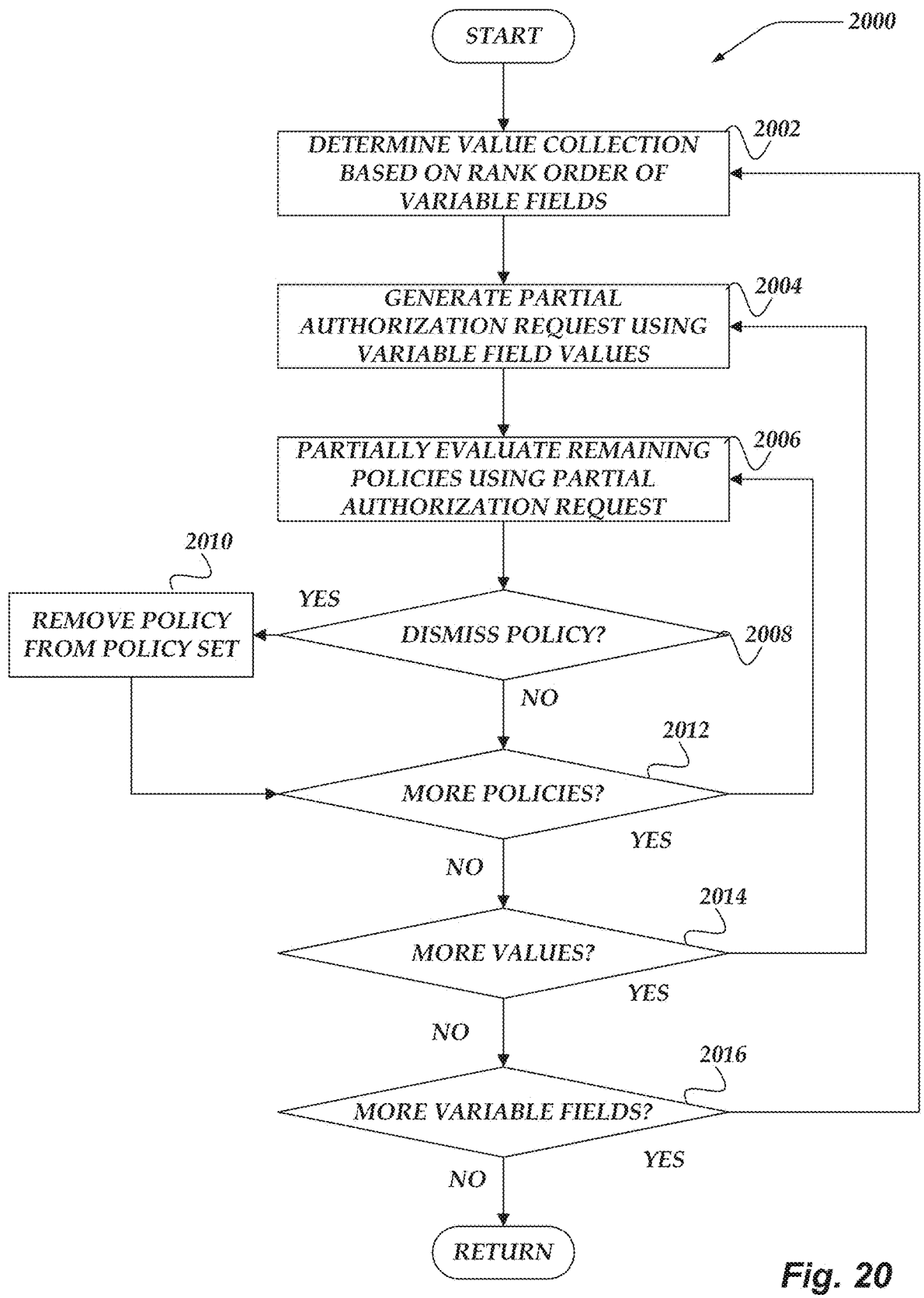
FIG. 20 illustrates a flowchart of a process for evaluating security policies in aggregate in accordance with one or more of the various embodiments.

FIG. 20 illustrates a flowchart of process 2000 for evaluating security policies in aggregate in accordance with one or more of the various embodiments. After a start block, at block 2002, in one or more of the various embodiments, policy engines may be arranged to determine one or more value collections based on the rank order of variable fields in an aggregate authorization request. As described above, in some embodiments, policy engines may be arranged to determine one or more aggregate authorization requests. In some cases, for some embodiments, aggregate authorization requests may include one or more variable fields. Accordingly, in some embodiments, policy engines may be arranged to determine value collections for each variable field included in an aggregate authorization request.

In some embodiments, policy engines may be arranged to provide one or more APIs or interfaces that enable calling processes to supply value collections for each variable field included in the aggregate authorization request.

Also, in some embodiments, policy engines may be arranged to integrate with one or more data sources to automatically determine the values for one or more variable fields. Accordingly, in one or more of the various embodiments, policy engines may be arranged to determine the type of variable field to determine how to obtain the corresponding values. In some embodiments, the aggregate authorization request may include additional type information that may enable policy engines to determine data sources for obtaining the values. In some embodiments, the calling process may provide a reference to an API or interface that enables the policy engine to obtain values.

For example, in some embodiments, if the Principal field of the aggregate authorization request is a variable field, policy engine may be provided a list or collection of principals that may be used. Likewise, in some embodiments, policy engines may be arranged to determine a data source (e.g., LDAP server, infrastructure security computer, or the like) that may provide the values for the principal variable field.

At block 2004, in one or more of the various embodiments, policy engines may be arranged to generate one or more partial authorization requests using one or more values for the variable fields. In some embodiments, policy engines may be arranged to employ the aggregate authorization request as a template or template-like object to generate partial authorization requests. In some embodiments, partial authorization requests may be authorization requests that may be missing one or more fields with one or more values for one or more variable fields substituted into the partial authorization request.

For example, for some embodiments, if the principal field in the aggregate authorization request may be a variable field, policy engines may be arranged to generate a partial authorization request by substituting variable fields with values (e.g., users) from the value collection that corresponds to the variable field.

At block 2006, in one or more of the various embodiments, policy engines may be arranged to evaluate one or more remaining policies using the one or more partial authorization requests.

As described above, in some embodiments, one or more policies of interest may be provided to policy engines with the aggregate authorization request. Also, in some embodiments, policy engines may be enabled to access one or more policies via an API or interface that enables access to one or more data sources (e.g., infrastructure security computers, or the like) that include the policies of interest.

In some embodiments, policy engines may be arranged to employ the partial authorization request to determine if the remaining policies may be relevant to the aggregate authorization request. Accordingly, in some embodiments, policy engines may be arranged to test if each remaining policy may be relevant given the field values currently assigned to the partial authorization request.

For example, if a policy does not apply to one or more of the known values in the partial authorization request, that policy may be considered to be irrelevant to the current aggregate authorization request.

Also, in some embodiments, as described above, policy engines may be arranged to report each partial result to the calling process. Accordingly, in some embodiments, the calling process may be enabled to terminate the aggregate authorization request before it has run to completion. For example, if the calling process (e.g., applications, services, policy engines, mesh agents, infrastructure security computers, or the like) determines that one or more partial results may satisfy its query, the calling process may terminate the aggregate authorization request rather than waiting until all of the variable fields, values, or policies have been considered.

Also, in some embodiments, policy engines may be arranged to parallelize the authorizations or partial authorizations rather than being restricted to serial processing. Here, for brevity and clarity serial processing is shown.

At decision block 2008, in one or more of the various embodiments, if a policy may be dismissed, control may flow to block 2010; otherwise, control may flow to decision block 2012. In some embodiments, if policy engines determine a policy may be irrelevant based on the partial authorization request, that policy may be dismissed from the current policy set.

At block 2010, in one or more of the various embodiments, policy engines may be arranged to remove the dismissed policies from the working policy set.

In some embodiments, policy engines may be arranged to remove one or more polices from further consideration based on the result of the partial authorization. Accordingly, in some embodiments, subsequent partial evaluations for other values or other variable fields may be applied to fewer policies.

Next, in one or more of the various embodiments, control may flow to decision block 2012.

At decision block 2012, in one or more of the various embodiments, if there may be more policies to evaluate, control may loop back to block 2006; otherwise, control may flow to decision block 2014. In some embodiments, policy engines may be arranged to attempt partial authorization for each policy that remains in the current working policy set. As policies may be dismissed from the working policy set, the number of policies may be reduced.

At decision block 2014, in one or more of the various embodiments, if there may be more values for the current variable field, control may loop back to block 2004; otherwise, control flow to decision block 2016.

As described above, in some embodiments, each variable field included in an aggregate authorization request may be associated with one or more values. Accordingly, in some embodiments, policy engines may be arranged to perform partial authorizations for each value included in the value collections for the current variable field.

At decision block 2016, in one or more of the various embodiments, if there may be more variable fields to evaluate, control may loop back to block 2002; otherwise, control may be returned to a calling process.

In some embodiments, aggregate authorization requests may include more than one variable field. Accordingly, in some embodiments, policy engines may be arranged to continue with the partial authorizations until each variable field in the aggregate authorization request may be evaluated.

Accordingly, in some embodiments, if each variable field in the aggregate authorization request has been processed, control may be returned to a calling process.

It will be understood that each block of the flowchart illustrations or combinations of blocks in these flowchart illustrations, may be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware based systems, which perform the specified actions or steps, or combinations of special purpose hardware and computer instructions. The foregoing example should not be construed as limiting or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiments, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

What is claimed as new and desired to be protected by Letters Patent of the United States is:

1. A method for managing interactions with applications in a computing environment using one or more processors that are configured to execute instructions that cause performance of actions, comprising:
   generating an aggregate authorization request based on a query from one or more applications, wherein the aggregate authorization request includes one or more variable fields and a plurality of values;
   determining a plurality policies based on the aggregate authorization request, wherein each policy includes one or more constraints or one or more conditions associated with enabling or disabling one or more activities in the computing environment; and
   iterating over the one or more variable fields to perform further actions, including:
   determining a variable field and a portion of the plurality of values that are associated with the variable field based on the iteration;
   generating one or more partial authorization requests based on the aggregate authorization request, the variable field, and the portion of values; and
   evaluating the plurality of policies based on each partial authorization request, wherein one or more policies are dismissed from the plurality of policies based on the evaluation, and wherein each dismissed policy is determined to be unassociated with the one or more partial authorization requests and wherein the evaluation is based on an order according to a number of one or more portions of values associated with each variable field; and
   generating a response to the query that includes one or more authorization answers based on each policy that remains in the plurality of policies to improve performance in generating one or more authorization answer that enables or disables the one or more activities in the computing environment.

2. The method of claim 1, further comprising:
   generating a user interface that is dynamically arranged to display one or more resources that are accessible to a user that is declared in the query based on the response and the one or more authorization answers.

3. The method of claim 1, wherein the evaluating of the plurality of policies, further comprises:
   collecting one or more metrics associated with the one or more partial authorization requests based on the query from the one or more applications, wherein the one or more metrics include one or more of a resource count, a principal count, an action count, a user count, a count of resources associated with an enabling authorization answer, a count of users associated with an enabling answer, one or more counts associated with context information or context subfields, or a count of users that are enabled to perform the one or more activities; and
   generating a result set for the query based on the one or more metrics, wherein the result set is included in the response to the query.

4. The method of claim 1, wherein the generating the one or more partial authorization requests, further comprises:
   determining one or more the fields in the aggregated authorization request that are associated with a concrete value;
   duplicating the one or more fields with each associated concrete value in the one or more partial authorization requests;
   generating another field in the one or more partial authorization requests that correspond to the variable field; and
   employing the portion of the plurality of values to iteratively associate a value from the portion of the plurality of values with the other field in the one or more partial authorization requests.

5. The method of claim 1, wherein generating the aggregated authorization request, further comprises:
   determining one or more fields that are included in the aggregated authorization request based on the query and one or more field types, wherein the field type for each field and for each variable field is one of a principal, an action, a resource, or a context.

6. The method of claim 1, wherein the evaluating of the plurality of policies, further comprises:
   determining one or more the fields in the aggregated authorization request that are ignorable; and
   ignoring the one or more constraints or the one or more conditions included in each policy that are associated with the one or more ignorable fields.

7. The method of claim 1, further comprising:
   determining one or more portions of the plurality of values that are associated with one of the one or more variable fields; and
   sorting the one or more variable fields in an order based on a number of the one or more portions of values associated with each variable field.

8. A network computer for managing interactions with applications, comprising:
   a memory that stores at least instructions; and
   one or more processors that execute instructions that are configured to cause actions, including:
   generating an aggregate authorization request based on a query from one or more applications, wherein the aggregate authorization request includes one or more variable fields and a plurality of values;
   determining a plurality policies based on the aggregate authorization request, wherein each policy includes one or more constraints or one or more conditions associated with enabling or disabling one or more activities in the computing environment; and
   iterating over the one or more variable fields to perform further actions, including:
   determining a variable field and a portion of the plurality of values that are associated with the variable field based on the iteration;
   generating one or more partial authorization requests based on the aggregate authorization request, the variable field, and the portion of values; and
   evaluating the plurality of policies based on each partial authorization request, wherein one or more policies are dismissed from the plurality of policies based on the evaluation, and wherein each dismissed policy is determined to be unassociated with the one or more partial authorization requests and wherein the evaluation is based on an order according to a number of one or more portions of values associated with each variable field; and generating a response to the query that includes one or more authorization answers based on each policy that remains in the plurality of policies to improve performance in generating one or more authorization answer that enables or disables the one or more activities in the computing environment.

9. The network computer of claim 8, wherein the one or more processors execute instructions that are configured to cause actions, further comprising:

generating a user interface that is dynamically arranged to display one or more resources that are accessible to a user that is declared in the query based on the response and the one or more authorization answers.

10. The network computer of claim 8, wherein the evaluating of the plurality of policies, further comprises:

collecting one or more metrics associated with the one or more partial authorization requests based on the query from the one or more applications, wherein the one or more metrics include one or more of a resource count, a principal count, an action count, a user count, a count of resources associated with an enabling authorization answer, a count of users associated with an enabling answer, one or more counts associated with context information or context subfields, or a count of users that are enabled to perform the one or more activities; and generating a result set for the query based on the one or more metrics, wherein the result set is included in the response to the query.

11. The network computer of claim 8, wherein the generating the one or more partial authorization requests, further comprises:

determining one or more the fields in the aggregated authorization request that are associated with a concrete value;

duplicating the one or more fields with each associated concrete value in the one or more partial authorization requests;

generating another field in the one or more partial authorization requests that correspond to the variable field; and employing the portion of the plurality of values to iteratively associate a value from the portion of the plurality of values with the other field in the one or more partial authorization requests.

12. The network computer of claim 8, wherein generating the aggregated authorization request, further comprises:

determining one or more fields that are included in the aggregated authorization request based on the query and one or more field types, wherein the field type for each field and for each variable field is one of a principal, an action, a resource, or a context.

13. The network computer of claim 8, wherein the evaluating of the plurality of policies, further comprises:

determining one or more the fields in the aggregated authorization request that are ignorable; and ignoring the one or more constraints or the one or more conditions included in each policy that are associated with the one or more ignorable fields.

14. The network computer of claim 8, wherein the one or more processors execute instructions that are configured to cause actions, further comprising:

determining one or more portions of the plurality of values that are associated with one of the one or more variable fields; and sorting the one or more variable fields in an order based on a number of the one or more portions of values associated with each variable field.

15. A processor readable non-transitory storage media that includes instructions configured for managing interactions with applications in a computing environment, wherein execution of the instructions by one or more processors on one or more network computers performs actions, comprising:

generating an aggregate authorization request based on a query from one or more applications, wherein the aggregate authorization request includes one or more variable fields and a plurality of values;

determining a plurality policies based on the aggregate authorization request, wherein each policy includes one or more constraints or one or more conditions associated with enabling or disabling one or more activities in the computing environment; and iterating over the one or more variable fields to perform further actions, including:

determining a variable field and a portion of the plurality of values that are associated with the variable field based on the iteration;

generating one or more partial authorization requests based on the aggregate authorization request, the variable field, and the portion of values; and evaluating the plurality of policies based on each partial authorization request, wherein one or more policies are dismissed from the plurality of policies based on the evaluation, and wherein each dismissed policy is determined to be unassociated with the one or more partial authorization requests and wherein the evaluation is based on an order according to a number of one or more portions of values associated with each variable field; and generating a response to the query that includes one or more authorization answers based on each policy that remains in the plurality of policies to improve performance in generating one or more authorization answer that enables or disables the one or more activities in the computing environment.

16. The media of claim 15, further comprising:

generating a user interface that is dynamically arranged to display one or more resources that are accessible to a user that is declared in the query based on the response and the one or more authorization answers.

17. The media of claim 15, wherein the evaluating of the plurality of policies, further comprises:

collecting one or more metrics associated with the one or more partial authorization requests based on the query from the one or more applications, wherein the one or more metrics include one or more of a resource count, a principal count, an action count, a user count, a count of resources associated with an enabling authorization answer, a count of users associated with an enabling answer, one or more counts associated with context information or context subfields, or a count of users that are enabled to perform the one or more activities; and generating a result set for the query based on the one or more metrics, wherein the result set is included in the response to the query.

18. The media of claim 15, wherein the generating the one or more partial authorization requests, further comprises:

determining one or more the fields in the aggregated authorization request that are associated with a concrete value;

duplicating the one or more fields with each associated concrete value in the one or more partial authorization requests;

generating another field in the one or more partial authorization requests that correspond to the variable field; and employing the portion of the plurality of values to iteratively associate a value from the portion of the plurality of values with the other field in the one or more partial authorization requests.

19. The media of claim 15, wherein generating the aggregated authorization request, further comprises:

determining one or more fields that are included in the aggregated authorization request based on the query and one or more field types, wherein the field type for each field and for each variable field is one of a principal, an action, a resource, or a context.

20. The media of claim 15, wherein the evaluating of the plurality of policies, further comprises:

determining one or more the fields in the aggregated authorization request that are ignorable; and ignoring the one or more constraints or the one or more conditions included in each policy that are associated with the one or more ignorable fields.

21. The media of claim 15, further comprising:

determining one or more portions of the plurality of values that are associated with one of the one or more variable fields; and sorting the one or more variable fields in an order based on a number of the one or more portions of values associated with each variable field.

22. A system for method for managing interactions with applications, comprising:

a network computer, comprising:

a memory that stores at least instructions; and one or more processors that execute instructions that are configured to cause actions, including:

generating an aggregate authorization request based on a query from one or more applications, wherein the aggregate authorization request includes one or more variable fields and a plurality of values;

determining a plurality policies based on the aggregate authorization request, wherein each policy includes one or more constraints or one or more conditions associated with enabling or disabling one or more activities in the computing environment; and iterating over the one or more variable fields to perform further actions, including:

determining a variable field and a portion of the plurality of values that are associated with the variable field based on the iteration;

generating one or more partial authorization requests based on the aggregate authorization request, the variable field, and the portion of values; and evaluating the plurality of policies based on each partial authorization request, wherein one or more policies are dismissed from the plurality of policies based on the evaluation, and wherein each dismissed policy is determined to be unassociated with the one or more partial authorization requests and wherein the evaluation is based on an order according to a number of one or more portions of values associated with each variable field; and generating a response to the query that includes one or more authorization answers based on each policy that remains in the plurality of policies to improve performance in generating one or more authorization answer that enables or disables the one or more activities in the computing environment; and a client computer, comprising:

another memory that stores at least instructions; and one or more other processors that execute other instructions that are configured to cause actions, including:

communicating one or more of information for generating the query, or the query to the network computer.

23. The system of claim 22, wherein the one or more processors of the network computer execute instructions that are configured to cause actions, further comprising:

generating a user interface that is dynamically arranged to display one or more resources that are accessible to a user that is declared in the query based on the response and the one or more authorization answers.

24. The system of claim 22, wherein the evaluating of the plurality of policies, further comprises:

collecting one or more metrics associated with the one or more partial authorization requests based on the query from the one or more applications, wherein the one or more metrics include one or more of a resource count, a principal count, an action count, a user count, a count of resources associated with an enabling authorization answer, a count of users associated with an enabling answer, one or more counts associated with context information or context subfields, or a count of users that are enabled to perform the one or more activities; and generating a result set for the query based on the one or more metrics, wherein the result set is included in the response to the query.

25. The system of claim 22, wherein the generating the one or more partial authorization requests, further comprises:

determining one or more the fields in the aggregated authorization request that are associated with a concrete value;

duplicating the one or more fields with each associated concrete value in the one or more partial authorization requests;

generating another field in the one or more partial authorization requests that correspond to the variable field; and employing the portion of the plurality of values to iteratively associate a value from the portion of the plurality of values with the other field in the one or more partial authorization requests.

26. The system of claim 22, wherein generating the aggregated authorization request, further comprises:

determining one or more fields that are included in the aggregated authorization request based on the query and one or more field types, wherein the field type for each field and for each variable field is one of a principal, an action, a resource, or a context.

27. The system of claim 22, wherein the evaluating of the plurality of policies, further comprises:

determining one or more the fields in the aggregated authorization request that are ignorable; and ignoring the one or more constraints or the one or more conditions included in each policy that are associated with the one or more ignorable fields.

28. The system of claim 22, wherein the one or more processors of the network computer execute instructions that are configured to cause actions, further comprising:

determining one or more portions of the plurality of values that are associated with one of the one or more variable fields; and sorting the one or more variable fields in an order based on a number of the one or more portions of values associated with each variable field.

* * * * *